United States Patent
O'Connor et al.

(10) Patent No.: US 10,833,764 B2
(45) Date of Patent: Nov. 10, 2020

(54) DEVICES AND METHODS TO PRODUCE AND RECEIVE AN ENCODED LIGHT SIGNATURE

(71) Applicant: eocys, LLC, Seattle, WA (US)

(72) Inventors: Ethan Michael O'Connor, Seattle, WA (US); Shannon Yun-Ming Cheng, Seattle, WA (US)

(73) Assignee: eocys, LLC, Seattle, WA (US)

( * ) Notice: Subject to any disclaimer, the term of this patent is extended or adjusted under 35 U.S.C. 154(b) by 0 days.

(21) Appl. No.: 16/358,523

(22) Filed: Mar. 19, 2019

(65) Prior Publication Data
US 2019/0215064 A1 Jul. 11, 2019

Related U.S. Application Data

(62) Division of application No. 15/288,991, filed on Oct. 7, 2016, now Pat. No. 10,236,978, which is a division of application No. 14/032,071, filed on Sep. 19, 2013, now Pat. No. 9,496,955.

(51) Int. Cl.
*H04B 10/116* (2013.01)
*H04B 10/54* (2013.01)

(52) U.S. Cl.
CPC ......... *H04B 10/116* (2013.01); *H04B 10/541* (2013.01)

(58) Field of Classification Search
CPC .............................................. H04B 10/11–116
See application file for complete search history.

(56) References Cited

U.S. PATENT DOCUMENTS

| | | | |
|---|---|---|---|
| 3,243,592 A | 3/1966 | Tomiyasu et al. |
| 3,743,835 A | 7/1973 | Koncen |
| 4,476,875 A | 10/1984 | Nilsson et al. |
| 4,492,869 A | 1/1985 | Suzuki et al. |
| 5,218,196 A | 6/1993 | Dogul et al. |
| 5,737,077 A | 4/1998 | Lee et al. |
| 6,721,502 B1 | 4/2004 | Al-Salameh et al. |
| 7,248,358 B2 | 7/2007 | Geshwind et al. |
| 7,436,403 B2 | 10/2008 | Debevec |
| 7,952,292 B2 | 5/2011 | Vegter et al. |

(Continued)

FOREIGN PATENT DOCUMENTS

| | | |
|---|---|---|
| JP | 2006-148572 A | 6/2006 |
| KR | 10-2008-0064804 A | 7/2008 |

(Continued)

OTHER PUBLICATIONS

Google "Photosensitive definition," Google search and screen capture, downloaded on Jul. 21, 2018, 1 page.

(Continued)

*Primary Examiner* — Casey L Kretzer
(74) *Attorney, Agent, or Firm* — Seed Intellectual Property Law Group LLP

(57) ABSTRACT

A signature encoded light system includes at least one light source. The at least one light source is configured to output a first encoded light signature embedded within light in the visible spectrum. A light signature detection device is configured to receive a composite light signal formed with light from the at least one light source and ambient light. The light signature detection device is configured to identify the first encoded light signature.

18 Claims, 23 Drawing Sheets

(56) References Cited

U.S. PATENT DOCUMENTS

| | | | |
|---|---|---|---|
| 2002/0129311 A1* | 9/2002 | Ewen | G01R 31/3187 |
| | | | 714/733 |
| 2004/0008121 A1 | 1/2004 | Giannopoulos et al. | |
| 2006/0056855 A1 | 3/2006 | Nakagawa et al. | |
| 2006/0216042 A1 | 9/2006 | Yeo et al. | |
| 2007/0008258 A1 | 1/2007 | Yamamoto | |
| 2007/0103007 A1 | 5/2007 | Miki | |
| 2007/0146126 A1 | 6/2007 | Wang | |
| 2007/0201867 A1 | 8/2007 | DeLew et al. | |
| 2007/0258722 A1 | 11/2007 | Yu | |
| 2008/0107430 A1 | 5/2008 | Jackel | |
| 2009/0174573 A1 | 7/2009 | Smith | |
| 2009/0186584 A1 | 7/2009 | Lambrecht | |
| 2009/0208213 A1 | 8/2009 | Sarashina | |
| 2009/0220239 A1 | 9/2009 | Armstrong et al. | |
| 2009/0310971 A1 | 12/2009 | Kim et al. | |
| 2009/0316147 A1 | 12/2009 | Hamilton, II et al. | |
| 2010/0327755 A1 | 12/2010 | Meijer et al. | |
| 2011/0076024 A1 | 3/2011 | Damink | |
| 2012/0098436 A1 | 4/2012 | Talstra et al. | |
| 2012/0153838 A1 | 6/2012 | Schenk et al. | |
| 2012/0170939 A1 | 7/2012 | Schenk et al. | |
| 2012/0328302 A1 | 12/2012 | Iizuka et al. | |
| 2013/0136456 A1* | 5/2013 | Yoo | H04B 10/116 |
| | | | 398/118 |
| 2014/0186055 A1 | 7/2014 | Oshima et al. | |
| 2015/0063821 A1* | 3/2015 | Mathews | H04B 10/116 |
| | | | 398/139 |
| 2015/0078741 A1 | 3/2015 | O'Connor et al. | |

FOREIGN PATENT DOCUMENTS

| | | |
|---|---|---|
| WO | 2006-111934 A1 | 10/2006 |
| WO | 2007/095740 A1 | 8/2007 |
| WO | 2007/121574 A1 | 11/2007 |
| WO | 2008/155697 A2 | 12/2008 |

OTHER PUBLICATIONS

Hoover, Jr. et al., "System Design of the Flying Spot Store," *The Bell System Technical Journal* 38(2):365-401, 1959. (38 pages).

International Search Report and Written Opinion of the International Searching Authority, dated Jun. 17, 2015, for corresponding International Application No. PCT/US2014/056627, 12 pages.

Langer et al., "Recent Developments in Optical Wireless Communications using Infrared and Visible Light," *Proceedings of the 9th International Conference on Transparent Optical Networks*, Rome, Italy, Jul. 1-5, 2007, pp. 146-151.

Ward et al., "Table of Linear Feedback Shift Registers," Datasheet, Department of Physics, University of Otago, Oct. 26, 2007, 6 pages.

* cited by examiner

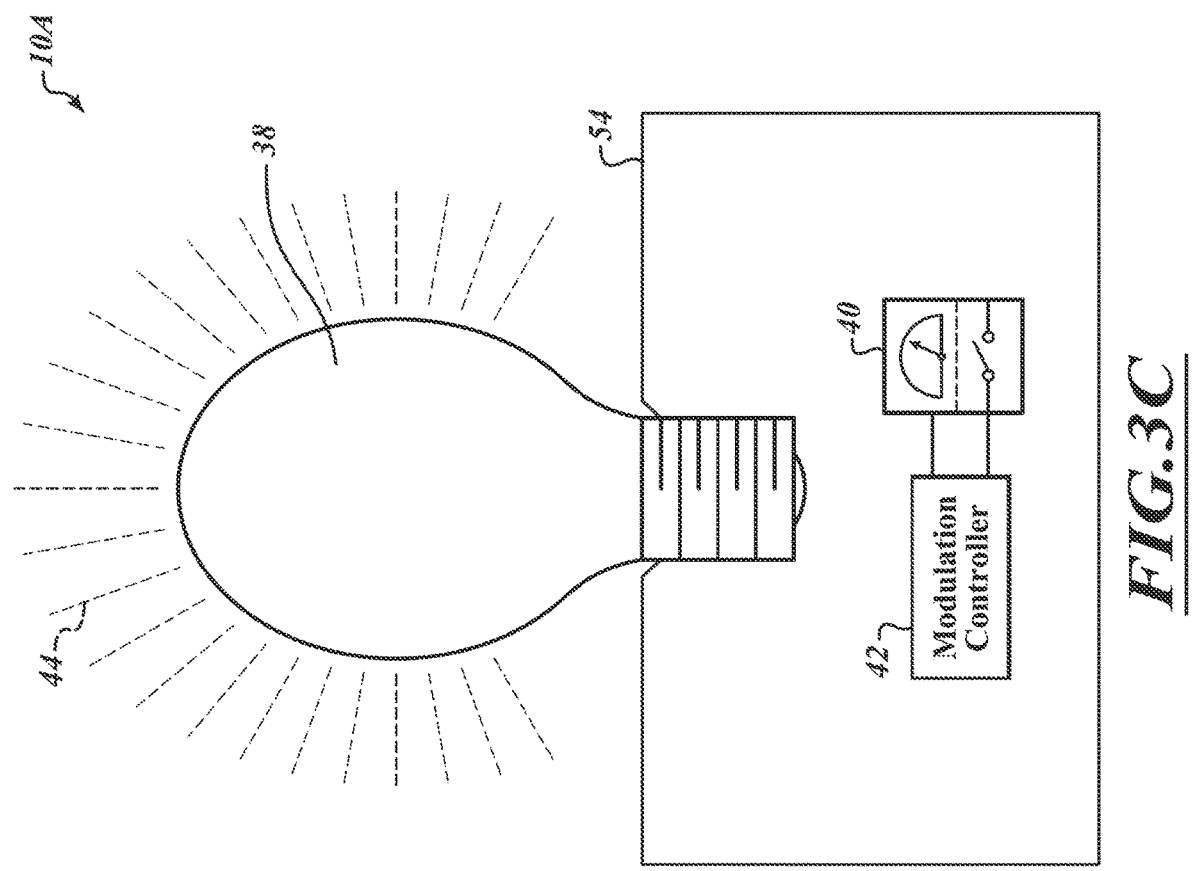

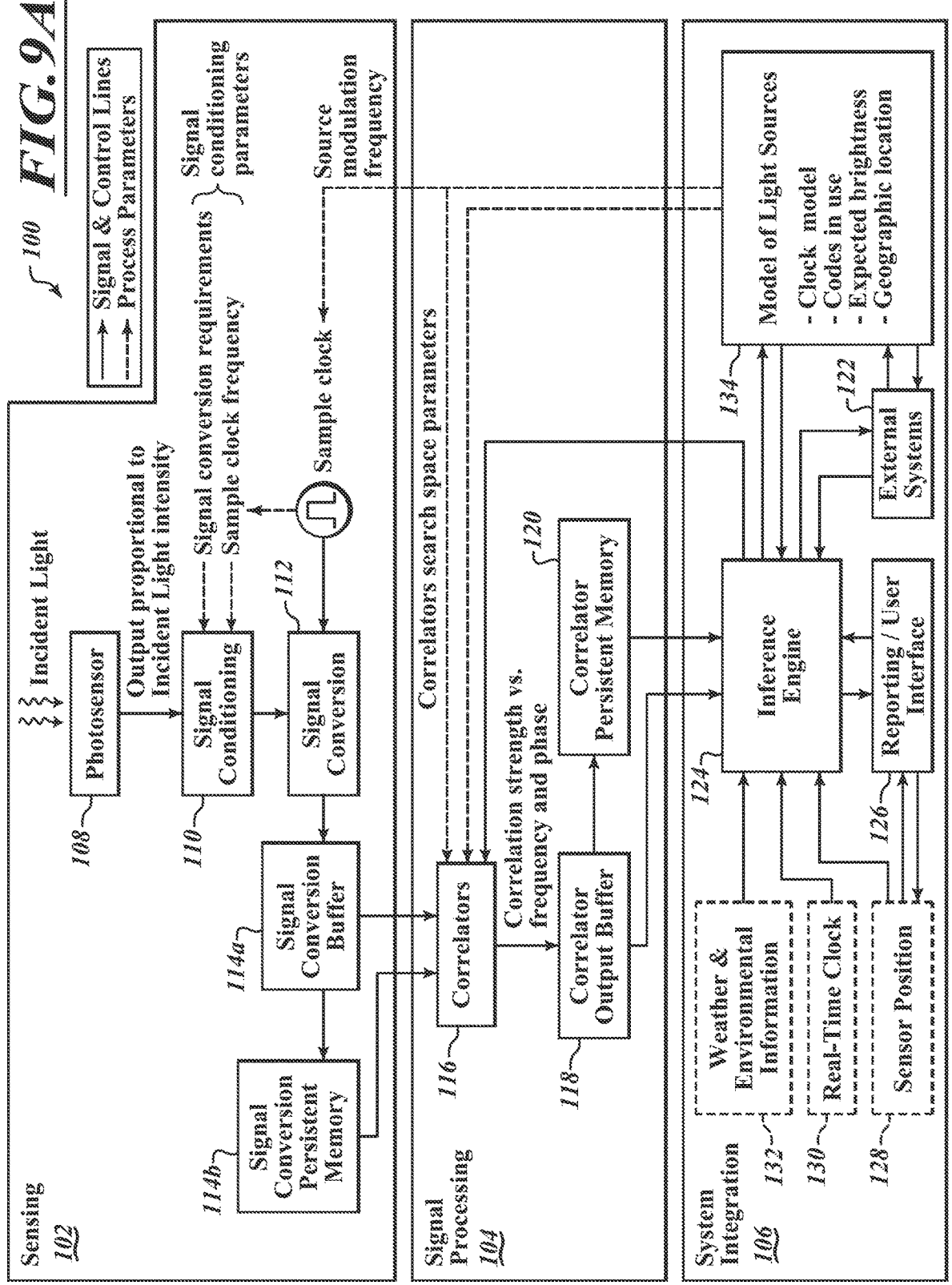

DEVICES AND METHODS TO PRODUCE AND RECEIVE AN ENCODED LIGHT SIGNATURE

BACKGROUND

Technical Field

The present disclosure generally relates to light source devices that produce encoded visible light and light receiver devices that decode the encoded visible light, wherein a pattern encoded in the light is not generally visible to a human eye.

Description of the Related Art

Governments and private entities deploy and maintain individual lights and multi-light lighting systems. For example, street lights illuminate roads, sidewalks, and parking lots to provide visibility and safety. Crosswalk indicators let pedestrians know when it is safe to cross an intersection. Electronic traffic warning signs (e.g., "Road Closed," "Do Not Enter," and many others) are activated at various times of the day and night to inform and direct motorists and pedestrians. Airports, stadiums, private businesses, shopping establishments, and many other entities all rely on light sources for the safety and enjoyment of people. Maintaining the desired operation of light sources is important for safety, convenience, and energy efficiency.

In conventional lighting systems, a human observer is often used to verify the proper operation of individual light bulbs. That is, when a light bulb that is expected to be "on" fails to light and is instead "off," a human being notices the failure. In some cases, people unaffiliated with the lighting system are relied on to detect failed bulbs. In one example, a city or other government agency often has a procedure whereby citizens are encouraged to report failing street lights. In other cases, employees are specifically tasked with detecting failed light bulbs. With large multi-light matrix billboard displays or scoreboards, for example, a maintenance employee may be tasked with ensuring that all or nearly all light bulbs are operating.

Some lighting systems use electronic circuits instead of human observers to detect failed light bulbs. In such cases, each light bulb fixture is typically configured with light detection or current detection circuits to detect the failure, and a wired or wireless radio or other transmission system to report the failure. When a failure is detected, the individual bulb or fixture sends an electronic message to a central controller that informs maintenance personnel of the failure. Self-reporting lighting systems are sometimes built into city lighting systems for energy saving purposes, but often, such systems are used in environments where light bulb failures can cause significant harm, such as airport runway and taxiway lighting, high-rise rooftop warning lights, and others.

BRIEF SUMMARY

In accordance with some embodiments described herein, devices produce and receive encoded light signatures. A multi-bit signature is encoded in the light produced by a light source. The light from the light source is received and decoded by a light signature detection device. Many light sources in the same area may produce light, and each light source will have a different and distinguishable signature that can be isolated by the light signature detection device. Sometimes, all of the light sources share the same multi-bit light signature, but in these cases, each light source will typically encode a different phase of the multi-bit light signature in their respective light output. The light signature detection device can isolate the light signature from each light source even in the presence of un-encoded light from the sun or other light sources.

An embodiment of a signature encoded light system includes at least one light source. The at least one light source is configured to output a first encoded light signature embedded within light in the visible spectrum. A light signature detection device is configured to receive a composite light signal formed with light from the at least one light source and ambient light. The light signature detection device is configured to identify the first encoded light signature.

In some embodiments a modulation controller is configured to modulate an amplitude of the light output from the at least one light source according to the first encoded light signature. In such embodiments, the first encoded light signature can be formed as a stream of binary digits, and the modulation controller can be configured to represent a binary "1" with a first amplitude of light output and a binary "0" with a second amplitude of light output. The first encoded light signature is generally undetectable by a human eye. The light signature detection device can be configured to communicate a status of the at least one light source.

In some embodiments, the system may include a plurality of light sources, each one of the plurality configured to output a different encoded light signature embedded within light in the visible spectrum wherein the light signature detection device is configured to identify each of the different encoded light signatures. The light signature detection device can be configured to associate each identified encoded light signature with the respective one of the plurality of light sources configured to output the identified encoded light signature. The light signature detection device can be configured to calculate a relative light output from each of the plurality of light sources.

In embodiments, the light signature detection device in the signature encoded light system includes an input arranged to receive digital samples corresponding to the composite light signal, the light having brightness contributions from un-encoded light and encoded light. The light signature detection device also includes a memory arranged to store complex conjugate discrete Fourier transform (DFT) code values and a processor configured to multiply a plurality of DFT sample values by corresponding complex conjugate code values and further configured to perform DFT calculations on resulting products to produce correlations.

In embodiments, the ambient light in the signature encoded light system is un-encoded light from at least one of sunlight, moonlight, reflected light, light from motor vehicles, light from streetlights, and light from commercial lighting sources.

An embodiment includes a method to encode a signature in light output from a light source, the output light being in the visible spectrum. The method includes the acts of loading a seed value in a linear feedback shift register (LFSR), the seed value arranged to produce a light signature formed as a sequence of bits exiting the LFSR, the light signature arranged to identify the light source, clocking the LFSR to output the light signature as a stream of binary bits, each exiting bit representing one bit of the light signature, passing each bit of the light signature stream to a code modulation state translator, and modulating light that is output from the light source according to the bits of the light signature stream wherein the modulated light is output at a first amplitude or a second amplitude based on a binary state of each bit of the light signature stream. In the method, the first amplitude can be about 95 percent of the nominal output of the light source and the second amplitude can be about 105 percent of the nominal output of the light source when the light source is perceived to be in an "on" state. Alternatively in the method, the first amplitude is less than 5 percent of the nominal output of the light source, and the second amplitude is less than 15 percent of the nominal output of the light source when the light source is perceived to be in an "off" state. The first and second amplitudes may respectively be even less than 1 percent and 5 percent of the nominal output of the light source when the light source is perceived to be in an "off" state (i.e., when a user sees the light as being off). In some cases, the LFSR is at least 24 bits wide. In some cases, the LFSR is configured to generate maximal length sequences (m-sequences).

In embodiments, a method to isolate an encoded light signature passed by at least one light source in a field of light includes a plurality of acts. The acts include periodically sampling light with an electronic sensor, passing light amplitude samples to a processing unit, each sample being a digital representation of an amplitude of sampled light, performing a transform-based computation using the light amplitude samples to identify at least one light amplitude peak that stands out from un-correlated noise, and matching the at least one light amplitude peak to a light source. The method may also include the acts of storing a set of constant values, the set of constant values representing results of transform computations on a set of light signatures, and in addition or in the alternative the method may also include correlating results of transform computations on the light amplitude samples with the set of constant values.

In embodiments of a method to isolate an encoded light signature passed by at least one light source in a field of light, a transform-based computation is included. The computation includes Correlations=IDFT(DFT(Samples)*$\overline{\text{DFT}}$(Code))

where

IDFT is an inverse discrete Fourier transform;
DFT is a discrete Fourier transform;
$\overline{\text{DFT}}$ is a complex conjugate DFT; and
Code is a light signature embedded in particular light samples.

The method in some embodiments also includes collecting a set of light amplitude peaks for the matched light sources, comparing a representation of the set of light amplitude peaks for the matched light sources to a set of thresholds, and providing an indication of failure of the matched light sources based on the comparison to the thresholds.

These features, along with other objects and advantages that will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings in which:

FIG. 3C illustrates a light fixture embodiment having light-encoding control circuitry;

FIG. 9A illustrates an encoded light signature detection module block diagram embodiment;

DETAILED DESCRIPTION

Figure 1:
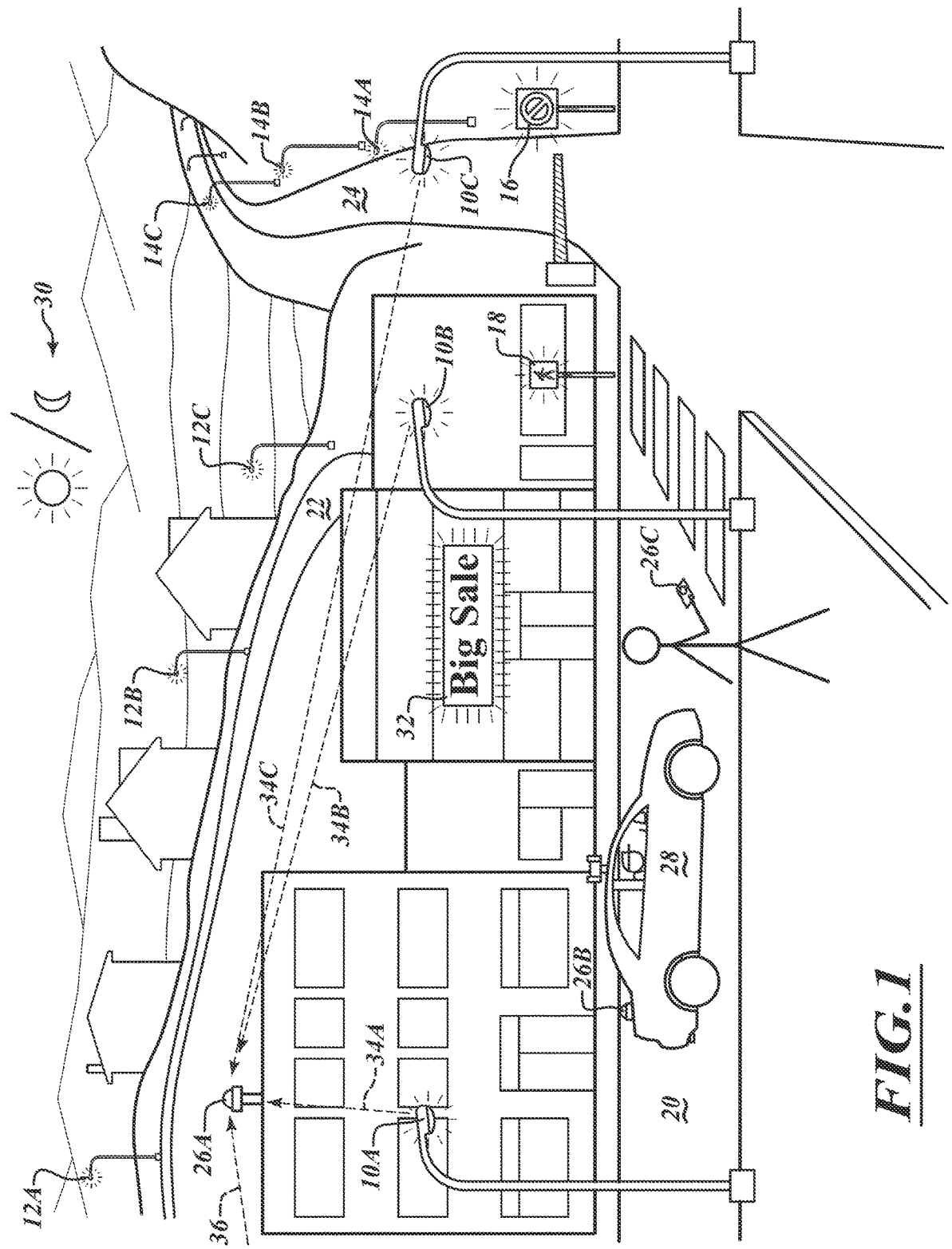
FIG. 1 illustrates several environments in which non-limiting embodiments of devices that produce and receive an encoded light signature may be employed.

Managing and maintaining lights and lighting systems is expensive and time consuming. In some cases, dedicated personnel monitor lights by making visual inspection. Visual inspection requires an inefficient use of resources, and visual inspection often fails to detect lighting problems quickly. In other cases, end-users are relied on to report lighting problems. As a result, the failure of individual light bulbs within the system may not be detected for a long time, and even if users of the light system notice that a light bulb has failed, the light bulb failure may nevertheless go unreported for a long time.

Relying on end-users to report problems generally creates incomplete and inconsistent reporting. Some conventional systems have been developed to address the problem of inconsistent reporting found in "visual-inspection-based" light systems. One system that has been developed is a "smart lights" system. In a smart light system, individual light bulbs or fixtures report their status to a central monitoring facility.

Smart light systems employ communication links between each individual light fixture and the central station. Failure detection in these systems is limited to monitoring internal characteristics of lights such as the amount of current delivered to the bulb. Conventional smart light systems do not measure the actual performance of the light bulbs with respect to the amount of light that is effectively delivered to the surrounding area. For instance, the light output of a particular street light may be reduced by poor performance of the street light's lens (e.g., due to clouding or aging), by vandalism (e.g., graffiti, scratching or other physical damage), by obstruction due to nearby overgrown vegetation, or by some other means. The conventional smart light system, which measures only internal properties of a light bulb or bulb fixture, fails to provide any knowledge of the effective light output that reaches street level. Another problem of a conventional smart light system is that a failure of the communication link or monitoring mechanism, when the failure is even detectable, necessitates a maintenance visit even if the light output itself is unaffected. Yet one more problem with a conventional smart light system is the high cost to purchase, install, and maintain the system.

The devices and methods to produce and receive an encoded light signature described in the present disclosure address the problems of conventional visual-inspection-based light systems and smart light systems. The signature encoded light system allows for periodic, episodic, occasional, and continuous remote monitoring of the actual effective light output of each individual light source in the lighting system. The system operates in the presence of other ambient light such as the sun, other light sources, reflections off of moving vehicles, etc. The signature encoded light system does not require communication links to individual light sources, and the new lighting may be implemented at low cost with little and in some cases no changes to existing light designs.

In a signature encoded light system, multiple light sources in the system can be monitored concurrently. A single detection system is arranged to receive the signature encoded light signal from a plurality of individual light sources, and accordingly, no monitoring equipment needs to be assigned to each individual light source. As a result, the single detection system can be used in an environment where individual light sources are geographically distributed (e.g., street lights), and the same detection system can be used to monitor all of the individual light sources in an environment where multiple light sources are located close to each other (e.g., a billboard, a pedestrian "walk/do not walk" sign, and the like). If an individual light source within the system has failed (partially or completely) or becomes obstructed, the monitoring system will recognize the problematic light source and provide a suitable indication.

In a signature encoded light system, the actual contribution of each encoded light source to the total illumination at a given point on the ground (or otherwise in an area of influence around the light source) can be easily measured independent of surrounding ambient light. Once the contribution of an individual light source is known, the contribution may optionally be compared to design or regulatory specifications.

One or more signature encoded light systems can be implemented in urban, suburban, and rural areas. The systems can operate independently or the systems can be configured to operate together. Multiple signature encoded light systems can operate in proximity to each other. One signature encoded light system can be arranged to detect a light signature from one light source or from several light sources.

FIG. 1 illustrates several environments in which non-limiting embodiments of devices that produce and receive an encoded light signature may be employed. The devices illustrated in FIG. 1 may be part of a single signature encoded light system or the devices may be parts of multiple signature encoded light systems.

Lights 10A-10C are light sources in a municipal, urban, high density area such as a city street 20. Light output from one light source will typically overlap light output from one or more other sources. This illumination overlap contributes to a well-lit city street, thereby providing safety, comfort, and other benefits to the residents and visitors of the city.

Lights 12A-12C are light sources in a suburban or rural area. In the suburban and rural areas, lights 12A-12C are typically but not exclusively located further from each other than lights in higher density environments. Lights 12A-12C may be located along a street 22 in more dangerous areas such as near corners, at the summits of hills, near driveways or intersections, near points of interest, and the like.

Lights 14A-14C are lights that provide illumination over a highway 24. The lights over the highway are typically mounted on higher stanchions than in rural or city environments, and such lights often provide more light output than other lights.

The light sources 10A-10C, 12A-12C, and 14A-14C output encoded light as part of a signature encoded light system. Embodiments of encoding mechanisms and processes will be described in the present disclosure. Particular detection devices, which detect signatures encoded in the light, will also be described.

The environments of FIG. 1 illustrate other light sources. A "Do Not Enter" sign 16 includes multiple light sources such as high power light emitting diodes (LED's). A "Walk/Don't Walk" pedestrian cross-walk sign 18 may be a backlit system having a single light source or a sign that uses multiple light sources. A private, commercial sign 32 is advertising an event. Sunlight and moonlight 30 are also shown. In some cases, the sun or moon provide the most light output to an area, and in other cases, light from the sun or moon is partially or totally obscured.

The light sources illustrated in FIG. 1 are non-limiting. Instead, the light sources of FIG. 1 are merely representative of the types of light sources that are conventionally employed in areas that are heavily developed and areas that are lightly developed. The light from the light sources may be of any wavelength (e.g., color). The light output from a source may be relatively constant, or the light output may vary based on the type of light, the time of day, environmental conditions that are exerted on the light, climate, and many other factors. A particular area may be subjected to light from only a single light source (e.g., a windowless room with one light source) or from a plurality of sources (e.g., a busy city street). Light from nearly any other type of source may be present in proximity to a functioning signature encoded light system; however, these many different types of light sources are not illustrated in FIG. 1 for simplicity. Furthermore, as will be described herein, light sources may be particularly encoded to work cooperatively in a signature encoded light system. One of ordinary skill in the art will recognize that the principles described herein may be incorporated into nearly any type of man-made light source, even those not explicitly illustrated or called out in the present disclosure.

Three light signature detection devices are illustrated in FIG. 1. A stationary light signature detection device 26A is illustrated atop a high-rise building. A vehicle-based light signature detection device 26B is illustrated is mounted on a police car 28. A mobile light signature detection device 26C is held in the hands of a person. Although the light signature detection devices 26A-26C of FIG. 1 are illustrated as including a sensor and all constituent parts, it is recognized that certain components of a light signature detection device may be remotely located from other components of the detection device.

FIG. 1 illustrates that light 34A-34C from each of the light sources 10A-10C, respectively, is detected at a sensor of the stationary light signature detection device 26A. Light 34A from light source 10A is detected. Light source 10A is closer to the light signature detection device 26A than light 34B from light source 10B and, and light 34C is further from the light signature detection device 26A than light from sources 10A and 10B. Accordingly, with respect to the amplitude of a received light signal, it would be expected that light source 10A provides a greater contribution of light than light sources 10B and 100, and light source 10B provides a greater contribution of light than light source 100 if the light output emanating from each of light sources 10A-10C is about the same.

The light signature detection device 26A is also exposed to ambient light 36 from many other sources. The ambient light 36 may come from the commercial sign 32, the sun and moon 30, reflections, automobile headlamps, other building lights, and many other sources. Although not illustrated for the sake of clarity in FIG. 1, it is recognized that light signature detection devices 26B, 26C illustrated in FIG. 1 will similarly receive encoded light from light sources such as 10A-10C, 12A-12C, and 14A-14C and un-encoded background light from many other sources.

In FIG. 1, a first signature encoded light system may include light signature detection device 26A and encoded light sources 10A, 10B, and 10C. Other systems may also include light signature detection device 26B and light signature detection device 26C and light sources 10A-10C and 12A-120, and in addition or in the alternative, light sources 14A, 14B, and 14C. The signature encoded light systems may be separate, or their coverage areas may overlap.

In the signature encoded light systems of FIG. 1, a light signature detection device is able to isolate and identify the light from a single encoded source that is part of the overall light received.

For example, the light signature detection device 26A receives an overall composite light signal made up of light in the visible spectrum from encoded lights and un-encoded lights. From this composite light signal, the light signature detection device 26A is configured to isolate the encoded signature from each encoded light source. Furthermore, the light signature detection device 26A is able to identify the relative strength (i.e., amplitude) within the composite light signal of the light contributed by each of the encoded light sources.

Adding more detail to the example, assume that the signature encoded light system of devices 26A and 10A-10C is operating at dusk. A light sensing component of the light signature detection device 26A receives a composite light signal having contributions in the visible spectrum from the setting sun, the rising moon, reflections off of buildings, terrain, and other structures, commercial vehicle headlights, taillights, strobe lights, etc., advertising signage, warning signs, private and commercial lighting, and many other sources including encoded light sources 10A-10C, which are street lights.

The light sensing component of the light signature detection device 26A is configured to provide a stream of digital light samples. Each sample represents the amplitude of the composite light signal at the moment the sample was captured. The samples can be averaged, and the average value is considered 100% of the received composite light signal.

The light signature detection device 26A will process the stream of samples from the light sensing component. The light signature detection device 26A is configured to identify a light signature from each of the encoded light sources 10A-10C. Upon identification, the amplitude of the light from the encoded light source relative to the amplitude of the composite light signal can be determined.

Figure 2A:
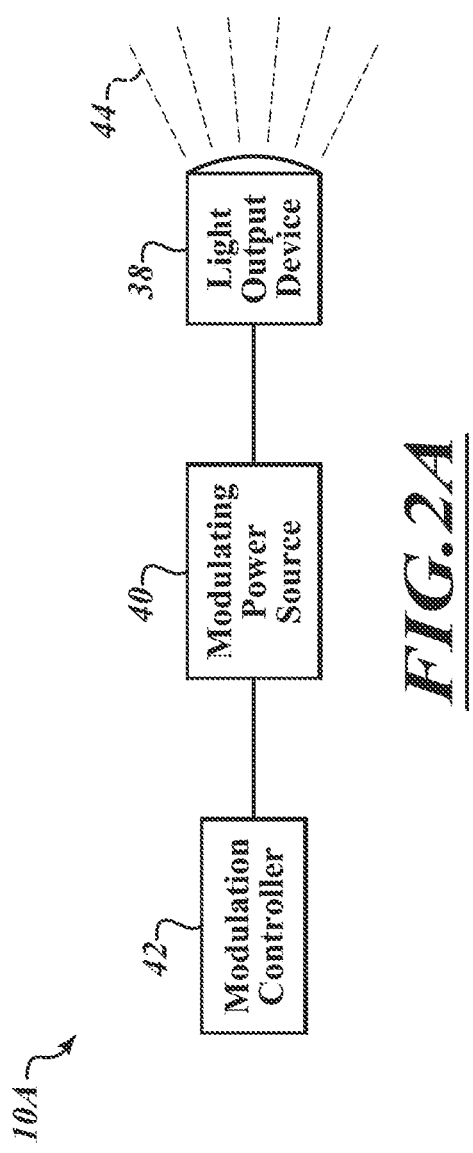
FIG. 2A illustrates components of a representative light source embodiment.

FIG. 2A illustrates components of a representative light source embodiment. The embodiment illustrated in FIG. 2A may be the encoded light source 10A street light of FIG. 1. In the light source 10A, a modulation controller 42 directs a mechanism to modulate the brightness or power state of a light output device 38. In this particular embodiment, the modulation controller 42 directs the operations of a modulating power source 40. The modulating power source 40 produces a signal that applies a modulated power signal (e.g., a switching voltage signal) to the light output device 38. The light output device 38 may comprise one or more light emitting diodes (LED's), mercury vapor lamps, halogen lamps, lasers, incandescent lamps, fluorescent lamps, or some other source capable of producing a light signal. In the embodiment of FIG. 2A, the light is produced in the visible spectrum, but other embodiments that produce an electromagnetic output in the non-visible light spectrum are also considered.

The light output device 38 produces a modulated light signal 44. The modulated light signal 44 is encoded with a light signature having a particular code and a particular phase directed by the modulation controller 42. The modulated light signal 44 may be the light signal 34A of FIG. 1.

It is understood that many lights of the type illustrated in FIG. 2A can be operated concurrently and within proximity of one or more light signature detection devices. In fact, a signature encoded light system may include dozens, hundreds, thousands, or even millions of light sources 10A. Within the system, many individual light sources may be modulated with different phases of a same, single code. Alternatively, or in addition, many individual light sources may be modulated with a different code. The technology provides the ability to uniquely (within a signature encoded light system) mark and discriminate each light source from each other light source as well as from ambient light noise. The light signature detection device is able to differentiate between the encoded light signals of multiple light sources.

Figure 2B:
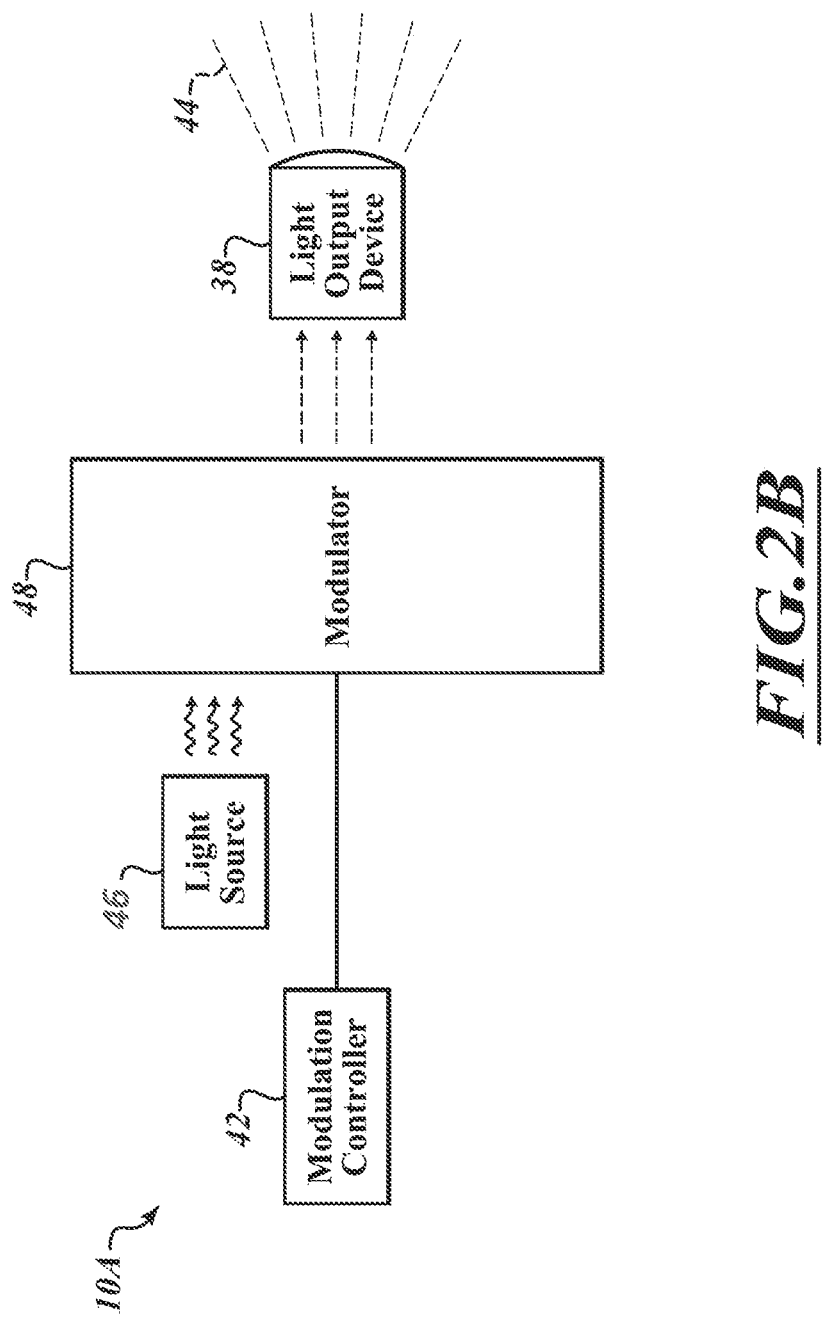
FIG. 2B illustrates components of another representative light source embodiment.

FIG. 2B illustrates components of another representative light source embodiment. The embodiment illustrated in FIG. 2A may be the encoded light source 10A street light of FIG. 1. In the embodiment, the modulation controller 42 is used in an optionally different way with a different modulation mechanism. In FIG. 2B, the modulation controller 42 directs a modulator 48 to optically encode the light from a fixed light output source 46. The modulated light signal from the modulator is passed to the light output device 38.

In other embodiments of an encoded light source a modulation controller and a modulation mechanism may be integrated into the light source itself, interposed between the light source and a socket, incorporated in the socket, incorporated into power or control supply wire or connections, or in any configuration whereby the modulation controller may interact with the modulation mechanism so as to effect brightness or duty cycle modulation of the light source.

Figure 3A:
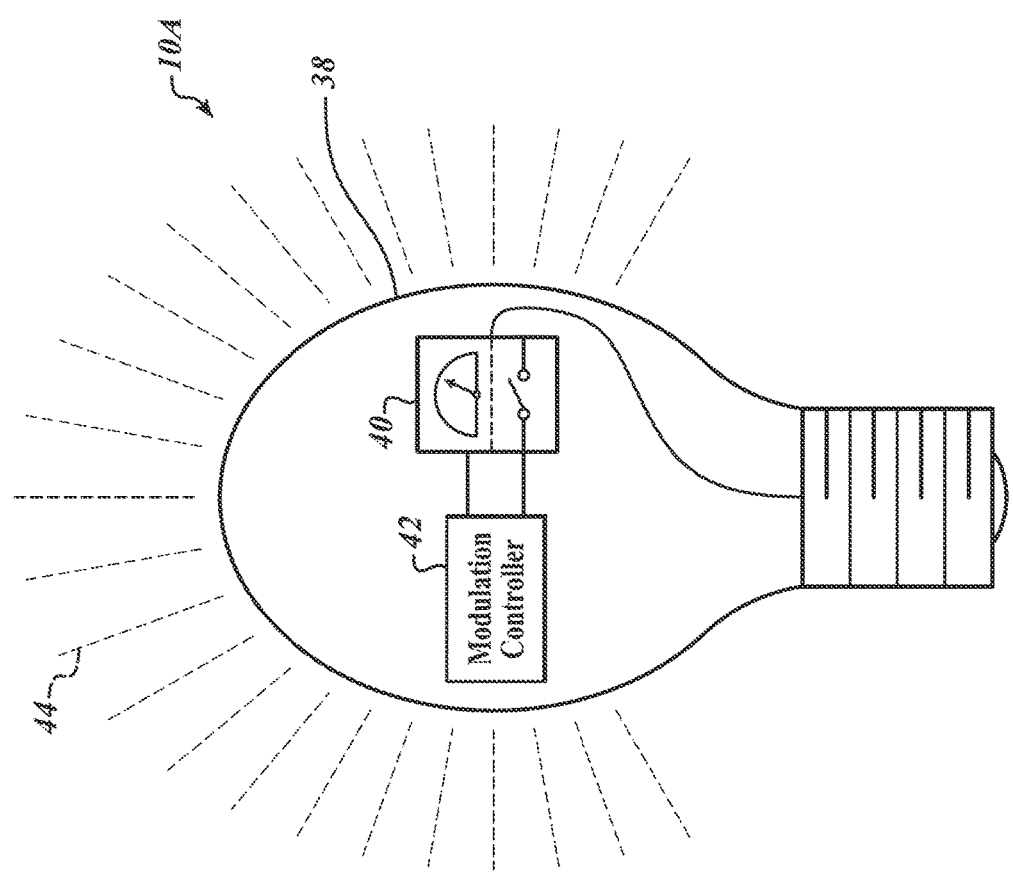
FIG. 3A illustrates a light source embodiment having integrated light-encoding control circuitry.
Figure 3B:
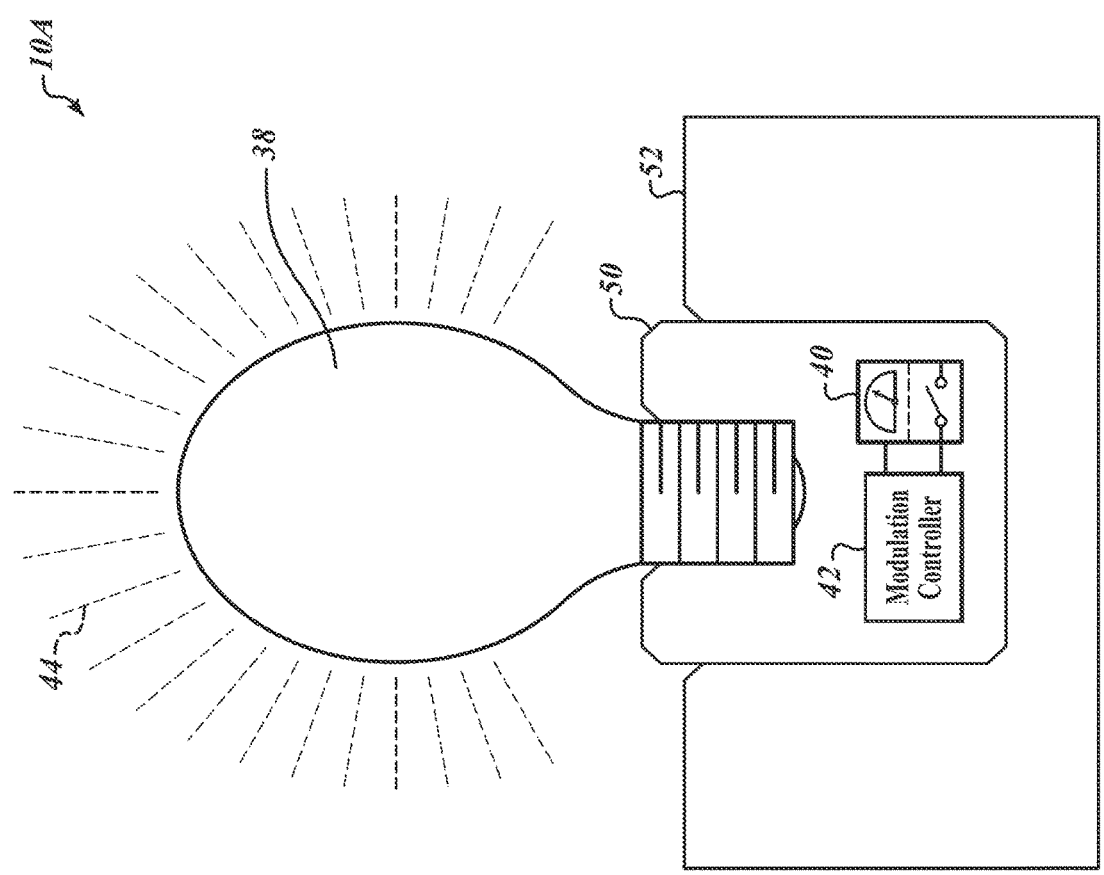
FIG. 3B illustrates an after-market light source socket embodiment having light-encoding control circuitry.

FIG. 3A illustrates a light source embodiment having integrated light-encoding control circuitry. FIG. 3B illustrates an after-market light source socket embodiment having light-encoding control circuitry. FIG. 3C illustrates a light fixture embodiment having light-encoding control circuitry.

In FIG. 3A, the light source 10A optionally has a shape of an incandescent bulb. Other lighting technologies (e.g., LEDs, halogen, etc.) and shapes are possible. In the embodiment, a modulation controller 42 directs the operation of a modulation mechanism; i.e., modulating power source 40. A light output device 38 receives the modulated power and outputs modulated light 44, which has embedded therein an encoded light signature of a particular phase. The light source 10A embodiment of FIG. 3A is a self-contained device. The light source 10A embodiment of FIG. 3A may be installed to replace a conventional light source in a conventional fixture. In such a case, a signature encoded light system may be constructed without any changes to the lighting infrastructure. That is, conventional bulbs may be replaced with light source 10A devices that output encoded light. When power is applied to the light source 10A of FIG. 3A, the light source 10A will generate the modulated signal that is output as modulated light 44.

FIG. 3B illustrates an after-market light source socket 50 embodiment having light-encoding control circuitry. One or more of the light sources 10A-10C, 12A-12C, and 14A-14C of FIG. 1 may comprise an embodiment as illustrated in FIG. 3B. In the embodiment, a conventional light fixture housing 52 is illustrated. The after-market light source socket 50 is cooperatively coupled to the housing 52. The after-market light source socket 50 includes a modulation controller 42 and a modulation mechanism. The modulation mechanism may be an electronic modulating power source 40 as illustrated in FIG. 3B, or the modulation mechanism may be another type of mechanism. A light output device 38 cooperates with the after-market light source socket 50. The light output device 38 may be a conventional light source that typically only produces un-encoded light. When the assembly comprising the housing 52, the after-market light source socket 50, and the light output device 38 is operated, the assembly will produce modulated light 44.

The cooperation between the devices of FIG. 3B may include mechanical cooperation and electronic cooperation. For example, the after-market light source socket 50 may be formed to fit into a socket of the housing 52, and the after-market light source socket 50 may be formed with a socket particularly sized and arranged to receive a conventional light output device 38.

FIG. 3C illustrates a light fixture embodiment having light-encoding control circuitry 54. One or more of the light sources 10A-10C, 12A-12C, and 14A-14C of FIG. 1 may comprise an embodiment as illustrated in FIG. 3C. The control circuitry in the light fixture 54 of FIG. 3C includes a modulation controller 42 and a modulation mechanism. The modulation mechanism is illustrated in FIG. 3C as an electronic modulating power source 40, but other modulating mechanisms are also considered.

Figure 4:
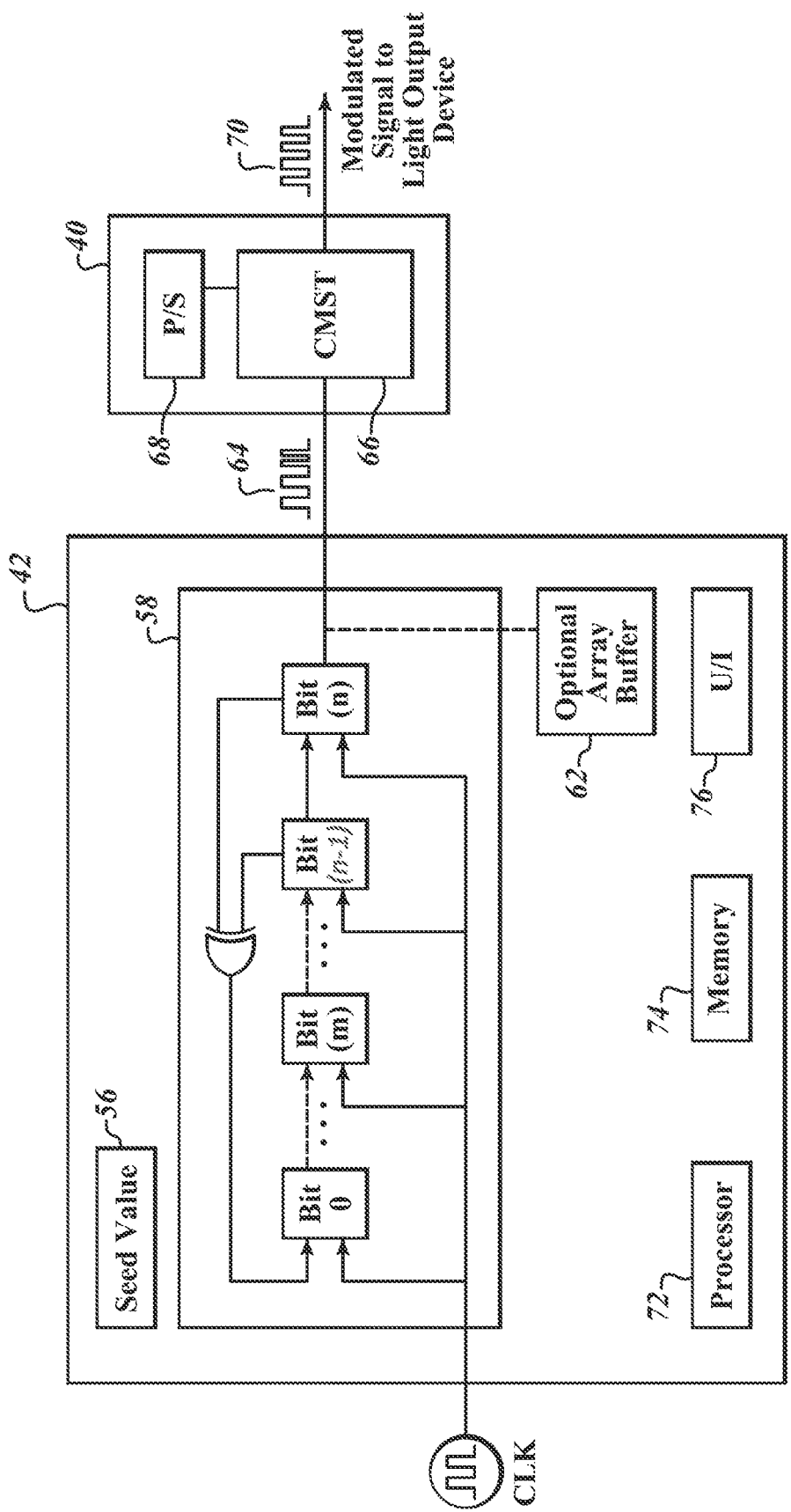
FIG. 4 illustrates a light-encoding modulation controller embodiment coupled to a modulating power source.

FIG. 4 illustrates a light-encoding modulation controller 42 embodiment coupled to a modulating power source 40. The modulating power source 40 comprises a power supply 68, a code modulation state translator module 66, and other modules not shown for simplicity. A modulation signal 64 is input to the modulating power source 40, and a modulated signal 70 is output.

The modulation signal 64, which is output from the modulation controller 42, includes encoded signature information. In many cases, the modulation signal is a digital stream of binary bits. Each bit of the digital stream represents a binary "1" or a binary "0," and sequences of bits in the stream represent the encoded signature. The signature may repeat in consecutive bit sequences, or the signature may repeat periodically wherein individual copies of the signature are separated by other bits. When the individual copies of the signature are separated, the intervening bits of the stream may include control information for the modulating power source 40, control information for another purpose, identification information used to match a modulating power source 40 or another device, or data information.

In other cases, the modulation signal 64 may be something other than a digital stream of binary bits. For example, the modulation signal 64 may be an analog signal. Alternatively, the modulation signal may take the form of discrete information associated with the encoded signature. In the cases described herein, the modulating signal 64 provided by the modulation controller 42 is arranged to be received and processed by an attached modulating power source 40 or another device (e.g., modulator 48 of FIG. 2B) such that a modulated signal 70 is produced. The modulated signal 70 is arranged to drive an output device such as light output device 38 (e.g., an LED, incandescent bulb, etc.).

In many cases, the modulating power source 40 is configured for a particular type of output technology. For example, an LED or LED array may be coupleable to a certain modulating power source 40. In such case, the modulating power source 40 will be arranged with a power supply 68 having particular capability to supply voltage and current to such an LED or LED array. In addition, the code modulation state translator 66 will be arranged to receive the input modulation signal 64 and generate an output modulated signal 70 having characteristics (e.g., switching speed, rise/fall time, thermal properties, voltage/current profile, and the like) that correspond to the chosen LED or LED array. In this way, other output technologies may also be coupled to particular modulating power source 40 embodiments configured for use with the chosen output device.

The modulation signal 64 is produced by the modulation controller 42 module. The modulation signal 64 may embed or otherwise provide a signal that embeds or describes an encoded signature. In some cases, the modulation controller 42 produces one encoded signature for one output device. In other cases, the modulation controller 42 can provide many encoded signatures for many output devices. Turning back to FIG. 1, each light source 10A-10C, 12A-12C, and 14A-14C may have a dedicated modulation controller 42 to provide an encoded signature that is transmitted in the light output from the respective light source. Alternatively, or in some cases in addition, a single modulation controller 42 may produce encoded signature modulation signals 64 for a plurality of light sources.

In the embodiment of FIG. 4, a linear feedback shift register (LFSR) 58 module is configured within a modulation controller 42 module. A seed value device 56 provides an initial value for the LFSR 58 module. The seed value device 56 may be a physically separate repository, one or more registers of a bank of registers, a storage location within a memory 74, or a set of switches, input pins, or another hardware input means. The seed value device 56 may also be some other mechanism arranged to load the LFSR 58 module during an initialization phase.

The modulation controller 42 optionally includes a processor 72, an array buffer 62 to store output data from LFSR 58, a user interface 76, and other modules not shown in FIG. 4 for the sake of simplicity. When included, the processor 72 directs operations of the modulation controller 42.

The LFSR 58 module in FIG. 4 includes a series of one-bit storage cells (e.g., flip-flops in digital logic, bits in a microprocessor register, and the like) arranged so that the output of one cell drives the input of the next. In LFSR 58, the storage cell "Bit 0" is followed by some number of one-bit cells, "Bit (m)," followed by some number of one-bit cells, "Bit (n−1)," and "Bit (n)." The LFSR 58 further includes a set of "taps" and some form of combinatorial logic to provide "linear feedback" to the input of the LFSR 58.

A tap is a mechanism to retrieve a current bit from one of the cells. As illustrated in FIG. 4, Bit (n−1) and Bit (n) are tapped. In other LFSR embodiments, other bits may be tapped in addition to or alternatively to Bit (n−1) and Bit (n). The tapped bits provide input into the exclusive-or (XOR) combinatorial logic. Other types of logic may also be used. The output of the XOR gate combinatorial logic is passed to the input LFSR 58.

In an example embodiment now described, there are four (4) storage cells in an LFSR 58 module. Accordingly, in the LFSR 58 module, "m" is "1" and "n" is "3." Thus, the LFSR 58 module in the exemplary embodiment includes storages cells Bit 0, Bit 1, Bit 2, and Bit 3. The LFSR 58 in the present example is a 4-bit LFSR.

The state of any shift register, including an LFSR, can be represented as a list of the possible bit values. Conventionally, bits shift from left to right. Accordingly, when considered as a set of binary values, a shift register of length "n" has "$2^n$" possible states. For n=4, as in the present example, the possible states are:

TABLE 1

Possible states of a 4-bit shift register

| | | | |
|---|---|---|---|
| 0000 | 0001 | 0010 | 0011 |
| 0100 | 0101 | 0101 | 0111 |
| 1000 | 1001 | 1010 | 1011 |
| 1100 | 1101 | 1101 | 1111 |

Distinguishing an LFSR from an ordinary shift register, not all possible states are necessarily available to the LFSR. Since the input of the LFSR is determined by the placement of the taps and the combinatorial logic applied, it is possible that an LFSR is unable to achieve some particular states. For example, if the LFSR 58 of FIG. 4 included a simple AND gate instead and XOR gate, and if the LFSR 58 was initialized with a seed value of "1111," then the state output from such an LFSR would perpetually remain at 1111. Accordingly, it is understood that the sequence of bits shifted to the output of an LFSR can be fully characterized by specifying the number of bits in the LFSR, the number and location of the taps, the combinatorial logic, and the initial (i.e., seed) state of the LFSR.

An LFSR produces a repeating output sequence. That is, the sequence output by a given LFSR configuration is cyclical. The input bit to the LFSR is dependent only upon the current state of the LFSR, and there are a finite number of states available to the given LFSR. Thus, an LFSR will eventually return to its seed state thereby allowing the output sequence to repeat. Not every LFSR tap configuration will allow the LFSR to reach every possible state. Stated differently, depending on the tap configuration, some possible states of an n-bit LFSR are not available states.

On the other hand, with certain LFSR tap configurations, every possible register state (or nearly every state) is available and every possible state (or nearly every state) is entered before the LFSR returns to the seed state. These LFSRs with the certain tap configurations generate output bit sequences known as maximal length sequences, or "m-sequences." In LFSRs that produce m-sequences, there are an even number of taps, and the taps include the right-most bit. Tables of these certain tap configurations that will produce m-sequences are readily available.

It has been recognized that m-sequences have properties which make them particularly suited as modulation sequences for signature encoded light systems. For example, m-sequences produce favorable run-length distribution (i.e., consecutive occurrences of "1's" and "0's). In an m-sequence, one half of the runs are length 1, one quarter of the runs are length 2, one eighth of the runs are length 3, etc. This distribution leads to improved power efficiency, interference avoidance, bit detection, timing characteristics, and other benefits. In more detail, due to the run-length distribution, an m-sequence produces a minimum possible autocorrelation at all phase offsets other than zero, which provides a minimum possible cross-talk between light signals. Furthermore, m-sequences contain exactly 1 more "1" bit than "0" bits. Thus, as the length of the m-sequence increases, the 1:0 ratio rapidly approaches fifty percent.

Another benefit of m-sequences is that long signature sequences can be produced. A 63-bit LFSR is capable of generating a 9 quintillion bit m-sequence (i.e., ($2^{63}-1$)). M-sequences also permit compact representation. A unique m-sequence and phase can be specified with two small integers. For example, (63,62) refers to a 63-bit LFSR, tapped at bits 63 and 62. Adopting the convention that the tap list is also a list of set values in the seed provides the specification of a phase of the m-sequence. An arbitrary phase can be represented with a full 63-bit representation of the seed value, but this 63-bit value is still quite compact given the length of the resulting code (e.g., 9 quintillion bits).

Yet one more benefit of m-sequences is that LFSRs are generally compact and fast in either software or hardware implementations. Often, an LFSR is implemented in only 2 gates per bit in hardware. Software LFSR embodiments are also compact and fast with some typical implementations having space requirements of about one bit per LFSR m-sequence bit. Hardware LFSRs produce one m-sequence bit per clock cycle, and typical microprocessors can typically generate at least one m-sequence bit per clock cycle.

The example embodiment having four (4) storage cells in an LFSR 58 module is again considered. In the example LFSR 58 module, "m" is "1" and "n" is "3," so the exemplary embodiment of the 4-bit LFSR 58 includes storage cells Bit 0, Bit 1, Bit 2, and Bit 3.

Assume in the example a first state when seed value "1011" is loaded into the LFSR 58. In a second state, an output "1" is passed from the LFSR 58, and an input "0" is passed from the XOR gate. Accordingly, a second state of the LFSR 58 is "0101". In a third state, an output "1" is passed from the LFSR 58, and an input "1" is passed from the XOR gate. The third state of the LFSR 58 is "1010." Each of the available $2^n-1$ (i.e., 15) states of the LFSR 58 is shown in Table 2.

TABLE 2

States of (4, 3) LFSR

| Step # | LFSR State | Input Bit | Output Bit |
|---|---|---|---|
| 1 | 1011 | 0 | 1 |
| 2 | 0101 | 1 | 1 |
| 3 | 1010 | 1 | 0 |
| 4 | 1101 | 1 | 1 |
| 5 | 1110 | 1 | 0 |
| 6 | 1111 | 0 | 1 |
| 7 | 0111 | 0 | 1 |
| 8 | 0011 | 0 | 1 |
| 9 | 0001 | 1 | 1 |
| 10 | 1000 | 0 | 0 |
| 11 | 0100 | 0 | 0 |
| 12 | 0010 | 1 | 0 |
| 13 | 1001 | 1 | 1 |
| 14 | 1100 | 0 | 0 |
| 15 | 0110 | 1 | 0 |

If Table 2 is extended to show step 16, step 16 will be a repeat of step 1. Similarly, step 17 will be a repeat of step 2, and so on.

The sequence of $2^n-1$ (i.e., 15) bits in the "Output Bit" column is the m-sequence. A close inspection of the table reveals how the seed value stored in seed value device 56 controls the m-sequence phase of the LFSR 58 module. It is recognized that all possible seed values produce the same m-sequence. It is also recognized, however, that the starting seed value determines the output phase. The m-sequence is output from the LFSR, bit-by-bit, upon each pulse of the input clock. The m-sequence from Table 2 is illustrated in Table 3.

TABLE 3 m-sequence of a (4, 3) LFSR

| Step Number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Phase Offset | 0 | 1 | 2 | 3 | 4 | 5 | 6 | 7 | 8 | 9 | 10 | 11 | 12 | 13 | 14 |
| m-sequence | 1 | 1 | 0 | 1 | 0 | 1 | 1 | 1 | 1 | 0 | 0 | 0 | 1 | 0 | 0 |

Carrying the example embodiment having four (4) storage cells in an LFSR 58 module even further, the 15-bit m-sequence is described in the signature encoding of three light sources, 10A-10C (FIG. 1). Each light is encoded with a different phase of the m-sequence.

may be modulated between full-off and full-on according to the bits in the m-sequence, with each light source being assigned a different phase offset. Alternatively, each light source 10A-10C may be modulated between "more on" and "less on."

For the purposes of the example, each light source is coordinated so that the lights change modulation state together, however this is not necessary. That is, in one embodiment, a single modulation controller 42 may provide the modulation signals used to drive each light source. In this case, the single modulation controller 42 coordinates the differently phased outputs such that each output is coordinated with each other. In another embodiment, each light source 10A-10C has a dedicated modulation controller 42. In this case, the separate modulation controllers 42 may be coordinated via real-time clocks, synchronization signals, or by some other means. Alternatively, the modulation controllers may not be coordinated at all with each other, and instead the modulation controllers may use different techniques to distinguish each light source such as selecting phases that are not likely to overlap. In addition, or as another alternative, the light signature detection device may isolate the different encoded signatures based on probabilities or on deliberate or incidental frequency or phase drift, hopping, or overlap, or based on some other means.

Table 4 illustrates the identifiers, the different phases of the m-sequence signature that are assigned to each light source 10A-10C, and the sequence of bits used to modulate each light source 10A-10C. With respect to the sequence of bits, the LFSR 58 module step number is also called out, and step 1 is particularly identified for reference within the m-sequence.

TABLE 4

Encoded signature (m-sequence) used to modulate each light source

| Light ID | Light Source | Phase Offset | Encoded signature (m-sequence) | | | | | | | | | | | | | | |
|---|---|---|---|---|---|---|---|---|---|---|---|---|---|---|---|---|---|
| 1 | 10A | 3 | 4 | 5 | 6 | 7 | 8 | 9 | 10 | 11 | 12 | 13 | 14 | 15 | 1 | 2 | 3 |
|   |     |   | 1 | 0 | 1 | 1 | 1 | 1 | 0  | 0  | 0  | 1  | 0  | 0  | 1 | 1 | 0 |
| 2 | 10B | 8 | 9 | 10 | 11 | 12 | 13 | 14 | 15 | 1 | 2 | 3 | 4 | 5 | 6 | 7 | 8 |
|   |     |   | 1 | 0  | 0  | 0  | 1  | 0  | 0  | 1 | 1 | 0 | 1 | 0 | 1 | 1 | 1 |
| 3 | 10C | 9 | 10 | 11 | 12 | 13 | 14 | 15 | 1 | 2 | 3 | 4 | 5 | 6 | 7 | 8 | 9 |
|   |     |   | 0  | 0  | 0  | 1  | 0  | 0  | 1 | 1 | 0 | 1 | 0 | 1 | 1 | 1 | 1 |

FIG. 1 illustrates a light signature detection device 26A configured to measure a total brightness of light incident on an associated sensor. Each of the light sources 10A-10C outputs light that is received and processed by the light signature detection device 26A. Each light source 10A-10C

With respect to FIG. 4, as configured in the example to include a 4-bit LFSR, a seed value of "1011" is retrieved from the seed value device 56 and loaded into the LFSR 58. The operations to initialize the LFSR 58 with the seed value are directed by the processor 72 using instructions retrieved from memory 74. A clock is applied to the LFSR 58 and bits of the m-sequence are output. The bits may be captured in the optional array buffer 62. In some embodiments, the bits are captured and stored according to a phase of the m-sequence.

The modulation signal 64 is output from the modulation controller 42 according to a chosen phase. In FIG. 4, the modulation signal 64 is applied to a modulating power source 40. The modulating power source 40 translates the modulation signal 64, as necessary, according to time, amplitude, and other characteristics with the cooperation of a power supply 68. An output signal 70 is applied to an associated light output device. The output signal 70 includes the encoded light signature that is passed as modulation signal 64.

In the example, an output signal that includes the 15-bit m-sequence, shifted to phase three (3), is applied to light source 10A. An output signal that includes the 15-bit m-sequence, shifted to phase eight (8), is applied to light source 10B. An output signal that includes the 15-bit m-sequence, shifted to phase nine (9), is applied to light source 100. Each of the respective lights sources will use the output signal 70 to switch between light output amplitude states corresponding to binary "1" and binary "0" in the output signal 70. The rate of switching is fast enough that the switching cannot be perceived by an average human visual system. Accordingly, the light output from each of light sources 10A-10C appears to be the same as from a conventional light source.

Switching the output signal between binary "1" and binary "0" states may be carried out by turning a light source full-on and turning the light source full-off. Alternatively, the light source may be turned "more on" and then turned "less on." In one example, a binary "1" is assigned to be 105 percent of the nominal light output of the light source, and a binary "0" is assigned to be 95 percent of the nominal light output of the light source. These modulation states are illustrated in Table 5.

TABLE 5

Exemplary Modulation States

| Code State | Modulation State |
|---|---|
| 0 | 0.95 * nominal output |
| 1 | 1.05 * nominal output |

It is understood that a modulation state may be suitably determined as a binary number, a percentage of nominal output, or by some other convention. A modulation bit having a code state of binary "1" may be output as a binary "1," a binary "0," a percentage above a nominal output, a percentage below nominal output, or by some other convention. If a light source adopts any particular convention, it is expected that a light signature detection device will operate according to the same convention. The particular convention may be user configurable.

Furthermore, other conventions may also be used. In one example a light source may output an encoded light signature as indicated in Table 5 in one case when the light source is perceived as "on." In other cases, the same light source may output its encoded light signature when the light source is perceived as "off." For example, during daytime, a very low power output may be used to output an encoded light wherein a binary "0" may be encoded with zero to five percent (0%-5%) of nominal output, and a binary "1" may be encoded with less than ten percent (10%) or fifteen percent (15%) of nominal output. In such cases, the signature light output may be repeatedly output.

In yet another case, when a light source is perceived as "on" and producing visible light, one light signature encoding scheme may be used. Then, when the light source is perceived as "off" and not producing visible light, a reciprocal light signature encoding scheme may be used. In the reciprocal scheme, the duration of each "on" state of light output becomes an "off" state, and vice versa with each "off" state. In this way, a decoder (i.e., detection device) may operate without change other than detecting "off" states instead of "on" states. Alternatively, a decoder may operate to detect both schemes such that lights that are expected to be visible "on" but are instead visibly "off" may still be detected.

It is thus recognized that many different conventions and modulation techniques can be used to represent binary states. The chosen conventions may permit several different light encoding systems to operate in proximity to each other. The chosen conventions may also permit encoded light sources and light decoding apparatus to be separately designed, manufactured, installed, and maintained according to standardized conventions.

The modulation signal 64 from the modulation controller 42 may include additional information. The output signal from the modulating power source 40 may alternatively or in addition include additional information. The additional information may be control information or data. The additional information may also be a steady-state output to raise the duty cycle of the light output device 10A-10C to produce more light.

A user interface 76 in the modulation controller may include input devices, output devices, or both input and output devices. The user interface 76 may permit a user to load a seed value, reset the controller, monitor the modulation signal 64, direct additional data or control information that is included in the modulation signal 64, and many other purposes. In some cases, a bidirectional communication path exists between the modulation controller 42 and a modulating power source 40 or other modulation device. In such cases, the user interface may further direct and monitor operations in an associated modulating power source 40 or other modulation device.

The light 34A-34C that is output from light sources 10A-10C, respectively, includes encoded light signatures embedded therein. When the light is received, a light signature detection device 26A is configured to isolate and identify the encoded light signatures. That is, the light signature detection device is configured to recognize in a composite light signal, the light contribution from each of light sources 10A-10C by isolating the differently phased m-sequence signatures encoded into each light signal.

Figure 5:
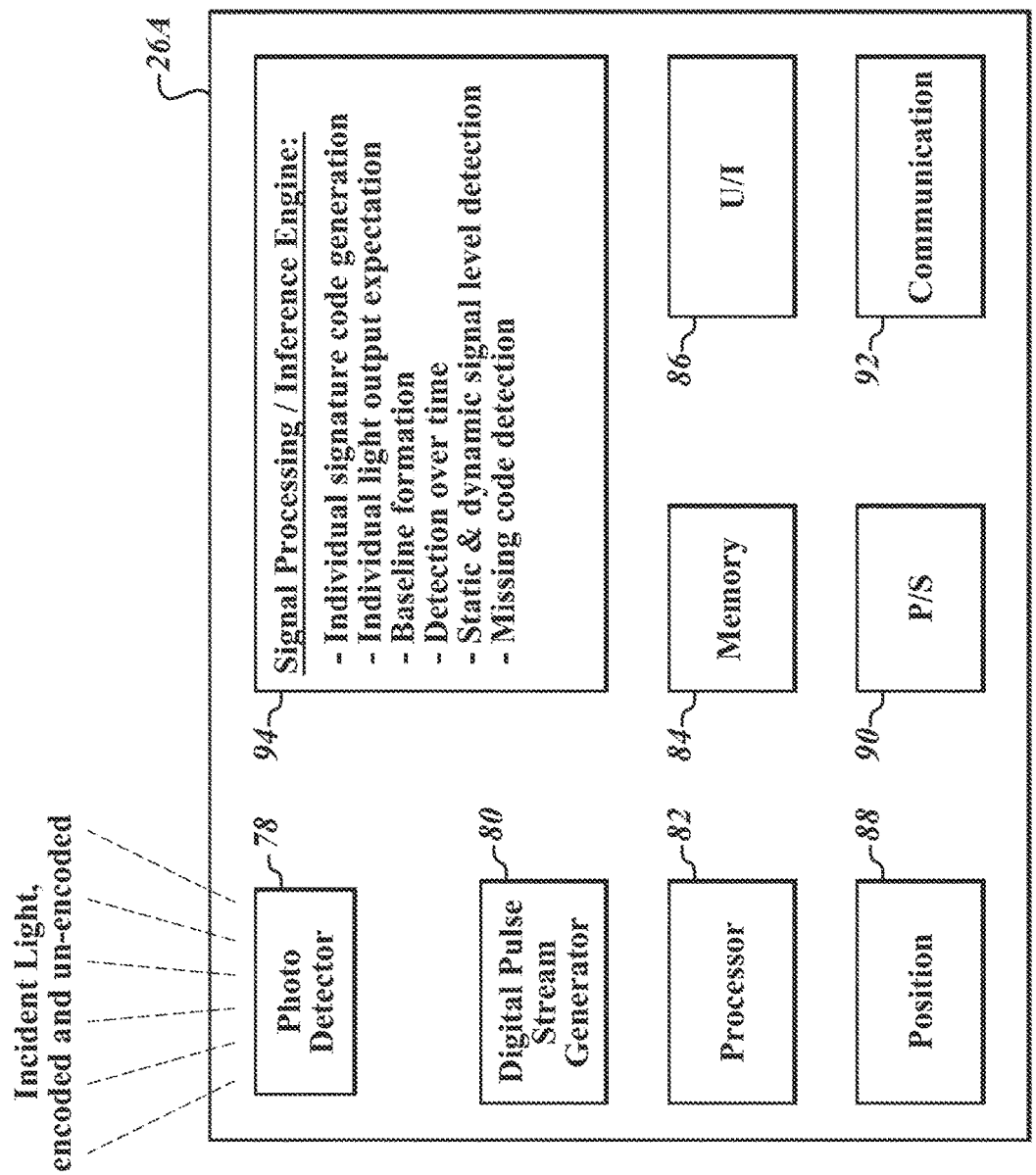
FIG. 5 illustrates a module to detect encoded light signatures.

FIG. 5 illustrates a module to detect encoded light signatures 26A. The particular module 26A is the stationary light signature detection device illustrated in FIG. 1; however, the understanding of FIG. 5 may be applied to the light signature detection devices 26B, 26C and other light signature detection devices as well.

The light signature detection device 26A includes a photo detection device 78, a digital pulse stream generator module 80, a processor 82, a memory 84, a user interface 86, a position module 88, an optional power supply 90, a communication module 92, and a signal processing/inference engine 94. Other modules typically present in conventional computing devices are not shown for simplicity. Additionally, communicative buses and other hardware components that facilitate the cooperation of modules within the light signature detection device 26A are also not shown for simplicity.

In FIG. 5, incident light comprising modulated light and un-modulated light (i.e., light having encoded signatures embedded therein and light that does not have any encoded components, respectively) is received by a photo detector 78. The incident light received by the photo detector 78 generally appears as a single, composite light signal, and the individual modulated and un-modulated light components of the composite light signal are often visually imperceptible.

The photo detector 78 may be integrated within the light signature detection device 26A, or the photo detector 78 may be located remotely. The photo detector 78 captures electronic representations of the incident light that strikes the photo detector 78. In one embodiment, the photo detector 78 is a TEXAS INSTRUMENTS MONOLITHIC PHOTO-DIODE AND SINGLE-SUPPLY TRANSIMPEDANCE AMPLIFIER, part number OPT101.

The photo detector 78 in the embodiment of FIG. 5 is configured to provide voltage samples at a particular rate. In one case, the photo detector 78 provides voltage samples at a rate of up to 14,000 samples per second. A voltage sample represents the amplitude of all of the light incident upon the photo detector 78 at the time the sample is taken. In some cases, the photo detector 78 detects light within the visible spectrum. In other cases or in addition, the photo detector 78 detects light that is outside the visible spectrum. Particularly, the photo detector 78 detects electromagnetic energy within a determined wavelength range. In one case, the photo detector 78 detects electromagnetic energy of wavelengths between about 200 nanometers and 1100 nanometers.

Voltage samples from the photo detector 78 are received and processed by a digital pulse stream generator module 80. The digital pulse stream generator module 80 may include a bandwidth filter to limit the range of the input voltage samples. In other cases, the voltage range of the samples are limited by the photo detector 78.

In many cases, the voltage samples are analog samples, and the digital pulse stream generator 80 includes an analog-to-digital converter (A2D) to convert the analog samples to digital samples. In other cases, the photo sensor 78 includes an A2D, and digital samples are provided to the digital pulse stream generator module 80. In either case, the digital pulse stream generator module 80 provides a stream of digital samples wherein each sample represents the amplitude of an entire light signal incident on a photo sensor (e.g., photo detector 78) at a particular point in time. In some cases, collections of samples are averaged or otherwise mathematically combined. The consolidation of measured samples may be performed to reduce the number of samples provided while providing increased accuracy during the range of time that samples are consolidated. The digital samples of the stream are subsequently analyzed to isolate and identify individual light signals having encoded light signatures embedded therein.

The light signature detection device 26A includes a processor 82 to direct the operations of the light signature detection device. A memory 84 stores software instructions executable by the processor 82 and data associated with the process of detecting light signatures.

The light signature detection device 26A includes an optional user interface 86, which module includes one or more input devices, one or more output devices, or a combination of input and output devices. The input devices may include keyboards, keypads, buttons, switches, remote control mechanisms, and the like. The output devices may include displays, annunciators (e.g., light and sound), printing mechanisms, and the like. The user interface 86 permits information passage between a light signature detection device 26A and a user. The information may be communicated directly to a human user (e.g., visual indicators, audible indicator, and the like), and the information may be communicated electronically (e.g., via a computing device).

An optional position module 88 may determine a geographic location of the light signature detection device 26A. The position module 88 may facilitate determination of the geographic location of one or more light sources. In some cases, the geographic location may be calculated, and in other cases, the geographic location may be received from outside the light signature detection device 26A and stored via the position module.

In some embodiments, the position module 88 is aware of the geographic or relative position of one or more light sources. In such cases, the position module may use the position information to calculate expected results associated with light signals output from a given light source. For example, in one embodiment, a position of a light signature detection device 26A is known, and a position of a particular light source is stored or calculated. In such case, if particular characteristics of the light source are also known such as an expected light output, then such information may be used to calculate and expected light contribution of the given light source on the photo detector 78.

The light signature detection device 26A may include a power supply 90 arranged to supply one or more power signals to modules within the detection device.

A communication module 92 includes one or more interfaces arranged to pass information between the light signature detection device 26A and electronic devices remote to the light signature detection device 26A. The communication module 92 may include known communication interfaces and protocols such as universal serial bus (USB), WiFi (e.g., IEEE 802.11), Bluetooth, Ethernet, controller area network bus (i.e., CANbus), and the like.

The light signature detection device 26A includes a signal processing/inference engine 94 module. Amongst its other functions, as described herein, the signal processing/inference engine 94 may include logic for individual signature code generation, individual light output expectation, baseline formation, detection over time, static & dynamic signal level detection, missing code detection, and other functions. In some embodiments, the light signature detection device 26A includes or cooperates with modules that enable greater functionality.

For example, in a system with hundreds or thousands of light sources, a central monitoring station will track the individual status of each light source. In such cases, the central monitoring section of the system will generate, assign, or otherwise maintain information associating each light source with its system-wide unique signature. In an embodiment, an individual signature code generation module may enable the assignment of signatures to some or all of the light sources. The central monitoring station in the embodiment may further maintain information related to the individual light output of individual light sources. Using either or both static and dynamic signal level detection, the system can form and maintain baseline information, expectation information, and other types of information related to individual light sources and groups of light sources. By tracking individual light source output over time, the central monitoring station may provide status information, maintenance information, efficiency information, and other data related to the performance of the entire system or individual components (e.g., light sources) of the system. Since information related to each light source is maintained, the system is able to detect missing signature codes to identify light source failures or other problems, and the system is even able to predict future problems with individual light sources. The information generated and maintained by the signal processing/inference engine 94 module may be presented automatically or by request in electronic reports, status alerts, short messages, or in some other format.

The signal processing/inference engine 94 of FIG. 5 is further arranged to process the stream of digital samples provided by the digital pulse stream generator module 80. Each sample represents an amplitude measurement of an entire light signal incident on a photo sensor at a particular point in time. The digital samples of the stream are subsequently analyzed to isolate and identify individual light signals having encoded light signatures embedded therein.

An example embodiment has previously been described herein with respect to FIG. 4. In the example embodiment, an LFSR 58 module includes four (4) storage cells (i.e., with respect to FIG. 4, m=1 and n=3). The 4-bit LFSR in the example is employed in a signature encoded light system of FIG. 1, wherein three light sources 10A-100 are assigned different phases of an m-sequence. Table 3 is the m-sequence produced by the particular LFSR 58; Table 4 calls out the individual light source assignment, phases, and m-sequence modulation codes of an associated encoded signature. The same 4-bit LFSR example is now analyzed with respect to an exemplary light signature detection device 26A.

In the example, each light source 10A-10C is analyzed as if a modulation bit "1" causes the light source to be full-on and as if a modulation bit "0" causes the light source to be full-off. It is recognized the modulation bits may be otherwise applied such that a light source is either "more-on" or "less-on" (e.g., Table 5), however, the analysis using a light source that is either full-on or full-off is presented for ease in understanding. Also for ease in understanding, the analysis of operations in the exemplary light signature detection device 26A is undertaken as if each received light sample is captured synchronously with the modulation of each bit by the light sources 10A-10C. That is, in the example, each light source 10A-10C will modulate a bit of the encoded signature in synchronization with each other light source, and the light signature detection device 26A will capture a sample in synchronization with each of the light source modulated bits. Furthermore, for ease in understanding the operation of the light signature detection device 26A, only light from light sources 10A-10C will be considered in the first portion of the analysis. The addition of ambient light from other sources will be considered later.

Table 6 represents a relative brightness of light incident upon a photo sensor 78. A nominal value of light is assigned a value of 1.0. Light source 10A, which is closest to the photo sensor 78 produces an output value of 1.1, Light source 10B, which is further from the photo sensor 78 than light source 10A, produces an output value of 0.7, and light source 10C, which is furthest from the photo sensor 78 produces an output value of 0.2.

TABLE 6

Light Output from Light Sources 10A-10C

| Light ID | Brightness Incident on Photo Detector 78 |
| --- | --- |
| 10A | 1.1 * nominal output |
| 10B | 0.7 * nominal output |
| 10C | 0.2 * nominal output |

Table 7 represents light received at the photo sensor 78. In the example, each light source is switched between full-on and full-off. Accordingly, each light source 10A-10C will output its full relative brightness when a modulated signature bit is "1" and output no light when a modulated signature bit is "0."

TABLE 7

Light Source 10A-10C Output and Light Received at Photo Sensor 78

| Ref. No. | Sample No. | 1 | 2 | 3 | 4 | 5 | 6 | 7 | 8 | 9 | 10 | 11 | 12 | 13 | 14 | 15 |
| --- | --- | --- | --- | --- | --- | --- | --- | --- | --- | --- | --- | --- | --- | --- | --- | --- |
| 10A | Output | 1.1 | 0 | 1.1 | 1.1 | 1.1 | 1.1 | 0 | 0 | 0 | 1.1 | 0 | 0 | 1.1 | 1.1 | 0 |
| 10B | Output | 0.7 | 0 | 0 | 0 | 0.7 | 0 | 0 | 0.7 | 0.7 | 0 | 0.7 | 0 | 0.7 | 0.7 | 0.7 |
| 10C | Output | 0 | 0 | 0 | 0.2 | 0 | 0 | 0.2 | 0.2 | 0 | 0.2 | 0 | 0.2 | 0.2 | 0.2 | 0.2 |
| 78 | Rcvd | 1.8 | 0 | 1.1 | 1.3 | 1.8 | 1.1 | 0.2 | 0.9 | 0.7 | 1.3 | 0.7 | 0.2 | 2.0 | 2.0 | 0.9 |

The signal processing/inference engine 94 module is configured to recover the individual contribution of each light. In a first act of the present example, the signal processing/inference engine 94 retrieves or creates a local copy of the m-sequence with a phase offset of 0. Subsequently, the signal processing/inference engine 94 represents each modulation "1" as a "+1," and each modulation "0" as a "−1" as illustrated in Table 8.

TABLE 8

Local Image Representation of m-sequence

| Step Number | 1 | 2 | 3 | 4 | 5 | 6 | 7 | 8 | 9 | 10 | 11 | 12 | 13 | 14 | 15 |
| --- | --- | --- | --- | --- | --- | --- | --- | --- | --- | --- | --- | --- | --- | --- | --- |
| m-sequence | 1 | 1 | 0 | 1 | 0 | 1 | 1 | 1 | 1 | 0 | 0 | 0 | 1 | 0 | 0 |
| Local image | 1 | 1 | −1 | 1 | −1 | 1 | 1 | 1 | 1 | −1 | −1 | −1 | 1 | −1 | −1 |

In a next act of the present example, the signal processing/inference engine 94 module is configured to multiply each element of the local image representation with each corresponding sample value measured by the photo sensor 78. That is, step number 1 of the local image is multiplied with photo sensor 78 sample value number 1, step 2 with sample 2, and so on. This set of products is then calculated for each successive cyclical phase shift of the m-sequence as described in the following paragraphs. Accordingly, in the present example, fifteen (15) products are calculated for each of fifteen (15) cyclical phase shifts. These phase shifts, which perpetually cycle through the LFSR, are conventionally referred to as "phases" of the m-sequence. The following tables illustrate the products calculated for certain phases applied in the present example. It is understood that in other embodiments, the signal processing/inference engine 94 would not have foreknowledge of which phases are in use, and thus products for all phases would be calculated.

In Table 10, measured light samples are multiplied by representative local image bits. The local image bits are phase shifted representations of the m-sequence. In this case, when the products are summed across all samples, a total light amplitude signal for contributions modulated with a signature represented by phase 3 of the m-sequence is derived. Equation 1 describes the summation.

$$1.8+0+1.1+1.3+1.8+1.1-0.2-0.9-0.7+1.3-0.7-0.2+2.0+2.0-0.9=8.8 \quad \text{(Eq. 1)}$$

The total light amplitude for the phase 3 contribution can next be normalized. In this case, the normalization includes an act of dividing by 8, which is the number of binary "1" bits in the m-sequence.

$$8.8 \div 8 = 1.1 \quad \text{(Eq. 2)}$$

Equation 2 describes the normalization of phase 3 contributions. Referring back to Table 6, it is recognized that light source 10A, which was assigned an encoded light signature of phase 3, produces light that accounts for 1.1*the nominal output of the light source. Accordingly, an acceptable approximation of the brightness of light source 10A has been calculated from the brightness samples received by the photo detector 78 of FIG. 5.

In a continued analysis of the 4-bit LFSR example, the measured light samples and calculated products associated with phase 8 and phase 9 of the m-sequence can also be processed.

In Tables 11 and 12, a first row is a sample number, and a second row is a representation of measured light amplitude at the time the sample is captured. The third row is the local image representation of the m-sequence adjusted for phase. In Table 11, the local image representation is shifted for phase 8, and in Table 12, the local image representation is shifted for phase 9. The fourth row is the phase shifted modulation bit number. The fifth row is the element-by-element product of values in the second and third rows. The fifth row elements are later analyzed in an act of isolating particular encoded signatures along the lines of analysis of Table 9 and particularly of Table 10.

TABLE 9

Products of a Measured Sample and a Local Image Bit at Phase 0

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| 1.8 | 0 | 1.1 | 1.3 | 1.8 | 1.1 | 0.2 | 0.9 | 0.7 | 1.3 | 0.7 | 0.2 | 2.0 | 2.0 | 0.9 |
| 1 | 1 | −1 | 1 | −1 | 1 | 1 | 1 | 1 | −1 | −1 | −1 | 1 | −1 | −1 |
| 1 | 2 | 3 | 4 | 5 | 6 | 7 | 8 | 9 | 10 | 11 | 12 | 13 | 14 | 15 |
| 1.8 | 0 | −1.1 | 1.3 | −1.8 | 1.1 | 0.2 | 0.9 | 0.7 | −1.3 | −0.7 | −0.2 | 2.0 | −2.0 | −0.9 |

In Table 9, a first row is a sample number, and a second row is a representation of measured light amplitude at the time the sample is captured. The third row is the local image representation of the m-sequence. Table 9 represents phase 0, so no adjustment (e.g., shifting) for phase is applied in table 9. The fourth row is the modulation bit number at phase 0. The fifth row is the element-by-element product of values in the second and third rows.

In Table 9, a sum of the product outputs in the fifth row yields a result of zero (0). This is expected in the present example because none of the light sources 10A-10C are modulated with the m-sequence at phase 0. Accordingly, it is understood that in similar calculations with adjustments made for phases 1, 2, 4-7, and 10-15, the resulting sum of products is also zero (0) because none of the light sources 10A-10C modulate light output at these phases.

The results for phases 3, 8, and 9 in this example are different than the results for the other phases. As illustrated in Tables 10-12, a summation of the products indicates that particular components of the light incident on photo detector 78 are produced by light sources 10A-10C.

TABLE 10

Products of a Measured Sample and a Local Image Bit at Phase 3

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| 1.8 | 0 | 1.1 | 1.3 | 1.8 | 1.1 | 0.2 | 0.9 | 0.7 | 1.3 | 0.7 | 0.2 | 2.0 | 2.0 | 0.9 |
| 1 | −1 | 1 | 1 | 1 | 1 | −1 | −1 | −1 | 1 | −1 | −1 | 1 | 1 | −1 |
| 4 | 5 | 6 | 7 | 8 | 9 | 10 | 11 | 12 | 13 | 14 | 15 | 1 | 2 | 3 |
| 1.8 | 0 | 1.1 | 1.3 | 1.8 | 1.1 | −0.2 | −0.9 | −0.7 | 1.3 | −0.7 | −0.2 | 2.0 | 2.0 | −0.9 |

TABLE 11

Products of a Measured Sample and a Local Image Bit at Phase 8

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 1.8 | 0 | 1.1 | 1.3 | 1.8 | 1.1 | 0.2 | 0.9 | 0.7 | 1.3 | 0.7 | 0.2 | 2.0 | 2.0 | 0.9 |
| 1 | −1 | −1 | −1 | 1 | −1 | −1 | 1 | 1 | −1 | 1 | −1 | 1 | 1 | 1 |
| 9 | 10 | 11 | 12 | 13 | 14 | 15 | 1 | 2 | 3 | 4 | 5 | 6 | 7 | 8 |
| 1.8 | 0 | −1.1 | −1.3 | 1.8 | −1.1 | −0.2 | 0.9 | 0.7 | −1.3 | 0.7 | −0.2 | 2.0 | 2.0 | 0.9 |

TABLE 12

Products of a Measured Sample and a Local Image Bit at Phase 9

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 1.8 | 0 | 1.1 | 1.3 | 1.8 | 1.1 | 0.2 | 0.9 | 0.7 | 1.3 | 0.7 | 0.2 | 2.0 | 2.0 | 0.9 |
| −1 | −1 | −1 | 1 | −1 | −1 | 1 | 1 | −1 | 1 | −1 | 1 | 1 | 1 | 1 |
| 10 | 11 | 12 | 13 | 14 | 15 | 1 | 2 | 3 | 4 | 5 | 6 | 7 | 8 | 9 |
| −1.8 | 0 | −1.1 | 1.3 | −1.8 | −1.1 | 0.2 | 0.9 | −0.7 | 1.3 | −0.7 | 0.2 | 2.0 | 2.0 | 0.9 |

In Tables 11 and 12, measured light samples are multiplied by representative local image bits. The local image bits are phase shifted representations of the m-sequence, and when the products are summed across all samples, a total light amplitude signal for contributions modulated with a signature represented by a particular phase of the m-sequence is derived. Equations 3 and 4 describe the summations associated with phases 8 and 9, respectively.

$$1.8+0-1.1-1.3+1.8-1.1-0.2+0.9+0.7-1.3+0.7-0.2+2.0+2.0+0.9=5.6 \quad \text{(Eq. 3)}$$

$$-1.8+0-1.1+1.3-1.8-1.1+0.2+0.9-0.7+1.3-0.7+0.2+2.0+2.0+0.9=1.6 \quad \text{(Eq. 4)}$$

The total light amplitude for the phase 8 and phase 9 contributions can next be normalized. Just as in the normalization of the phase 3 contributions, the normalization of phase 8 and phase 9 contributions includes an act of dividing by 8, which is the number of binary "1" bits in the m-sequences.

$$5.6 \div 8 = 0.7 \quad \text{(Eq. 5)}$$

$$1.6 \div 8 = 0.2 \quad \text{(Eq. 6)}$$

Equation 5 describes the normalization of phase 8 contributions. Equation 6 describes the normalization of phase 9 contributions. Referring back to Table 6, it is recognized that light source 10B, which was assigned an encoded light signature of phase 8, produces light that accounts for 0.7*the nominal output of the light source. Light source 10C, which was assigned an encoded light signature of phase 9, produces light that accounts for 0.2*the nominal output of the light source. Accordingly, acceptable approximations of the brightness of light sources 10B and 10C have been calculated from the brightness samples received by the photo detector 78 of FIG. 5.

The results of the calculations performed by the signal processing/inference engine 94 module are summarized in Table 13.

TABLE 13

Summary of Normalized Brightness Values at Each Phase

| Phase Offset | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Decoded Value | 0 | 0 | 0 | 8.8 | 0 | 0 | 0 | 0 | 5.6 | 1.6 | 0 | 0 | 0 | 0 | 0 |
| Normalized Value | 0 | 0 | 0 | 1.1 | 0 | 0 | 0 | 0 | 0.7 | 0.2 | 0 | 0 | 0 | 0 | 0 |

The acts taken to decode signatures may be alternately solved with a linear equation as described in Equation 7

$$A \cdot x = b \quad \text{(Eq. 7)}$$

where b is a vector of length 15; and

A is a 15×15 square matrix

The vector "b" comprises brightness samples such as those received by the photo sensor 78 of FIG. 5 in the 4-bit LFSR example. The square matrix comprises the 15 possible encoded signature values. That is, the square matrix comprises 15 copies of the m-sequence, each copy phase shifted according to one of the 15 phases. The value of "x" represents unknown values, which are the brightness vales at each of the 15 phase offsets.

Equation 8 illustrates an analysis of the exemplary 4-bit LFSR light signature detection device 26A described herein using the matrix calculations of Equation 7.

$$\begin{pmatrix} 1 & 1 & 0 & 1 & 0 & 1 & 1 & 1 & 1 & 0 & 0 & 0 & 1 & 0 & 0 \\ 1 & 0 & 1 & 0 & 1 & 1 & 1 & 1 & 0 & 0 & 0 & 1 & 0 & 0 & 1 \\ 0 & 1 & 0 & 1 & 1 & 1 & 1 & 0 & 0 & 0 & 1 & 0 & 0 & 1 & 1 \\ 1 & 0 & 1 & 1 & 1 & 1 & 0 & 0 & 0 & 1 & 0 & 0 & 1 & 1 & 0 \\ 0 & 1 & 1 & 1 & 1 & 0 & 0 & 0 & 1 & 0 & 0 & 1 & 1 & 0 & 1 \\ 1 & 1 & 1 & 1 & 0 & 0 & 0 & 1 & 0 & 0 & 1 & 1 & 0 & 1 & 0 \\ 1 & 1 & 1 & 0 & 0 & 0 & 1 & 0 & 0 & 1 & 1 & 0 & 1 & 0 & 1 \\ 1 & 1 & 0 & 0 & 0 & 1 & 0 & 0 & 1 & 1 & 0 & 1 & 0 & 1 & 1 \\ 1 & 0 & 0 & 0 & 1 & 0 & 0 & 1 & 1 & 0 & 1 & 0 & 1 & 1 & 1 \\ 0 & 0 & 0 & 1 & 0 & 0 & 1 & 1 & 0 & 1 & 0 & 1 & 1 & 1 & 1 \\ 0 & 0 & 1 & 0 & 0 & 1 & 1 & 0 & 1 & 0 & 1 & 1 & 1 & 1 & 0 \\ 0 & 1 & 0 & 0 & 1 & 1 & 0 & 1 & 0 & 1 & 1 & 1 & 1 & 0 & 0 \\ 1 & 0 & 0 & 1 & 1 & 0 & 1 & 0 & 1 & 1 & 1 & 1 & 0 & 0 & 0 \\ 0 & 0 & 1 & 1 & 0 & 1 & 0 & 1 & 1 & 1 & 1 & 0 & 0 & 0 & 1 \\ 0 & 1 & 1 & 0 & 1 & 0 & 1 & 1 & 1 & 1 & 0 & 0 & 0 & 1 & 0 \end{pmatrix} \begin{pmatrix} value_0 \\ value_1 \\ value_2 \\ value_3 \\ value_4 \\ value_5 \\ value_6 \\ value_7 \\ value_8 \\ value_9 \\ value_{10} \\ value_{11} \\ value_{12} \\ value_{13} \\ value_{14} \end{pmatrix} = \begin{pmatrix} 1.8 \\ 0 \\ 1.1 \\ 1.3 \\ 1.8 \\ 1.1 \\ 0.2 \\ 0.9 \\ 0.7 \\ 1.3 \\ 0.7 \\ 0.2 \\ 2.0 \\ 2.0 \\ 0.9 \end{pmatrix} \quad (\text{Eq. 8})$$

Code Array (A)  Unknowns (x)  Samples (b)

Equation 8 is solved for "x" using conventional linear algebra techniques. The results of the matrix method to solve the equation are the same as those described in discrete acts. That is, light source 10A provides a light contribution of 1.1*nominal brightness, light source 10B provides a light contribution of 0.7*nominal brightness, and light source 10C provides a light contribution of 0.2*nominal brightness.

The analysis described along with Equations 1-8 and Tables 1-13 is presented in an ideal system. That is, each of light sources 10A-10C is synchronized with respect to an encoded signature. The photo sensor delivers a stream of light amplitude samples that are synchronized with the modulated light source output. Furthermore, there is no background, ambient, reflective, un-encoded, or un-synchronized light incident upon the photo sensor 78. The analysis is provided for simplicity. In subsequent analysis, the less than ideal conditions are recognized and considered in the processing of the signal processing/inference engine 94 module.

In FIG. 1, an operator of the mobile light signature detection device 26C desires to perform analysis on the pedestrian cross-walk sign 18. The mobile light signature detection device 26C receives light from a number of sources. In particular, some of the light incident on a photo sensor associated with the light signature detection device 26C includes an encoded light signature, and other light does not. For example, the light signature detection device 26C may receive un-encoded light from the police car 28 headlights, strobe lights, and reflections. The light signature detection device 26C may receive light from the sun or moon 30, a lighted commercial sign 32, street lights 10A-10C, and from many other sources. Often, the light from a particular source will fluctuate unpredictably, for example, as a vehicle moves or when an obstruction crosses in front of a light source. The light from the street lights 10A-10C may be encoded. The light from the pedestrian cross-walk sign 18 is encoded. Other light is un-encoded.

The light signature detection device 26C is configured to distinguish, isolate, and identify each individual light signal that is output from the pedestrian cross-walk sign 18 based on a particular m-sequence modulated in the light as an encoded light signature. The light that is received from other sources by the light signature detection device 26C will be considered "noise." It is recognized that if street lights such as light sources 10A-10C are encoded with the same m-sequence as the light source elements of the pedestrian cross-walk sign 18, then light signature detection device 26C will also be able to isolate and identify the contributions from the street lights. Alternatively, if the street lights are encoded with a different m-sequence, then the light contribution from the street lights will be considered as noise and discriminated out.

Figure 6A:
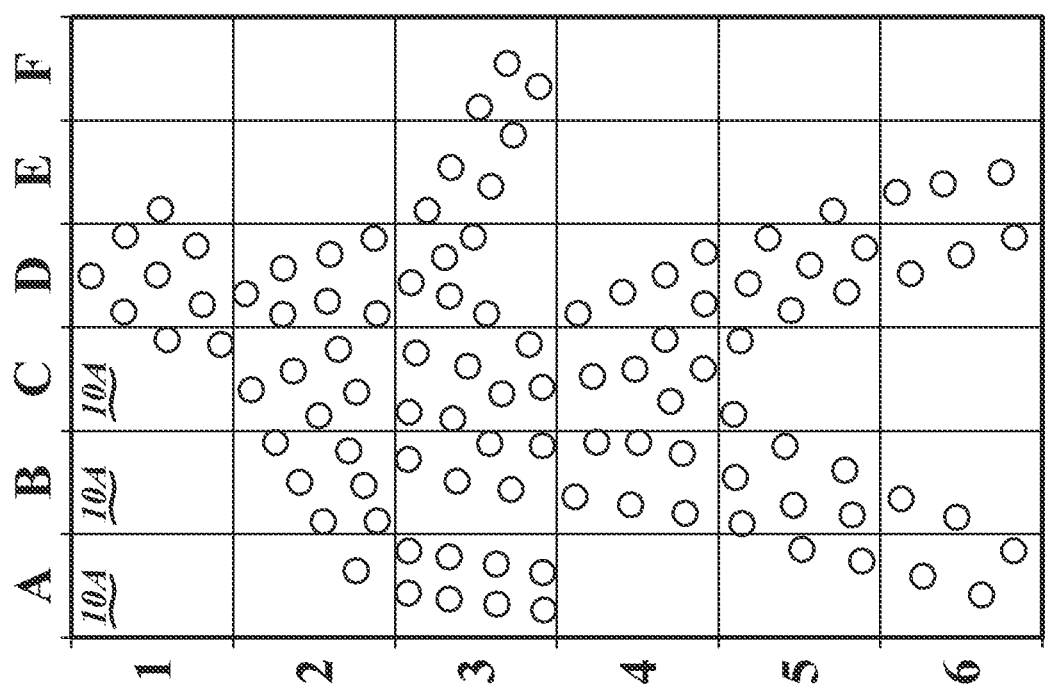
FIG. 6A illustrates a multi-light system embodiment arranged as a pedestrian cross-walk sign.
Figure 6B:
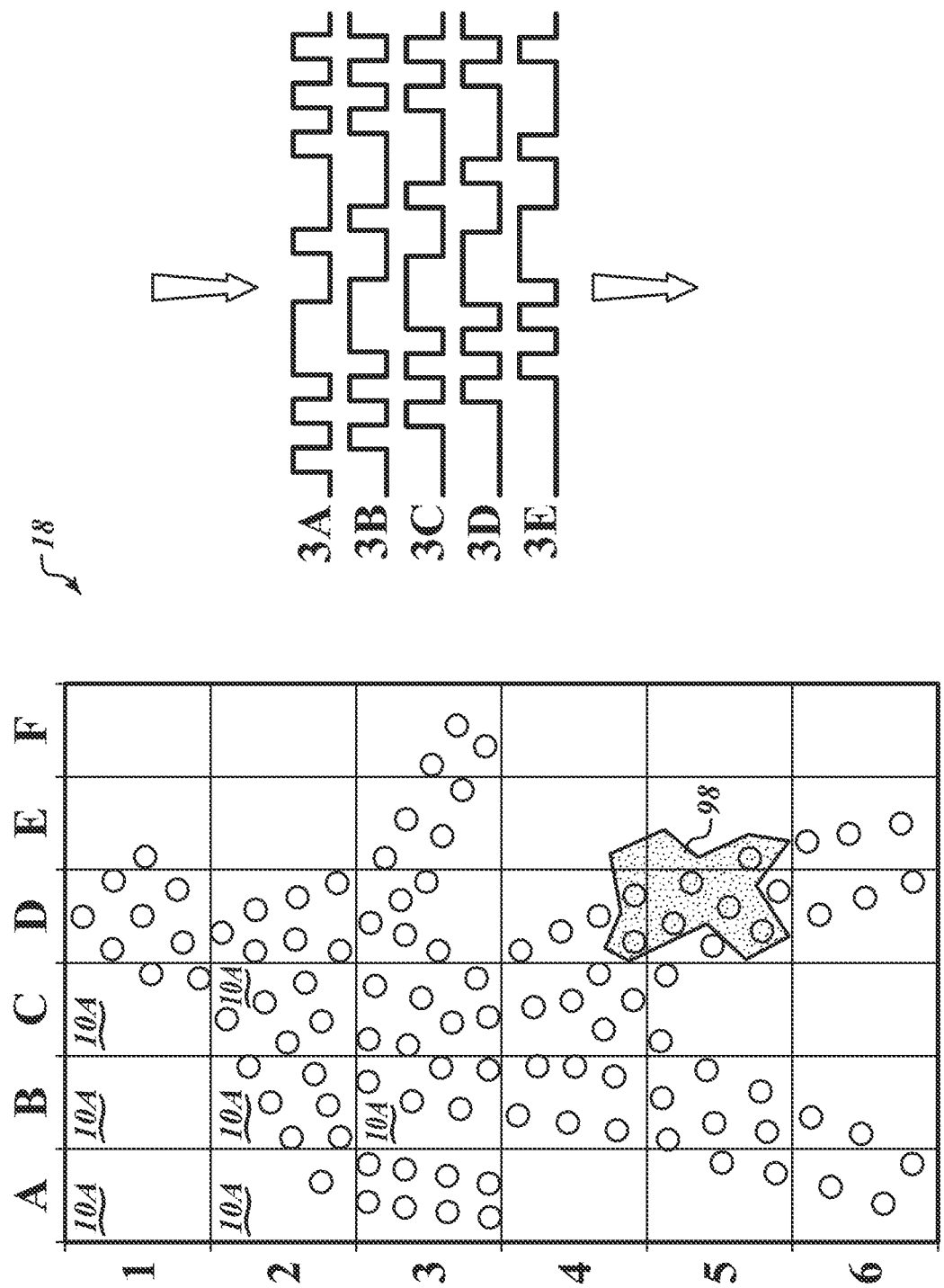
FIG. 6B illustrates a damaged embodiment of the cross-walk sign of FIG. 6A.

FIG. 6A illustrates a multi-light system embodiment arranged as a pedestrian cross-walk sign 18. FIG. 6B illustrates a damaged embodiment of the pedestrian cross-walk sign 18 of FIG. 6A. The pedestrian cross-walk sign 18 of FIGS. 6A and 6B is illustrated as a 6×6 matrix device of 36 light source elements each comprising zero or more individual light sources. The matrix in a different sign may be smaller or larger, or the matrix may have a different proportion or different number of light sources or light source elements. The pedestrian cross-walk sign, and other signs, may be formed in non-matrix patterns.

Each light source element of the pedestrian cross-walk sign 18 is formed along the lines of light source 10A (e.g., FIGS. 2A-2B, 3A-3C, 4). Each light source element is encoded with a different phase of a common m-sequence. In the embodiment of FIGS. 6A and 6B, each light source element includes a modulation controller 42 as illustrated in FIG. 4. For purposes of explanation, the LFSR 58 associated with the light source elements of FIGS. 6A and 6B is a 24-bit LFSR. Accordingly, in the embodiment now described with respect to FIGS. 6A and 6B, the LFSR 58 of FIG. 4 is implemented as a 24-stage linear feedback shift register. That is, n=23, and the LFSR 58 includes bits 0-23.

In the present example, a light signature detection device 26C is operated to analyze light output from a pedestrian cross-walk sign 18. The light signature detection device 26C is configured with strong noise handling characteristics. In the present example, noise is any contribution to the light signal incident upon a photo detector associated with the light signature detection device 26C that does not represent a light signal of interest (e.g., un-encoded ambient light, inconsistencies in the photo detector circuitry, an inconstant "on-state" output from the light source elements, and the like).

Embodiments of a signal processing/inference engine 94 module operate to isolate m-sequence codes in light signals. An exemplary 4-bit LFSR embodiment that isolated encoded light signatures from light sources 10A-10C has been described. The techniques to isolate encoded signatures also suppress signals that are not part of the targeted signature (i.e., noise) because such noise signals are not correlated with the chosen phase of the m-sequence. In the 4-bit LFSR embodiment, however, noise signals were left out to simplify the discussion.

In the present embodiment that is now described, the noise suppression capabilities of a signature encoded light system will be illustrated. In particular, the noise suppression enabled by a decoding/de-spreading process will be illustrated.

The degree of available suppression may be based on the length of the encoded signature. A longer m-sequence signature generally leads to improved code isolation and improved noise suppression. Accordingly, implementations of the signature encoded light system now described may include signatures of up to 100 million bits or more. Longer encoded signatures, however, may take more processing time to isolate signatures. It is recognized that a step-by-step decoding process (i.e., as in the 4-bit LFSR example) for long codes may become impractical. Accordingly, the present 24-bit LFSR example describes the additional application of mathematical analysis to attain an acceptable level of signature isolation and noise suppression in a practical embodiment.

The description of the present 24-bit LFSR embodiment is provided with respect to FIGS. 6A and 6B. For simplicity, ten (10) light source elements of pedestrian cross-walk sign 18 will be discussed, however, it is recognized that the principles discussed may be applied to more or fewer elements having different properties, different relative positions, and other different characteristics. In the exemplary embodiment, real-world conditions are described such as noise from ambient light, obstructions to encoded light signals, encoded light signals that are overwhelmed by bright reflections, and the like.

In the embodiment, embedded signature codes are generated using a 24-bit LFSR. Thus, each code is $(2^{24}-1)$ bits long, i.e., each code is 16,777,215 bits long.

The LFSR 58 (FIG. 4) in the embodiment places taps at bits 23, 22, 20, and 19. The seed value includes a binary "1" at each tapped bit, and binary "0" at each other bit. Accordingly, the seed value stored in the seed value device 56 is: 0000 0000 0000 0000 0001 1011.

Within the light signature detection device 26C in the present embodiment, light will be sampled at a chosen "chipping frequency." The chipping frequency is the frequency at which the modulation state advances in a modulation controller 42 (FIG. 4) associated with each light source element. In the present embodiment, the chosen sampling rate and code modulation frequency is 16 MHz.

In the present exemplary 24-bit LFSR embodiment, the phase offset of each light source element is generated randomly or pseudo-randomly. In other embodiments, phase offsets are chosen sequentially, chosen via user input, or chosen in some other way. The light signature detection device 26C is configured to recover the phase during the decode process either with or without foreknowledge of the phase of any particular light source element. That is, the light signature detection device 26C is configured to isolate and identify each light source element according to its encoded light signature even when the encoded light signature is not previously known.

In the present exemplary 24-bit LFSR embodiment, the photo detector 78 (FIG. 5) of the light signature detection device 26C is a 16-bit sensor. The photo detector provides a stream of digital samples that may range between 0 and 65,535. A value of "0" represents light at or below a particular lower threshold received at the photo detector 78. A value of "65,535" represents light at or above a particular upper threshold is received at the photo detector 78. The upper and lower thresholds may be user configurable. The lower threshold may, for example, indicate that no light is sensed at the photo detector 78. The upper threshold may, for example, indicate that a full brightness light signal is sensed at the photo detector 78. In the present embodiment, a brightness value of 65,535 from the photo detector 78 will be referred to as "full-scale" or FS.

In the exemplary 24-bit LFSR embodiment, the ten representative light source elements may be any of the elements of the pedestrian cross-walk sign 18. To assist in the understanding of the embodiment, the chosen matrix light source elements are illustrated in Table 14. The light output from each of the ten light source elements is illustrated as a real-world example. Some elements are those where a very bright light is output; other elements have only a dim or partially illuminated light source; and still others, for example in damaged section 98 of FIG. 6B, output little or no light.

TABLE 14

| Light Output from Light Source Elements in FIG. 6B | |
|---|---|
| Light ID | Brightness |
| 2D | 0.110000 × FS = 7209 |
| 3E | 0.090000 × FS = 5898 |
| 3D | 0.050000 × FS = 3277 |
| 3C | 0.012000 × FS = 786 |
| 4C | 0.009000 × FS = 590 |
| 5C | 0.007000 × FS = 459 |
| 4E | 0.003000 × FS = 197 |
| 4D | 0.001000 × FS = 66 |
| 5E | 0.000100 × FS = 7 |
| 5D | 0.000045 × FS = 3 |

The 24-bit LFSR exemplary embodiment has been arranged to analyze contributions from light source elements having a wide range of brightness. In the embodiment, the light signature detection device 26C will suppress inter-light interference and the ambient and noise interference so that the dimmer light sources can be isolated and identified.

The 24-bit LFSR exemplary embodiment has been further arranged such that the contribution of ambient light and noise to the photo detector 78 sample readings are modeled with three components. First, a background averaging 0.5× FS with a "white noise" variation is imposed in the example. The white noise is modeled as real-world distributed fluctuations in the ambient light level with a standard deviation of (0.01×FS). This white noise component represents both fluctuations in the ambient light and noise originating within the photo detector 78. Second, a 60 Hz hum is introduced. Many conventional light sources exhibit a 60 Hz or 120 Hz fluctuation in their output due to the 60 Hz AC nature of the U.S. power grid. An ambient 60 Hz hum with peak amplitude of (0.01×FS) is introduced in the exemplary embodiment. A "hum" at another frequency (e.g., 50 Hz in Europe) could also be considered. Third, the encoded light output from the ten light source elements will typically include some output variation. The output variation may be caused by power supply noise, environment conditions, physical changes in the light source due to age, and other reasons. In the exemplary embodiment, the light source elements of the pedestrian cross-walk sign 18 are provided with a light output random fluctuation having a standard deviation of 2% of the particular light source element's brightness.

Figure 6C:
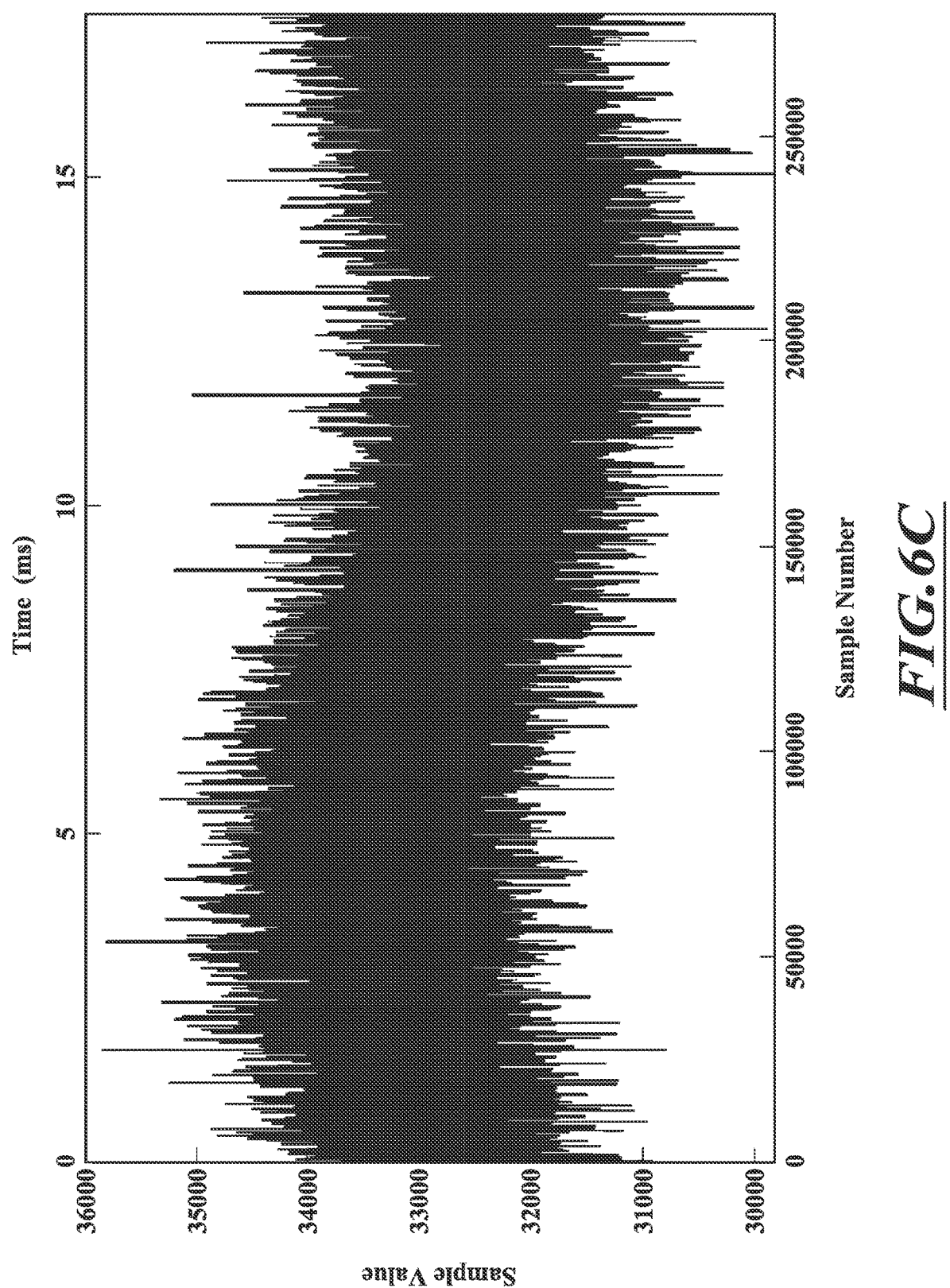
FIG. 6C shows a total light brightness level sensed by a photo detector in the exemplary embodiment.

FIG. 6C shows a total light brightness level sensed by a photo detector 78 in the exemplary embodiment. In the embodiment, the photo detector is providing samples at a 16 MHz rate. Accordingly, a new light amplitude sample is captured every 62.5 nanoseconds (ns). The collection of amplitude samples in FIG. 6C produced by the ambient light and noise sources is shown across a time period of 16.667 milliseconds (ms), which is 1/60th of a second. The periodicity of the collected samples reveals the influence of the 60 Hz hum and the scatter of the samples around the periodic signal may be attributed to the white noise contribution and the contribution of the encoded light sources, including their output variation. In FIG. 6C, the total light incident on the photo detector 78 is centered somewhere about the middle of the photo detector 78 full scale. That is, the samples are centered about 33,000. Centered brightness levels as described in this example are not required for successful measurement procedures, but the brightness levels fall within the measurement range of the photo detector 78. Such level constraints may be met by initializing upper and lower thresholds, by dynamic calibration during operation, by design of the photo detector 78 with consideration of anticipated light levels, or by other means. The photo detector 78 provides a captured sample every 62.5 ns. Accordingly, about 128,000 samples are collected over about one half (½) of the 60 Hz hum, which occurs in about 8 msec. About 256,000 samples are collected over a full cycle of the 60 Hz hum, which repeats every 16.667 ms.

In the exemplary embodiment, a user is holding a light signature detection device 26C from a point that is some distance away from the pedestrian cross-walk sign 18. The light signature detection device 26C will sense ambient light from the sun or moon 30, street lights 10A-10C, signs, reflections, motor vehicles, and many other sources. In addition, the light signature detection device 26C will also sense light from the pedestrian cross-walk sign 18.

Figure 6D:
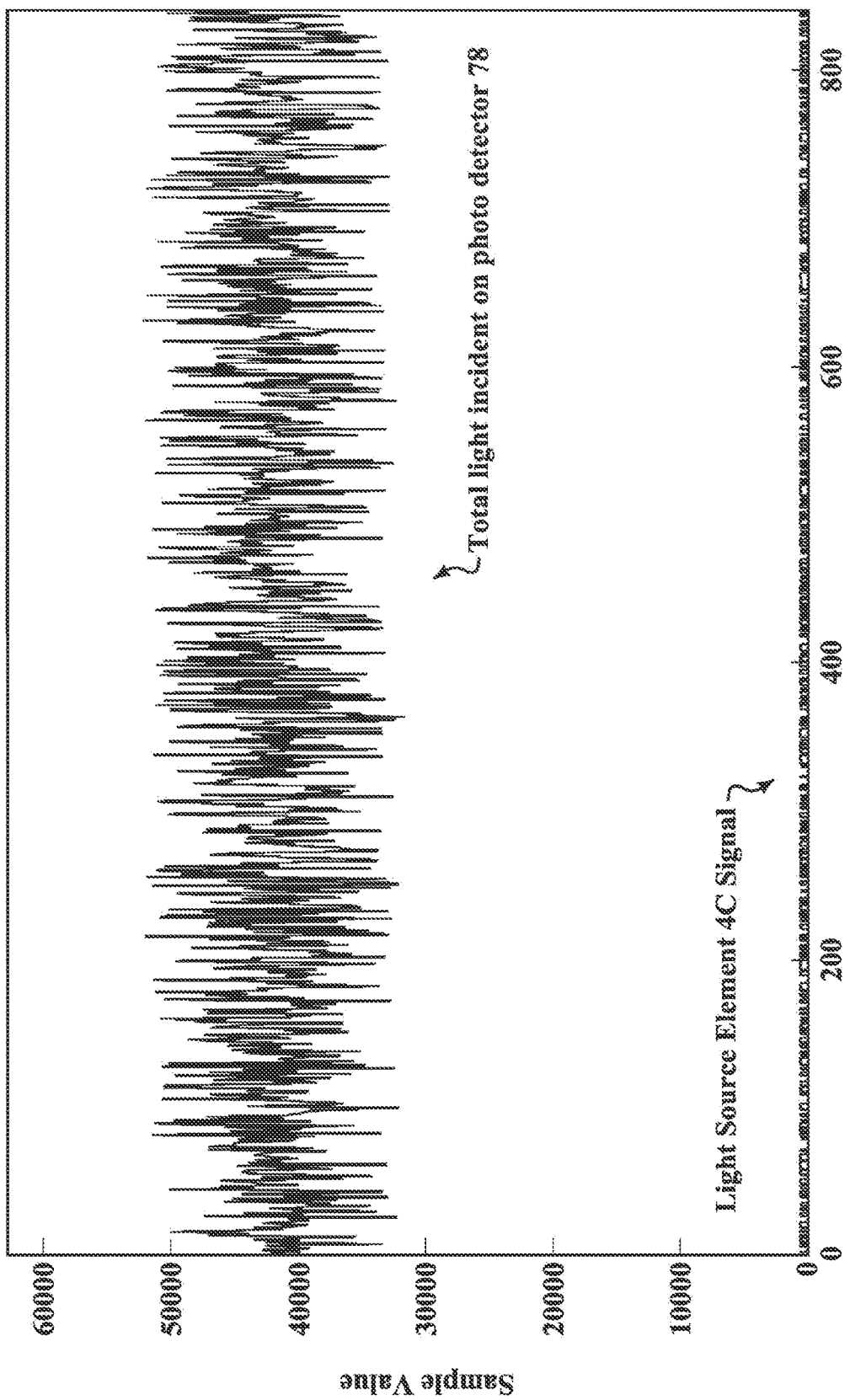
FIG. 6D compares a signal from one of the light source elements of the pedestrian cross-walk sign to the total light incident on the photo detector of the light signature detection device in an exemplary embodiment.

FIG. 6D compares a signal from one of the light source elements of the pedestrian cross-walk sign 18 to the total light incident on the photo detector 78 of the light signature detection device 26C in the exemplary embodiment. The total light is comprised of the light contributions from of all the light source elements of the pedestrian cross-walk sign 18 (including the ten encoded light signals illustrated in Table 14) along with ambient light and noise. As illustrated in FIG. 6D, the ambient light and noise in this example may be about 2-5 orders of magnitude larger than the various light signals produced by the pedestrian cross-walk sign 18. In other situations and with other embodiments there may be a greater or lesser difference in the magnitudes of encoded and ambient light.

In FIG. 6D, the light signal from light source element 4C, which has an on-state brightness of 590, is called out. The brightness from light source element 4C is dwarfed in comparison to the overall light measured by photo detector 78. With respect to FIG. 1, it is clear that all of the light output from the pedestrian cross-walk sign 18 could be dwarfed by the ambient light received at the light signature detection device 26C, especially light elements of the pedestrian cross-walk sign 18 that are damaged or obstructed (FIG. 6B). On the other hand, it is also clear that one or more light elements of the pedestrian cross-walk sign 18 may be particularly aligned with the light signature detection device 26C, and those light elements may provide a light signal contribution to the photo detector that is very strong. In further study of the FIG. 6D, it is apparent that light contributions from light source elements 5C, 4E, 4D, 5E, and 5D would not be visible at the scale presented in FIG. 6D.

In the exemplary embodiment, the light signature detection device 26C is configured to isolate and identify the contribution of each light source element of the pedestrian cross-walk sign 18. Each light source element outputs light with an encoded signature modulated therein. The signature detection device 26C is aware of the modulation code applied by the light source elements of the pedestrian cross-walk sign 18, but the signature detection device 26C does not have foreknowledge of the phase of the modulation code applied by any of the individual light source elements.

Since the signature detection device 26C does not have foreknowledge of the phase offsets of the light signals from the light source elements, the signal processing/inference engine 94 module is configured to calculate a correlation between a captured sample sequence and the modulation code sequence at all possible phase offsets. Phase offsets that produce high correlation values are determined to correspond to an encoded light signature output from at least one of the light source elements of the pedestrian cross-walk sign 18. The encoded light signature will be readily apparent because the modulation code sequence is uncorrelated to ambient light and noise.

It is recognized that the step-by-step multiply-and-total decoding method discussed with respect to the 4-bit LFSR exemplary embodiment could also be applied in the present exemplary embodiment. Nevertheless, the number of codes produced by a 24-bit LFSR could make such an analysis slow, inefficient, and otherwise impractical. In more detail, the present embodiment produces modulation codes with a 24-bit LFSR. If a corresponding number of samples were collected such that all possible phases of a modulation code could be analyzed, the step-by-step multiply-and-total decoding method would carry out about $2n^2$ arithmetic operations. For a 24-bit modulation code, approximately 562 trillion arithmetic operations would be executed. Although this method is effective, the method may be too computationally intensive for real-time decoding. Instead, a significantly faster decoding method is employed in the present exemplary embodiment.

Instead of a step-by-step multiply-and-total decoding method, correlation values for all phase offsets can be produced at the same time and with a single computation as described in Equation 9:

$$\text{Correlations} = \text{IDFT}(\text{DFT}(\text{Samples}) * \overline{\text{DFT}}(\text{Code})) \quad \text{(Eq. 9)}$$

where
DFT is the discrete Fourier transform;
IDFT is the inverse discrete Fourier transform; and
$\overline{\text{DFT}}$ is a complex conjugate DFT.

When Equation 9 is performed, a vector having the same length as the code sequence is produced, and the vector contains correlation values for each phase offset.

The exemplary embodiment has been tested to show how a Fast Fourier Transform (FFT) algorithm can implement DFT and IDFT functions. In such implementations, the DFT and IDFT functions may be implemented with about (4n log n) operations. Furthermore, a ($\overline{\text{DFT}}(\text{Code})$) value is constant for a given code, and the value can be computed once and reused for future decoding operations. Accordingly, in the present exemplary embodiment, calculation of the correlation values can be performed with about (8n log n) operations, which is a factor of about 580,000 fewer operations than the $2n^2$ step-by-step multiply-and-total case when n=24. The reduction in the number of math operations will be even more significant for longer LFSR configurations (i.e., larger values of n). As a point of reference, a software implementation of the FFT decoding method has been tested in the exemplary embodiment, and the implementation can execute the computation more than 200 times per second running on a processor 82 of a mobile device (e.g., a smart phone) operating at 1.3 gigahertz (GHz).

In some cases, the FFT decoding method applied in the present embodiment is extended to fractional phase decoding with a higher sampling rate. That is, the photo detector produces samples at a rate greater than the modulation rate of the emitted code and the decoding procedure operates on a larger sample set than the length of the code with a higher resolution local image of the code. In general, a higher sampling rate relative to the chipping frequency (i.e., the frequency at which modulation bits change) allows a finer phase discrimination between light source elements. For example, a sampling rate of two times the chipping frequency can yield phase estimates accurate to ten percent (1/10) of a chip or better. Accordingly, even if two encoded light signatures fall less than one chip apart in phase, the contribution of one of the encoded light signatures can still be distinguished from the other encoded light signature. In addition, fractional phase decoding may also permit more effective decoding in systems where chip boundaries of light source elements are not synchronized with each other or with a light signature detection device 26C.

In the present exemplary embodiment wherein ten light source elements of a pedestrian cross-walk sign 18 are analyzed, and each light source is modulated with an encoded signature produced by a 24-bit LFSR, the FFT decoding technique is now described. The FFT decoding method is carried out in the exemplary embodiment by the signal processing/inference engine 94 module.

The first few elements and the last few elements of the long sequences of the exemplary embodiment are illustrated in Table 15. For simplicity, the "Correlations" of Equation 9 have been re-centered about 0 by subtracting a median.

TABLE 15

Samples, DFT Values, and Correlation Values of Interest and Noise

| Sample #/ Phase | Sample Value | DFT (Samples) | DFT (Code) Code = {0, 0, 0, . . . ,0, 1, 0} | Correlations = IDFT(DFT (Samples) * DFT(Code)) |
|---:|---:|---:|---:|---:|
| 1 | 42201 | 1.72 * $10^8$ | 0.00024414i | −116.72 |
| 2 | 39892 | 2711.56 + 2114.19i | −0.995491 − 0.094858i | −219.772 |
| 3 | 42837 | −1575.61 + 2386.05i | 0.707817 + 0.706396i | −457.278 |
| 4 | 39137 | −3277.13 − 2811.72i | −0.389249 + 0.92113i | −629.392 |
| 2095916 | 40708 | 3065.16 + 7901.13i | 0.39698 + 0.917827i | 876.165 |
| 2095917 | 42096 | −2274.44 + 989.831i | 0.417235 − 0.908798i | 6.71214*$10^{-6}$ |
| 2095918 | 41360 | −306.281 + 925.268i | 0.750591 + 0.660767i | 1148.75 |
| 2944390 | 38122 | 2131.2 − 2639.54i | 0.247697 + 0.968838i | −506.863 |
| 2944391 | 39216 | 3644.24 − 211.598i | 0.0197486 + 0.999805i | 940215 |
| 2944392 | 42419 | 2763.55 − 5388.84i | −0.883516 − 0.468401i | 749.562 |
| 4821738 | 41356 | −262.883 − 4518.49i | −0.635004 + 0.772509i | −603.493 |
| 4821739 | 49114 | −3242.77 + 6784.47i | −0.392622 + 0.9197i | 6805.16 |
| 4821740 | 45375 | 2256.09 + 536.202i | −0.960765 + 0.277363i | 522.621 |
| 5051853 | 39071 | 6536.65 + 524.349i | 0.701678 − 0.712494i | −240.895 |
| 5051854 | 37993 | 1727.89 − 3574.61i | 0.623442 + 0.781869i | 401863 |
| 5051855 | 38295 | 2139.19 + 7.13816i | −0.692103 + 0.721799i | −137.122 |
| 6831023 | 39486 | 682.532 + 1025.91i | −0.788441 − 0.615111i | 1666.11 |
| 6831024 | 39629 | 3782.35 − 1837.02i | 0.99335 − 0.115135i | 1.61029*$10^{-6}$ |
| 6831025 | 40362 | −6802.92 + 34.8833i | 0.766474 − 0.642276i | 656.459 |
| 8258783 | 39686 | 7942.07 + 717.486i | −0.638293 − 0.769794i | 558.662 |
| 8258784 | 36220 | −2357 − 1450.54i | −0.702347 − 0.711835i | 1.20922*$10^{-6}$ |
| 8258785 | 45782 | −1341.23 + 964.202i | −0.304633 − 0.95247i | 749.837 |
| 8274880 | 43368 | −4102.28 + 630.986i | −0.163974 − 0.986465i | 124.959 |
| 8274881 | 42528 | −95.9481 − 2987.39i | −0.219589 + 0.975592i | 1.20797*$10^{-7}$ |
| 8274882 | 34234 | −4010.09 − 2.33832i | 0.999162 + 0.0409403i | 508.364 |
| 9918757 | 39134 | 6929.7 − 5205.18i | 0.879013 + 0.476797i | 1110.52 |
| 9918758 | 37762 | −4597.39 + 1389.46i | 0.93844 + 0.345443i | 135473 |
| 9918759 | 39573 | 4482.07 + 2187.14i | 0.995503 + 0.0947327i | 815.81 |
| 11175782 | 42533 | −4107.61 + 7811.12i | 0.980656 + 0.195739i | 48.6181 |
| 11175783 | 41824 | 1165.07 + 3647.47i | −0.23982 + 0.970817i | 13535.6 |
| 11175784 | 38023 | −2336.51 − 5433.71i | 0.689842 + 0.72396i | −1058.24 |
| 11832219 | 43702 | −2642.44 − 2332.72i | −0.632702 − 0.774395i | 1293.22 |
| 11832220 | 41153 | 3114.41 − 7456.22i | 0.473612 + 0.880734i | 1.47637*$10^{-7}$ |
| 11832221 | 39972 | −3884.68 − 1109.47i | −0.713328 + 0.70083i | −283.384 |

After the correlation values are calculated, a next act in the FFT decoding method is to search for the light source elements. The search is performed by isolating correlation values in the list of calculated correlation values that stand out. In the exemplary embodiment, correlation values associated with the encoded light signatures modulated in the light output by the ten light source elements of the pedestrian cross-walk sign 18 will tend to stand out from the other correlation values of noise samples.

Table 16 illustrates a representative listing of peak values and corresponding phases of the peak values. The peak values clearly stand out from the values of un-correlated phases containing noise.

TABLE 16

Correlation Values of Peaks and Certain Noise Phases

| Peak Values | Phase Of Peaks |
|---|---|
| 14,763,687 | 11,832,220 |
| 12,079,673 | 8,274,881 |
| 6,712,136 | 2,095,917 |
| 1,610,193 | 6,831,024 |
| 1,209,219 | 8,258,784 |
| 940,214 | 2,944,391 |
| 401,862 | 5,051,854 |
| 135,472 | 9,918,758 |
| 13,535 | 11,175,783 |
| 6,805 | 4,821,739 |

| Representative Noise Values | Phase of Noise |
|---|---|
| −615 | 102 |
| −180 | 158,392 |
| −645 | 2,839,104 |
| 269 | 5,620,280 |
| −1101 | 8,142,507 |
| 131 | 11,000,000 |

In the exemplary embodiment, if the light signature detection device 26C is aware of the information in Table 14, the act of matching correlation peaks to light source elements of the pedestrian cross-walk sign 18 is straightforward. In such a case, the signal processing/inference engine 94 module of the light signature detection device 26C matches the strongest correlation peak to light source element 2D, the second strongest peak to light source element 3E, and so forth. In an alternative embodiment, the light signature detection device 26C is aware of the modulation phases of each of the light source elements of the pedestrian cross-walk sign 18, for example via a database of known modulation phases. In such alternative embodiment, the signal processing/inference engine 94 matches phases of peaks with the known modulation phases. Other techniques are also possible.

Figure 6E:
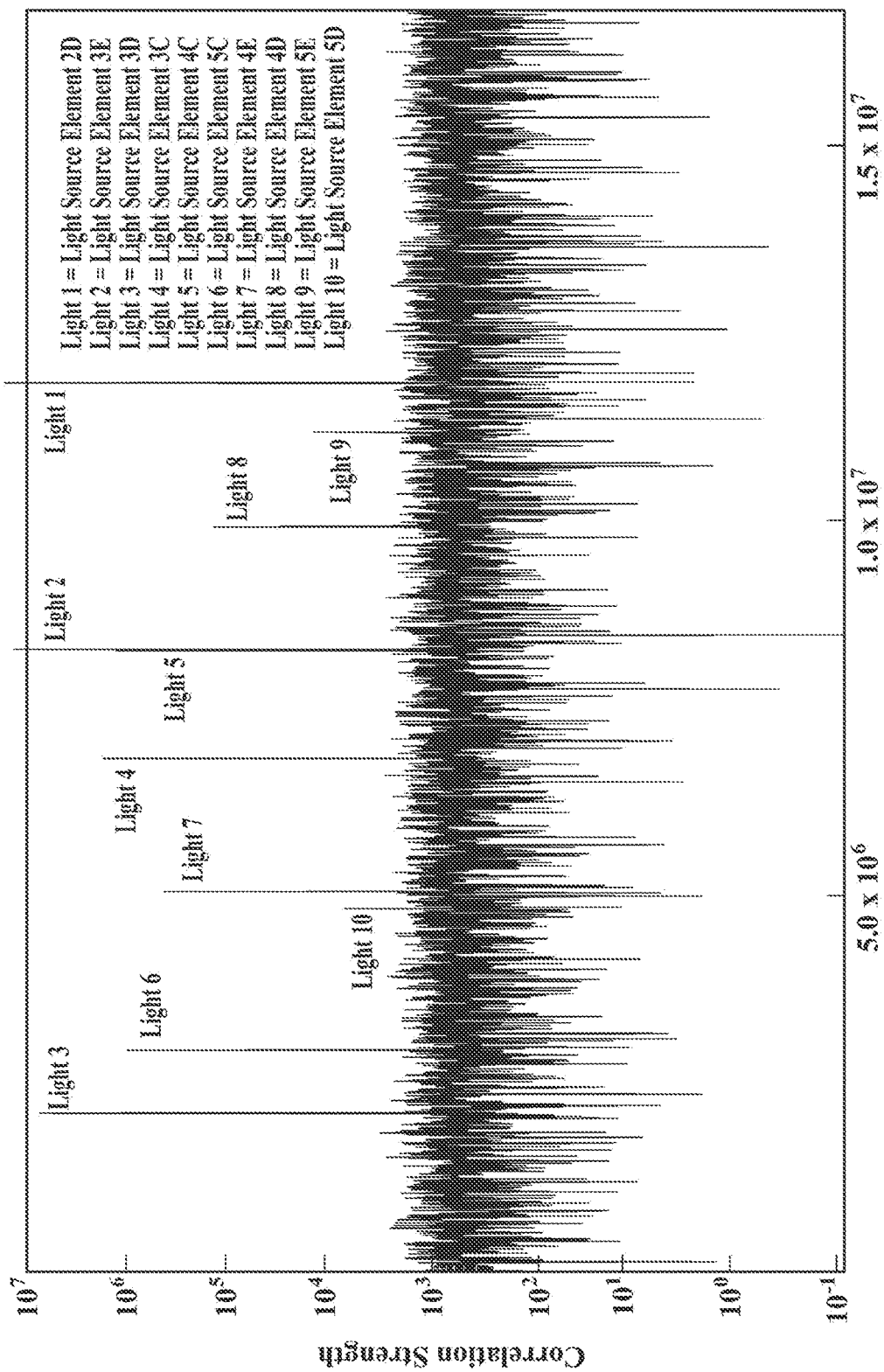
FIG. 6E illustrates the correlation strength for all phase offsets of a selected 24-bit modulation code.
Figure 6F:
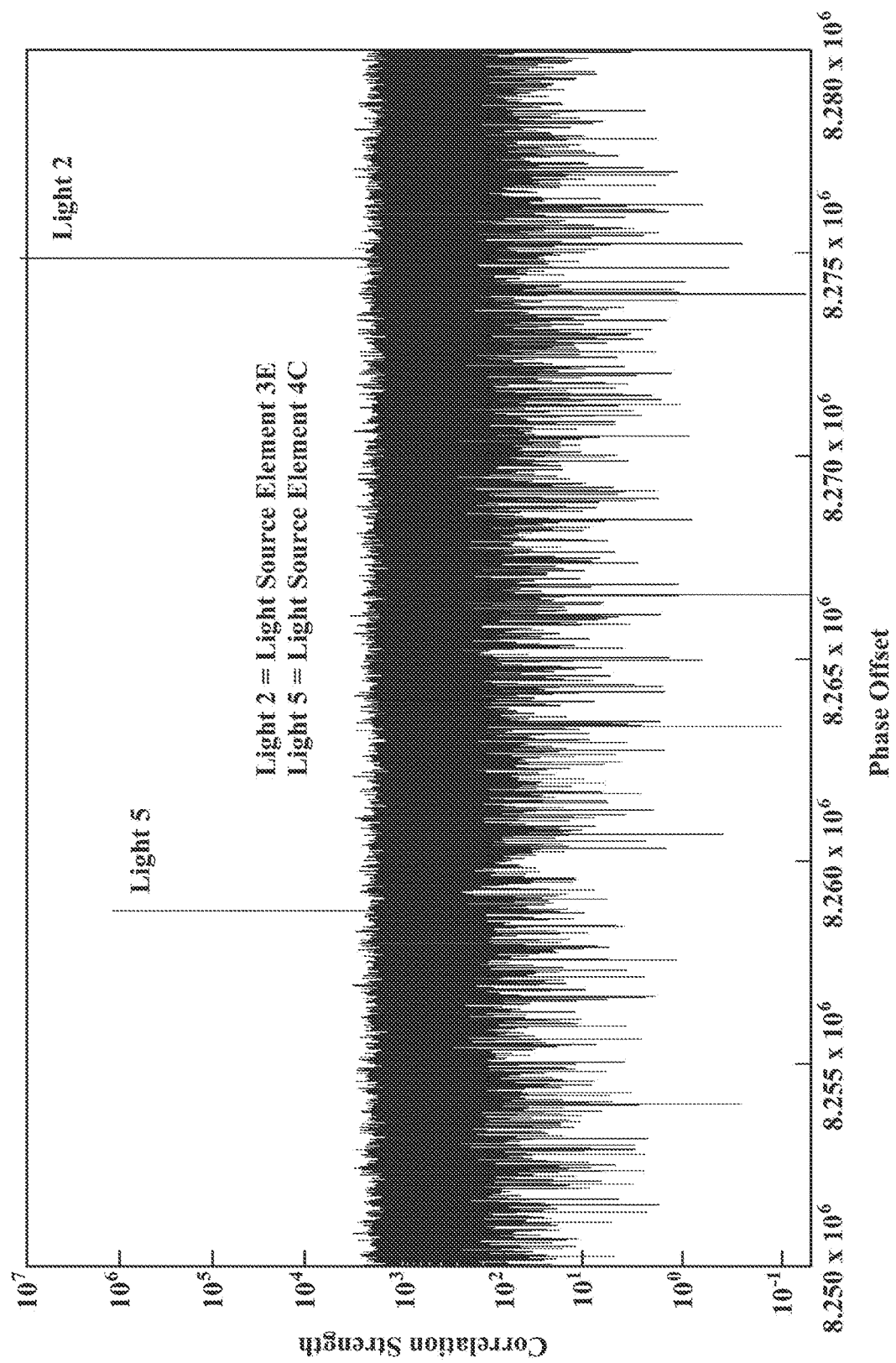
FIG. 6F illustrates the distinct correlation peaks of two particular light source elements.

FIG. 6E illustrates the correlation strength for all phase offsets of the selected 24-bit modulation code. The ten peaks corresponding to the ten detected light source elements are labeled and stand out clearly from each of the rest of the calculated correlation strength values. It is recognized that with a 24-bit LFSR, the number of phases of the modulation code is very large. Due to the scale of the plot in FIG. 6E, the peaks for light source element 4C (Light 5) and light source element 3E (Light 2) appear to be overlapping. Nevertheless, the peaks for light source element 4C (Light 5) and light source element 3E (Light 2) are in fact separated by more than 15,000 modulation periods. FIG. 6F illustrates the distinct correlation peaks of light source element 4C (Light 5) and light source element 3E (Light 2), which become plainly visible when the plotted phase range is reduced.

An optional act in the FFT decoding method includes normalization and validation of the correlated peaks. If the normalization and validation acts are performed, the acts are often, but not necessarily, performed before specific light source elements are assigned to correlated peaks. Via the normalization and validation acts of the FFT decoding method, the isolated contribution of each light source element to the composite light signal sensed at the photo detector 78 can be recovered.

The isolated contribution for each light source element is obtained by dividing the peak correlation values by a proportionality constant, which is the square root of one half (½) of the number of binary "1" states in the detected modulation code. In the present exemplary embodiment, the 24-bit LFSR produces an m-sequence modulation code of $(2^{24}-1)$ bits, and the code includes one more binary "1" state than binary "0" state. Accordingly, the $(2^{24}-1)$-bit modulation code has $2^{23}$ binary "1" bits, and one half (½) of the binary "1" bits is $2^{22}$. Thus, the resulting proportionality constant is $\sqrt{2^{22}}$, or 2048.

Table 17 illustrates the division equation results (i.e., normalized peaks) for each light source element as well as the original light output values from Table 14, the amount of raw error, and the percentage error of each calculated light brightness contribution to the known light output.

TABLE 17

Comparison of Calculated Light Contribution to Known Light Output

| Light ID | Normalized Peaks | Table 14 Known Brightness | Error btw Normalized & Known | Percent Error |
|---|---|---|---|---|
| 2D | 7208.83 | 7209 | −0.17 | 0% |
| 3E | 5898.28 | 5898 | 0.28 | 0% |
| 3D | 3277.41 | 3277 | 0.41 | 0.01% |
| 3C | 786.28 | 786 | 0.28 | 0.04% |
| 4C | 590.44 | 590 | 0.44 | 0.07% |
| 5C | 459.09 | 459 | 0.09 | 0.02% |
| 4E | 196.22 | 197 | −0.78 | −0.4% |
| 4D | 66.15 | 66 | 0.15 | 0.23% |
| 5E | 6.61 | 7 | −0.39 | −5.57% |
| 5D | 3.32 | 3 | 0.32 | 10.67% |

The comparison of calculated light contributions to known light output from each light source element of the pedestrian cross-walk sign 18 has been shown to be acceptable in real-world experimentation. In the exemplary embodiment, the normalized peaks calculated and illustrated in Table 17 are recovered from the presence of background light, electronic noise, interference from other light sources having embedded encoded signatures, and other light sources. It is thereby shown that the calculated level of accuracy is at least sufficient to detect the presence of a chosen light source element, and to further determine the light amplitude contributed by the chosen light source element. In addition, accuracy may be further improved via repeated measurements over time, higher sampling rates, longer LFSR bit chains (i.e., longer modulation codes), and via other techniques.

Another optional act in the FFT decoding method includes a determination of the likelihood of false positive correlations. Such an act may be used to determine how many bits should be provided in an LFSR for effective light source isolation and amplitude contribution measurements. The act may also be used to determine effective modulation rates, effective partial code identification, an acceptable spread of modulation code phases, and other characteristics.

In an act of the FFT decoding method to determine a likelihood of false positive correlations, the robustness of detection of each light source element can be determined by comparing peak correlation values to the correlation values for phases with no light present. This determination can be made by measuring the "z-score" of each peak, which is the peak value expressed as the number of standard deviations the peak value lies above the mean. To account for local fluctuations in the mean, the act is applied locally to each peak, calculating the z-score relative to the mean and standard deviation of some number (e.g., 1000) of nearest neighbors.

In the present exemplary embodiment of ten light source elements of a pedestrian cross-walk sign 18 (FIGS. 6A, 6B), a set of ten z-scores are calculated; the results are illustrated in Table 18.

TABLE 18 z-Scores for Each of Ten Light Source Elements in FIG. 6B

| Light ID | z-Score |
|----------|---------|
| 2D | 20675 |
| 3E | 17409 |
| 3D | 10041 |
| 3C | 2380 |
| 4C | 1798 |
| 5C | 1376.5 |
| 4E | 602.4 |
| 4D | 202.6 |
| 5E | 21.6 |
| 5D | 9.7 |

Subsequently, a probability of a given correlation value occurring by chance in the absence of a light element signal at the particular phase offset can be calculated. Equation 10 illustrates one possible probability calculation.

$$zScoreProb(zScore) = Prob(x-\mu > zScore*\sigma, x \sim NormalDist(\mu,\sigma)) \quad (Eq.\ 10)$$

where
zScoreProb=zScore Exceedance Probability
NormalDist=Normal Distribution;
x=a random variable
$\mu$=local-neighborhood mean
$\sigma$=local-neighborhood standard deviation
and
$x \sim NormalDist(\mu,\sigma)$ is an assertion that the random variable "x" is distributed according to a normal distribution with mean $\mu$ and standard deviation $\sigma$,
which evaluates to:

$$zScoreProb(zScore) = \frac{1}{2}\mathrm{erfc}\left(\frac{zScore}{\sqrt{2}}\right) \quad (Eq.\ 11)$$

where
erfc( ) is the complementary error function.

The z-score exceedance probability provides a probability that a single phase correlation strength z-score will occur by chance (i.e., in the absence of a light source at that phase), which results in a false positive light source detection.

The exemplary embodiment must examine a number of phases for any given decoding, so the chances of a false positive are higher. Of all considered phases, the number of phases that exceed a given z-score by chance is spread as a binomial distribution with parameters n and p, where n is the number of phases evaluated and p is the z-score probability of interest. If E is the number of chance exceedances, then the probability that E=0 can be calculated by evaluating the probability mass function of the binomial distribution at 0:

$$Prob(E=0) = pmf(BinomialDistribution(n,p))(0) = (1-p)^n \quad (Eq.\ 12)$$

where
n is the number of phases evaluated;
p is the false positive probability per phase For the weakest signal (5D in Table 18), zScoreProbabilty $(9.7)=1.5*10^{-22}$, the probability of 1 or more such z-scores occurring by chance is then $1-Prob(E=0)=1-(1-p)^n$, and so the probability of a false signal occurring by chance in $(2^{24})-1$ phases is roughly $2.5*10^{-15}$. Accordingly, there is high confidence that the calculated correlation value represents a detection of the output of an encoded light source and not a random fluctuation.

Figure 6G:
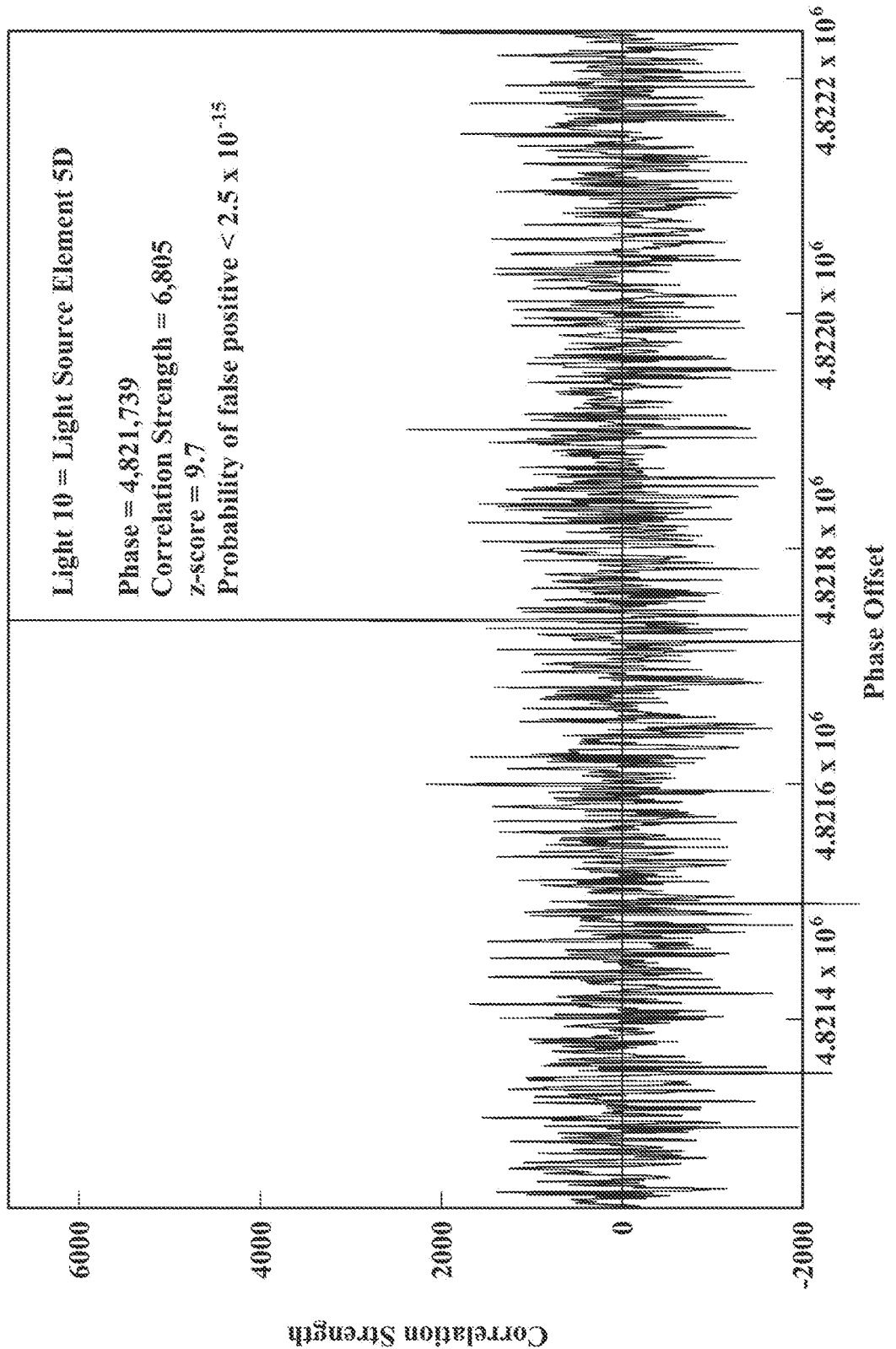
FIGS. 6G-6I illustrate probabilities of a false positive detection of particular encoded light signatures.
Figure 6H:
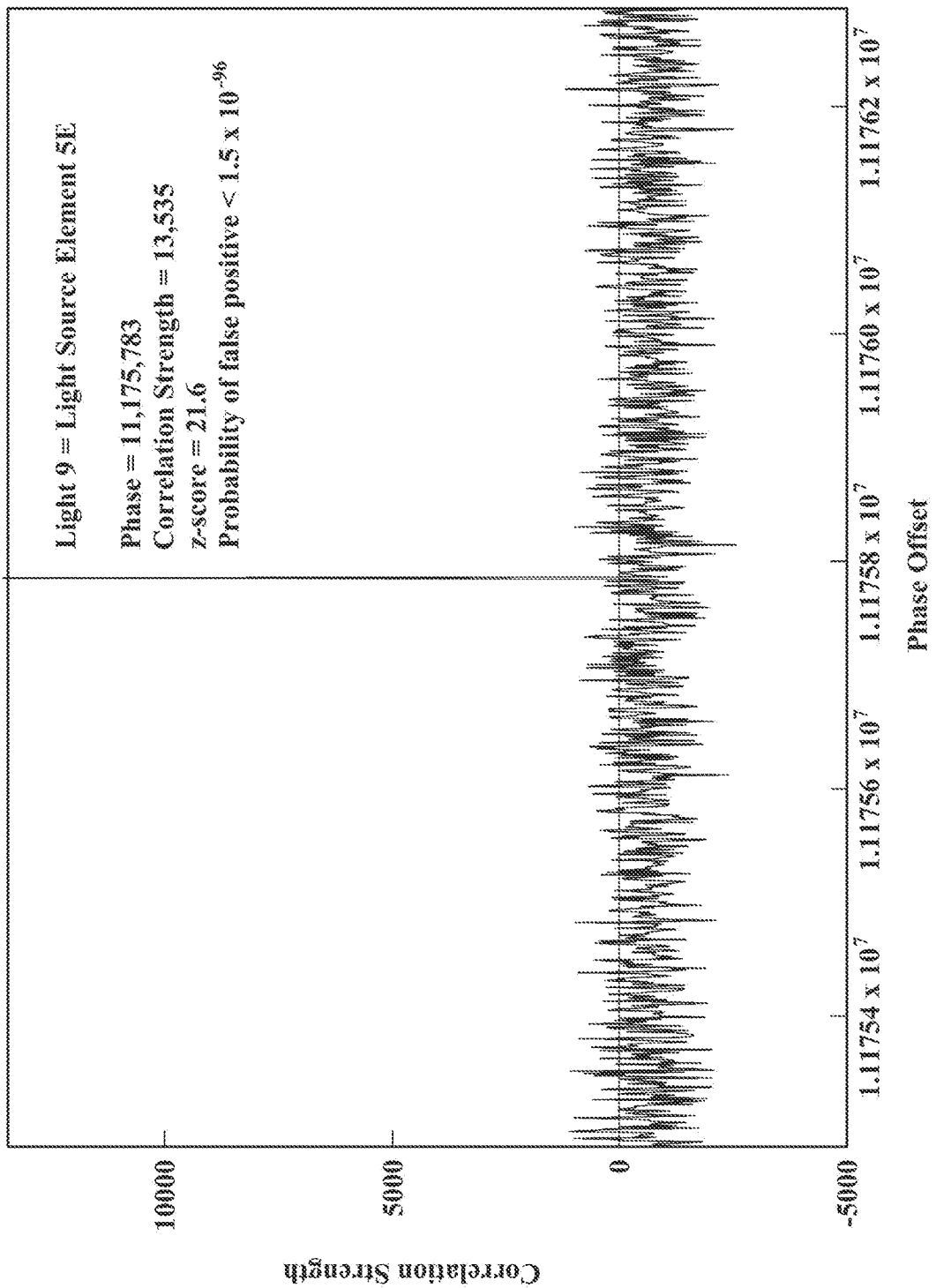
Figure 6I:
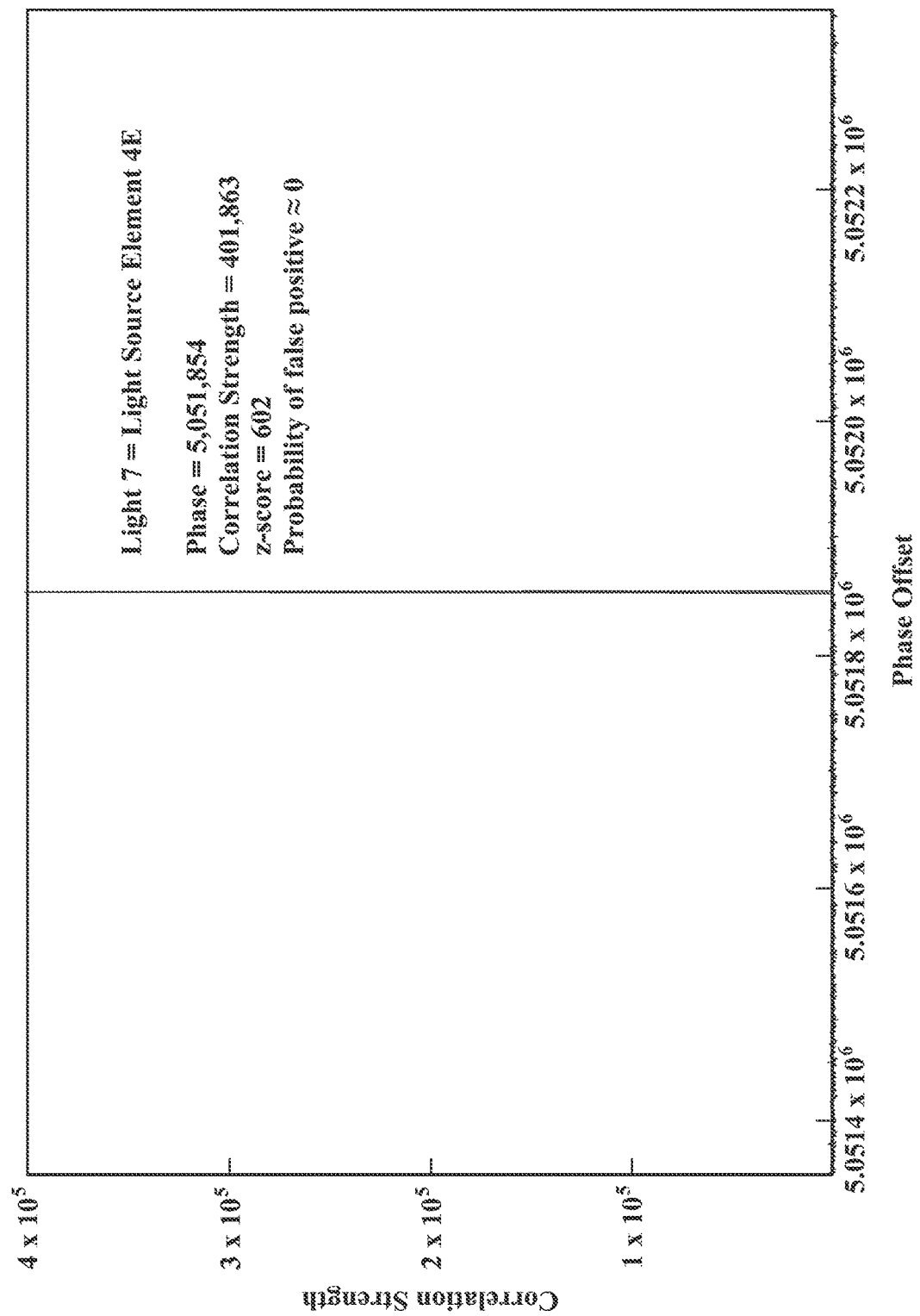

The probability of chance occurrences for the stronger signals called out in Table 18 is correspondingly smaller. FIGS. 6G, 6H, and 6I illustrate an immediate phase neighborhood of three of the dimmer peaks of the ten light source elements of the cross-walk sign 18. The decoding results for each of the ten light source elements are summarized in Table 19.

TABLE 19

Summary of Decoding Results for 24-bit LFSR Exemplary Embodiment

| Light ID | Phase Offset | Correlation Strength | Normed Correlation | Correct Value | % Error | z-score | Probability of false positive |
|----------|--------------|----------------------|--------------------|---------------|---------|---------|-------------------------------|
| 2D | 11,832,220 | $1.47 * 10^7$ | 7208.83 | 7209 | ~0% | 20675 | ~0 |
| 3E | 8,274,881 | $1.21 * 10^7$ | 5898.28 | 5898 | ~0% | 17409 | ~0 |
| 3D | 2,095,917 | $6.71 * 10^6$ | 3277.41 | 3277 | 0.01% | 10041 | ~0 |
| 3C | 6,831,024 | $1.61 * 10^6$ | 786.28 | 786 | 0.04% | 2380 | ~0 |
| 4C | 8,258,784 | $1.21 * 10^6$ | 590.44 | 590 | 0.07% | 1798 | ~0 |
| 5C | 2,994,391 | $9.40 * 10^5$ | 459.09 | 459 | 0.02% | 1376.5 | ~0 |
| 4E | 5,051,854 | $4.01 * 10^5$ | 196.22 | 197 | -0.4% | 602.4 | ~0 |
| 4D | 9,919,758 | $1.35 * 10^5$ | 66.15 | 66 | 0.23% | 202.6 | ~0 |
| 5E | 11,175,783 | 13540 | 6.61 | 7 | -5.57% | 21.6 | $<1.5 * 10^{-96}$ |
| 5D | 4,821,739 | 6805 | 3.32 | 3 | 10.67% | 9.7 | $<2.5 * 10^{-15}$ |

Many other exemplary embodiments of encoded light signature production and detection systems are considered. In such systems, at least one system-wide unique code is assigned to each light source. That is, each light source is encoded with its own unique signature. The codes may be selected to reduce the likelihood of interference with each other and to have properties that enable the codes to be distinguished from random background noise. Alternatively, the codes may be selected with a partial or complete random component.

In some embodiments, a controlling system may have programmed knowledge of the signature that is assigned to each encoded light source. (E.g., Signal Processing/Inference Engine 94 in FIG. 5). In such cases, the controlling system may be able to detect normally functioning light sources and abnormally functioning light sources. The absence of a detected signature may also inform the controlling system that a particular light source has failed. In yet other cases, the controlling system may detect codes and record information about detected light sources when previously, the controlling system did not have any foreknowledge of a particular light source.

Figure 7A:
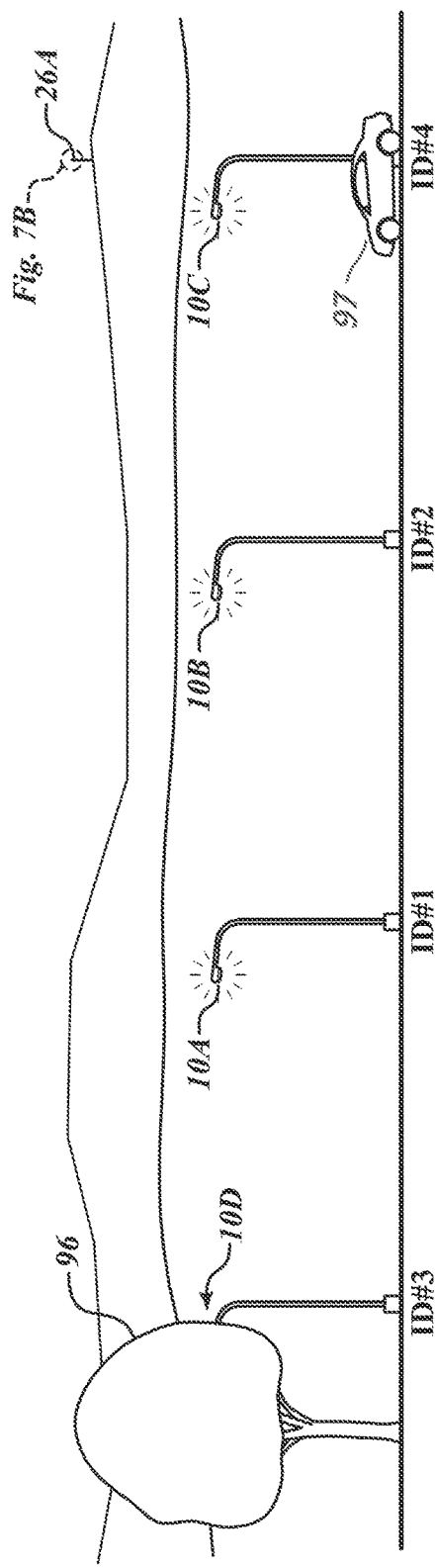
FIG. 7A illustrates an encoded light signature system embodiment in which at least one light source is obstructed.

FIG. 7A illustrates an encoded light signature system embodiment in which at least one light source is obstructed. In the embodiment, light sources 10A-10D are placed in a municipal, urban, suburban, or rural area. Only light sources 10A-10D are illustrated in FIG. 7A, but dozens, hundreds, or thousands of light sources may be configured in the embodiment. Each light source 10A-10D is assigned an identification number (i.e., ID #), which may be a particular signature or another value that represents or otherwise references a particular modulation code or signature. In the embodiment of FIG. 7A, the signature of each light source 10A-10D is a different phase of a common modulation code.

Figure 7B:
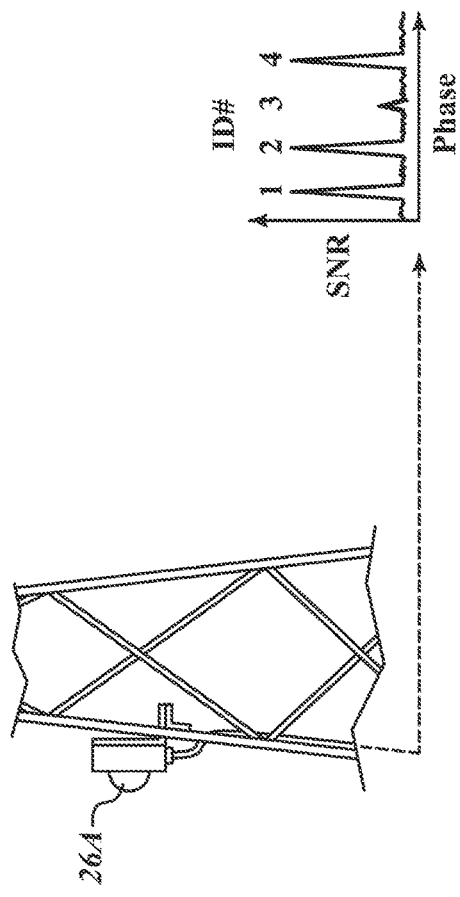
FIG. 7B illustrates a magnified view of the light signature detection device of FIG. 7A mounted on a distant tower.

FIG. 7B illustrates a magnified view of the light signature detection device 26A of FIG. 7A mounted on a distant tower. In the embodiment of FIG. 7B, a light signature detection device 26A is illustrated as stationary upon a tower structure. The light signature detection device 26A may be mounted or operated in a different way. The light signature detection device 26A may have direct line of sight to light sources 10A-10D or there may not be a direct line of sight. Even if the light from a light source 10A-10D is indirectly received by the light signature detection device 26A, the signature of the light source may be discerned.

In FIG. 7B, a representation of isolated, detected light signatures, organized by identification number, is shown in a plotted graph. The graph presented in FIG. 7B plots signal-to-noise ratio (SNR) versus phase, wherein the phase is a phase of a common modulation code. In the graph shown in FIG. 7B, light signal representations for three light sources 10A, 10B, 10C are illustrated as strong, and the light signal representation for light source 10D is weak.

In FIG. 7A, the light output from light source 10D is obstructed by a tree 96. In this case, the tree has obstructed a direct line of sight between light source 10D and the light signature detection device 26A. The tree has also prevented a substantial amount of light from light source 10D from reaching the ground or anywhere in the immediate area surrounding the light source 10D. Nevertheless, some of the signature encoded light from light source 10D escapes the obstructing tree 96 and is received at the light signature detection device 26A.

In FIG. 7A, light output from light source 10C is proximal to an automobile 97. The automobile 97 may output light from headlights, taillights, or other sources. The light from the automobile lights may also combine with light from the other light sources 10A, 10B, 10D. Alternatively, in broad daylight for example, the automobile 97 may absorb or deflect light from light source 10C, but the automobile 97 may not produce any light. The light from the automobile headlights and light from other un-modulated sources becomes part of the composite light signal received at the light signature detection device 26A (i.e., which may also include sunlight, moonlight, and light from other modulated or un-modulated sources). In spite of light from many sources, the light signature detection device 26A is configured to discern the individual light component from each individual light source 10A-10D. That is, the light produced by automobile 97 and other sources, and the light reflected or absorbed by automobile 97 or other sources, will not generally affect how much light is output by each of light sources 10A-10D. Accordingly, the light signature detection device 26A will be able to discern individual light components from light sources 10A-10D and unaffected by the light produced or reflected by other sources.

Each light source in FIG. 7A is provided with a particular ID. In some cases, the ID of a light source corresponds to the light signature encoded by the light source. In FIG. 7A, light source 10A corresponds with ID #1 and light source 10B corresponds with ID #2. Light signatures and ID's are not necessarily sequential or patterned, however, and in FIG. 7A, light source 10C corresponds with ID #4, and light source 10D corresponds with ID #3.

In the graph of FIG. 7B, evidence of the effects from tree 96 are apparent. A substantial portion of the light from source 10D (i.e., ID #3) is blocked by tree 96. Even though some light from source 10D is received and decoded by the light signature detection device 26A, the amount of light received is reduced. Conversely, the light output from source 10C is not reduced even though an automobile with illuminated headlights is in the immediate vicinity of light source 100. Accordingly, the presence of un-encoded light does not diminish the light contribution of light source 100 or any other light source.

The light signature detection device 26A includes or otherwise cooperates with a particular signal processing/inference engine (e.g., signal processing/inference engine 94 of FIG. 5). The signal processing/inference engine in the embodiment includes access to a database that recognizes each individual light source 10A-10D. In the database, which may be organized by an identification number for each light source, certain data is recorded and analyzed. For example, the database may record measured light from each light source, expected light from each light source, location of each light source, time of last inspection or servicing for each light source, and other data. In the present embodiment, the database may store information related to light source 10D (ID #3). The signal processing/inference engine may automatically or otherwise analyze data pertaining to light source 10D, and the analysis will indicate diminishing light output from light source 10D. In some cases, the analysis will recognize that light source 10D is in an area of tree growth, and an automatic indication of tree work will be scheduled. In other cases, the analysis will trigger a call for inspection or service to light source 10D. Many other types of analysis can be performed, and generally speaking, the background monitoring and analysis of encoded light sources allows for efficient, safe, and cost-effective maintenance of a lighting system.

The light signature detection device 26A of FIGS. 7A and 7B is illustrated with a domed lens. Typically, a light signature detection device includes at least one protective structure over the light gathering sensor. The protective structure may be transparent or the structure may be formed with some level of opacity. In some cases, the structure is a lens having particular properties. For example, the lens may serve to increase light gathering, increase directionality or form a specific field of view, diffuse ambient light to avoid sensor reflection effects, filter out infrared or other undesirable wavelengths absent in the light sources, transmit only light of desirable wavelengths, or provide other desirable enhancements to the detection device.

Figure 8:
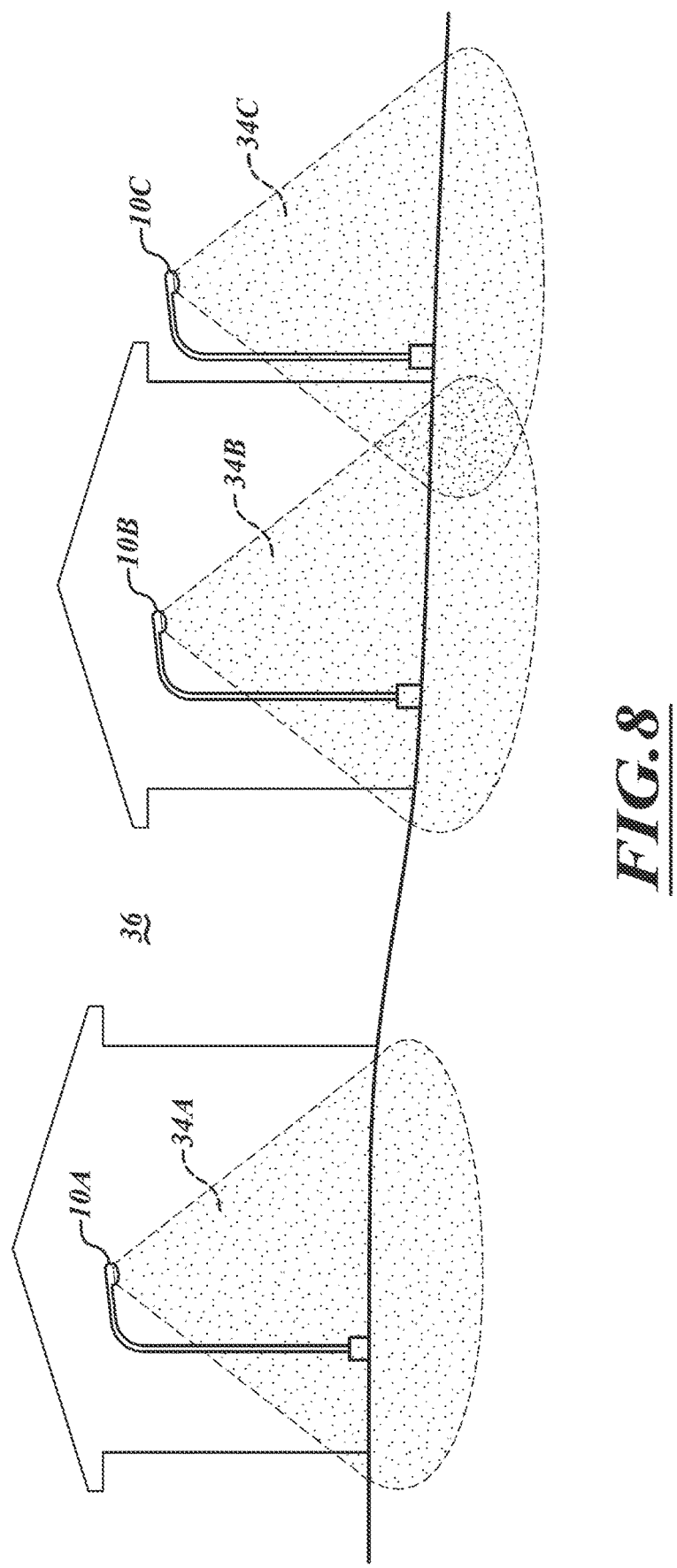
FIG. 8 illustrates an encoded light signature system embodiment having light sources with overlapped and non-overlapped light output.

FIG. 8 illustrates an encoded light signature system embodiment having light sources with overlapped and non-overlapped light output. In the embodiment, light sources 10A-10C are in a municipal, urban, suburban, or rural area. Each of light sources 10A-10C outputs light 34A-34C, respectively, encoded with a unique light signature. The unique light signature may be a system-wide unique modulation code, a system-wide unique phase of a common modulation code, or another signature.

In FIG. 8, Light source 10B and 10C are in close proximity to each other. The encoded light output from light sources 10B and 10C is heavily overlapped. The encoded light output from all light sources mixes with ambient light 36 from other sources. Nevertheless, since each light source 10A-10C includes an encoded signature, a light signature detection device (not shown) is able to discern a light component from each encoded light source using the techniques described herein.

FIG. 9A illustrates an encoded light signature detection module block diagram embodiment 100. The encoded light signature detection module 100 is illustrated having three subsystems: a sensing subsystem 102, a signal processing subsystem 104, and a system integration subsystem 106. FIG. 9A is described in context of information flow and a set of acts in a process to decode a composite light signal having one or more encoded light signals embedded therein. The three subsystems may be incorporated into a single device. Alternatively, the subsystems may be incorporated into two or more devices. The information flow between subsystems may be processed in real time, or the information may be buffered (i.e., stored) for offline processing.

The sensing subsystem 102 of FIG. 9A includes a photo sensor 108, an optional signal conditioning module 110, a signal conversion module 112, a signal conversion buffer 114a, and a signal conversion persistent memory 114b.

The photo sensor 108 of FIG. 9A may be of the type discussed herein with respect to the photo detection device 78 (FIG. 5). That is, in the embodiment of FIG. 9A, the photo sensor 108 is a TEXAS INSTRUMENTS MONOLITHIC PHOTODIODE AND SINGLE-SUPPLY TRANSIMPEDANCE AMPLIFIER, part number OPT101. In other embodiments, different photo sensors may be used.

The photo sensor 108 measures irradiance and outputs one or more proportional voltage, current, frequency, pulse train, or other signals suitable for electronic processing and measurement. In the embodiment of FIG. 9A and in other embodiments, a photo sensor is selected having a particular dynamic range characteristics, noise figure characteristics, and in the alternative or addition, bandwidth characteristics. For example, a detection device's measurement frequency will generally be at least twice the chipping rate of the encoded light signature signals to be measured. A photo sensor may therefore be chosen with sufficient bandwidth to pass variations in irradiance up to that particular frequency.

The signal conditioning module 110 matches the output of the photo sensor 108 to the input of the signal conversion module 112. Amongst other conditioning, the signal conditioning module 110 may amplify, attenuate, level shift, filter, normalize, or perform other conditioning to signals received from the photo sensor 108. For example, in some cases, the signal conditioning module 110 will include low-pass filtering circuits to remove frequencies above the Nyquist frequency of the signal conversion module 112. In the same or other examples, the signal conditioning module 110 will include high-pass filtering circuits to remove components such as constant brightness. The high-pass filtering circuits permit a wider range of utilization of the dynamic range of the signal conversion module 112. The signal conditioning module 110 may perform automatic gain control operations to increase the signal size without saturation. If automatic gain control is performed, the signal conditioning module 110 may pass gain information to the signal conversion module 112 so an absolute magnitude of input signals may be recovered.

The signal conversion module 112 converts the optionally conditioned output from the photo sensor 108 into a form suitable for digital signal processing. In many cases, the signal conversion module 112 includes an analog-to-digital converter (ADC). The ADC receives at its input data representing light signals received by the photo sensor. The ADC generates a stream of digital numeric values that proportionally represent the input signals and passes the values to its output.

A signal conversion buffer 114a and persistent memory 114b are configured to store a number of samples and related metadata. The metadata may include timestamps, geographic location data, control signal data identifying the signals or particular details about the sensing subsystem module 102, calibration data, and other data. In some cases, the data may be manually or programmatically read into and from the signal conversion buffer 114a and signal conversion persistent memory 114b. In some applications, such as a street light monitoring with real time reporting application (e.g., FIG. 1), signal processing occurs concurrently with sampling, and the persistent memory 114b is not implemented. In other cases, such as passive light sampling embodiments by detection devices 100 on city vehicles, the persistent memory 114b will be utilized to store a set of samples for future processing. The persistent memory 114b, if present, may also be used to log particular data such as compliance certification data, auditing data, or other data.

Data from the sensing subsystem 102 is passed to the signal processing subsystem 104. The signal processing subsystem 104 of FIG. 9A includes a correlation module 116, a correlation output buffer 118 and an optional correlation persistent memory 120.

The correlation module 116 includes a plurality of correlators. A correlator calculates the correlation between incoming sample sequences and code sequences of interest, which is a primary decoding task. In some embodiments, the correlation module includes a plurality of software routines executable by one or more processors such as digital signal processors, graphics processing units, and in addition or as an alternative, microprocessors. In other embodiments, the correlators may be implemented as fixed function devices in programmable logic circuits (PLC's), application specific integrated circuits (ASICs) or other computational logic. The output of a correlator generally includes a set of correlation values measured across the correlator's search space.

A correlator's search space may be controllable with one or more search space parameters. The parameters may include a nominal chipping frequency of the monitored lights having encoded light signatures, a range of chipping frequencies about nominal, a resolution of frequency search, and a resolution of phase search. The parameters are typically initialized according to the expected clock behavior of the encoded light signatures in question. The parameters are typically controlled by the system integration subsystem 106 during operation.

The signal processing subsystem 104 includes a correlation output buffer 118 and an optional correlation persistent memory 120. In a manner similar to the signal conversion buffer 114a and the signal conversion persistent memory 114b in the output path of the signal conversion module 112, output data from the correlation module 116 is buffered and optionally stored in one or more suitable memory devices 118, 120 according to online and offline processing and logging functions.

Data from the signal processing subsystem 104 is passed to an inference engine 124 in the system integration subsystem 106. The system integration subsystem 106 of FIG. 9A also includes one or more interface modules including an external systems module 122, a reporting/user interface module 126, an optional sensor position module 128, an optional real-time clock module 130, and an optional weather/environmental information module 132. In some embodiments, the system integration subsystem 106 also includes a module that stores light source models 134 and performs particular operations associated with light source modeling.

The system integration subsystem 106 interprets correlated raw measurement data passed from the signal processing subsystem 104. The system integration subsystem 106 integrates a detection device 100 with other parts of the lighting system, optionally connecting with some external systems. For example, asset management and geographic information systems may be coupled through an external system interface module 122. In some embodiments, the system integration subsystem 106 accesses, draws information from, and updates a light source model module 134. A particular model of the light system may be developed, which will include light signature assignments, geographic locations of light sources, recent and historical brightness measurements, test data, calibration data, maintenance data, and other pieces of relevant information. In some cases, the system integration subsystem 106 includes a user interface module 126. In these or alternative embodiments, data is passed to and from the subsystem 106 programmatically and no user interface is present.

The system integration subsystem 106 can be implemented as a computing platform with processing, memory, input/output capabilities, and other features. The system integration subsystem 106 may be implemented in a mobile or fixed device having the structures and capabilities of the light signature detection device 26A of FIG. 5. In some embodiments, hardware and software components of a light signature detection device 100 having the subsystems and features described herein may be configured in a commercially available computing product such as an APPLE IPAD.

Embodiments of the system integration subsystem 106 may receive measurements from and send control signals to a multiplicity of sensors and signal processing units. The information from related and disparate sources may be integrated to improve the performance and efficiency of a particular light system.

The inference engine module 124 analyzes light signature data from the signal processing subsystem 104 and produces useful information. The information generally includes an identification of light sources based on signatures encoded in light from the source and information about the amount or quality of light received.

The inference engine module 124 may be configured as a set of software routines stored in a computer readable media for execution on a processor. Alternatively, or in addition, the functions of the inference engine module 124 may be carried out with particular hardware circuits. Data to the inference engine module 124 may be generated by the correlation module 116 and passed from the signal processing subsystem 104. Further data to the inference engine module 124 may come from a system operator, external systems, ancillary sensors, and other sources.

The output of the inference engine module 124 includes information that identifies a particular light source. The output may also provide certain information about the particular light source. For example, in one case, the inference engine module 124 provides information (e.g., "The output of light 1034 is 15% below normal.").

Figure 9B:
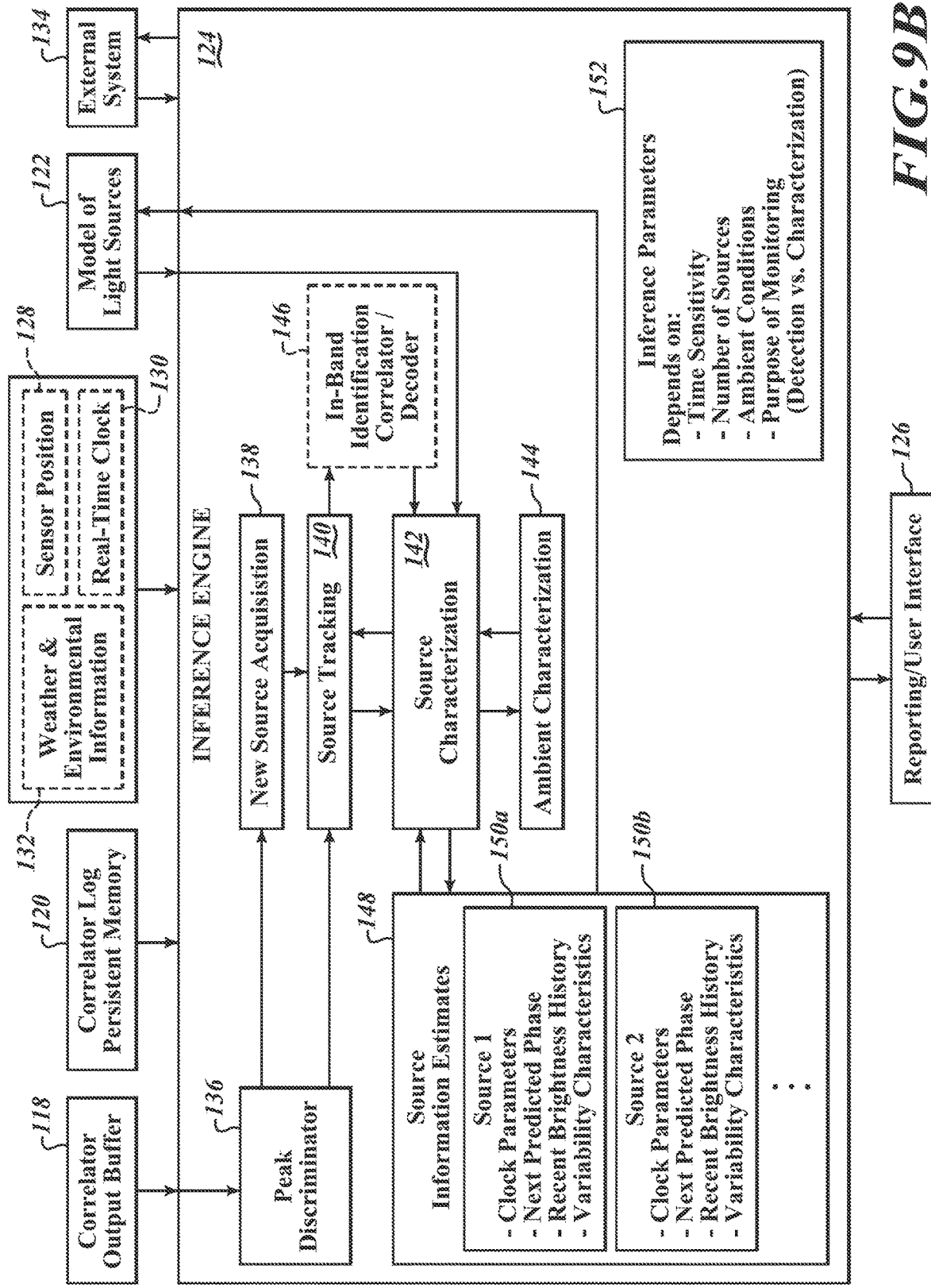
FIG. 9B illustrates an inference engine block diagram embodiment.

FIG. 9B illustrates a block diagram embodiment of an inference engine 124 (FIG. 9A). The inference engine module 124 typically performs several tasks to support the features of identifying particular light sources and generating useful information about the individual light sources. FIG. 9B shows the inference engine module 124 of FIG. 9A in more detail.

One task carried out by the inference module 124 is a peak discrimination task, which is carried out by a peak discriminator sub-module 136. The peak discrimination sub-module 136 uses statistical techniques to identify and measure peaks in the output data from the correlation module 116. By examining the shape of peaks and their neighborhoods in search space, peak discrimination sub-module 136 can interpolate and estimate the true height of a peak. The peak discrimination sub-module 136 may use information from multiple correlators concurrently. The peak discrimination sub-module 136 may distinguish persistent peaks from transient noise by tracking values over time. In some embodiments, the peak discrimination sub-module 136 may include algorithms to identify and suppress multipath interference, which can occur when light from one source arrives along multiple transmission paths, each having as different delay along its transmission path.

A new source acquisition sub-module 138 in the inference engine module 124 may be employed to identify and associate peaks that are output from the correlation module 116 to specific light sources. In this arrangement, the new source acquisition sub-module 138 can perform a demultiplexing operation.

Once a light source has been acquired, a source tracking sub-module 140 may be used to monitor the position of the signature encoded light from the light source in search space, over time. This monitoring may be used to aid in tracking operations and provide continuity of measurement despite source clock drift, environmental changes, and other reasons. The inference engine module 124 may command a correlator in the correlations module 116 to change its search parameters based on results from the source tracking sub-module 140. Such control allows the system to produce finer discrimination of phase, frequency, or some other parameter. The control may also be used to reduce the computational load of the system by sampling or processing less frequently, making assumptions before or during processing, or by other means.

The inference engine also includes a source characterization sub-module 142 and an ambient light characterization sub-module 144. The source and ambient light characterization sub-modules 142, 144 operate with information from the source tracking sub-module. The information may be used to update an internal model of light sources and ambient light detected and processed within the lighting system. The degree to which prior information about the system is used to interpret the measurements may depend on the particular application. Such degree may also be variable during the operation of the system. For example, a continually operating street light monitoring system may use machine learning or heuristic techniques to identify trends over time, predict failure, integrate multiple measurements, and derive interpretations beyond source brightness measurements. In periods of high maintenance activity, which may for example correspond with a budget or fiscal cycle, the system can be more active to identify maintenance opportunities. In other periods of lower need or desire, the system may be more passive and only indicate, for example, complete failures of a light source. Conversely, a mobile detection device 100 may be used to field check a few lights only. The mobile detection device 100 may perform very little interpretation beyond smoothing or averaging of measurements and utilize a tabula rasa model, assuming no a priori knowledge of the lights present other than the light signatures in use.

Turning back to FIG. 9A, a model of light sources module 134 exchanges data with the inference engine module 124. The model of light sources module 134 may optionally exchange data with external systems through the interface module 122. The model of light sources module 134 may also pass control information to the signal processing subsystem 104 and the sensing subsystem 102.

Light source models include sets of information and logic used by the system integration subsystem 106 to improve an interpretation of measured correlation peaks. In one case, a light source model module 134 simply includes a list of modulation codes used or otherwise allocated in the system. In other cases, which may be more complex, embodiments may store or compute expected brightness as a function of light source aging, command state (e.g., off/on/dim), clock models which approximate the behavior of the timebases present in the light sources, and other variables of state and rate for various characteristics of the anticipated light sources.

The system integration subsystem 106 may optionally include an interface to external systems module 122. External systems may pass information directly into modules of the system integration subsystem 106 or the external systems may pass information through the external systems interface module 122. Information may also be passed between the one or more of the subsystems 102, 104, 106 and the circuits or devices outside of the light signature detection device 100. Optional external systems illustrated in FIG. 9A include a weather/environmental information module 132, a real-time clock module 130, and a sensor position module 128. Other information modules may also be associated with the light detection device 100.

In one embodiment, the sensing subsystem 102 is mobile. In this case, the system integration subsystem 106 may use information from a position sensor module 128 associated with the photo sensor 108 to determine candidate light sources or make other geographically referenced inferences. In another embodiment, the system integration subsystem 106 may receive environmental information from a weather/environmental information module 132. The environmental information may be used by the inference engine 124 to learn, for example, how light source measurements may change with cloud cover, precipitation, season, day/night cycle, temperature, and other environmental factors. In other embodiments, external systems may include one or more database modules that store and serve light source aging data, auditing data, compliance mechanisms, asset and facilities management software, geographic information systems, and the like.

In some cases, the system integration subsystem 106 includes a reporting/user interface module 126. The reporting/user interface module 126 typically provides controls, displays, and other means of conveying information to and from users of the detection system 100. The reporting/user interface module 126 may, for example, be embodied in the display and touch input of a tablet computer. Alternatively, the reporting/user interface module 126 may be a user interface provided in a remote computer system physically removed from the detection system. In such embodiments, the reporting/user interface module 126 includes a network interface and associated software to interface with the remote computer system.

Modulation techniques described herein encode light signatures in the light output by light sources. In some cases, individual signatures are assigned to each light source. In other cases, light sources are modulated with a common signature and one light source is distinguished from another by phase shifting the modulation of each light source. Information theory teaches that modulating a message (e.g., a system-wide unique light signature) into the output of a light source reduces the detector's ability to detect and characterize the output of the light source. Thus, in embodiments where signal margin is low, where extremely accurate measurements are desired, or for other reasons, identification techniques that do not depend on system-wide unique signatures in the transmitted light are preferred.

Some examples of phase-shifting modulation include fixed-phase and floating-phase code phase tracking. In these embodiments, the identity of a light source is determined by its code phase relative to a reference code in the decoder 100. In other cases, phase tracking is infeasible or imposes undesirable hardware constraints. In these cases, some additional modulation of the signal from each light source may be implemented to encode the signature. The additional modulation will preferably not interfere with the system's ability to produce simultaneous brightness measurements from multiple sources. If interference occurs, techniques such as code phase shift identification may be employed to reduce the interference and non-uniformity of multiple light sources. In the code phase shift identification techniques, each light source modulates its code phase so as to encode its assigned identity.

In some cases, the detection module 100 detects light output modulated according to a fixed-phase code phase configuration. In these cases, the individual modulated light sources and the sensing subsystem 102 have access to a common phase reference, and an absolute code phase offset may be used to modulate and distinguish each individual light source.

For example, in one embodiment, each light source may have an embedded global position system (GPS) or global navigation satellite system (GNSS) receiver that produces a pulse-per-second (PPS) output. The PPS output on such a receiver may have edges aligned with universal time coordinated (UTC) "second" boundaries to within a margin of error of ~20 ns. In this embodiment, the modulating circuitry in each light source can use the PPS markers to maintain a fixed code phase offset, referenced to UTC. The signature is thereby encoded such that the ID of each light source is encoded in the offset.

In one such fixed-phase code phase system, the phase error of a typical quartz oscillator over a 1 second period is on the order of 1 ns. Accordingly, the UTC PPS error dominates, and around 50 million (1 s/20 ns) signatures are available for each second of code length if multiple measurements are combined. Careful phase filtering of the PPS reference at each source can improve this level of discrimination.

In a different embodiment, a floating-phase code phase system employs a frequency tracking scheme. In this embodiment, code phases are associated with individual light sources even though a fixed phase reference is not present at each light source. In this embodiment, the code phase of a light source is measured or set during installation, maintenance, calibration, or some other known opportunity. Subsequently, continuous or near continuous light source tracking and clock modelling allows the detection module 100 to track each light source as the clocks in the individual devices drift in code phase and frequency space.

In a floating-phase code phase system, the independence of each light source's clock allows for collisions to occur, but no code phase collision states will persist. Instead, the source tracking sub-module 140 can track individual light sources through a collision by characterizing the paths in code phase/frequency space. This architecture is effective because a light source's code phase and frequency are highly predictable over several hour periods. Thus, brief interruptions in tracking due to interference (e.g., collisions) or downtime are accounted for and will not interfere with effective light source tracking. Furthermore, because correlation peaks are distributed in a two dimensional space characterized by code phase and frequency, two colliding peaks having the same code phase may be distinguished from each other if their frequency errors are distinct. Typically, correlators in the correlation module 116 can distinguish frequency errors below 1 part per million. Also typically, quartz oscillators exhibit temperature dependence and aging on the order of tens of parts per million. Thus, source separation in frequency space is very likely.

The floating-phase code phase technique may be combined with a modulation technique such as code phase shift identification. In systems that employ a code phase shift identification, one or more light sources periodically or occasionally perform additional modulation every few minutes or hours. The code phase shift identification technique allows the system to re-associate light source identities with correlation peak trajectories in case the association is lost. Concurrently, the decoder 100 can maintain the un-modulated signal for a majority of the time for consistency and accuracy of measurement.

A code phase shift identification technique is further described. In the technique, the identity of a light source may be encoded and detected via code phase shifts in the light's emitted code sequence (signature). The encoding is performed through periodic jumps or shifts of code phase for each monitored light. These shifts may occur regularly or according to a pattern, which may itself be a low autocorrelation sequence such as an m-sequence.

The periodic or occasional code phase shifts of the light source will cause the light to appear as two or more distinct peaks in code phase/chipping frequency space over time. If the view of code phase/frequency space is expanded to include time as a third dimension, the multiple peaks will form parallel trajectories. A pair or group of paths corresponding to a single light source may be identified in several ways: (1) Peaks from a single light source will have the same chipping frequency error; (2) The peaks will move in lockstep in code phase/frequency space as the clock of the light source drifts; (3) The strengths of the two or more peaks will be anti-correlated over time; (4) If the code phase shift pattern is an m-sequence, the value of the peaks over time may be fed to correlators and two or more peaks will exhibit the same code phase of the same sequence albeit with different (i.e., shifted) polarity; (5) by some other like technique.

The code phase shift identification technique splits the signal strength of a source into multiple peaks. If there are two peaks, the strength of each peak will be reduced by one-half. If there are three peaks, the strength of each peak will be reduced by one-third, and so on. To recover the loss of signal strength, the source tracking sub-module 140 and source characterization sub-module 142, for example, may combine the multiple signals once the association is identified. This code phase shift identification technique may be further expanded to include multiple code phase shift distances per source, chipping frequency shifts, and other modifications to provide each light source with a multidimensional signature in code phase/frequency space.

Yet one more technique is described; a simultaneous code phase shift identification technique. The code phase shift technique can be implemented so that a light source outputs both shifted and un-shifted code phase signals at about the same time. Embodiments employing this technique are possible due to the low auto-correlation property of the selected signatures. That is, a light source can output both shifted and un-shifted code phase signals because neither output interferes with the other, just as interlight outputs do not mutually interfere. In simultaneous code phase shift identification cases, the output modulation of each light source is tri-state (i.e., 00, 01/10, 11) instead of binary (0, 1) as in the single code phase embodiments. In simultaneous code phase shift identification cases, the reduced signal strength of each light source may be addressed with techniques described herein. When light sources are utilized in the technique, the decoder 100 may handle the identification of individual light sources in the same or similar way the decoder handles sequentially code phase shifted light sources. One advantage of this technique is that identification is available on a continuous basis rather than requiring acquisition of samples over a several code phase shift period.

In the techniques described, an encoded light signature detection device 100 may be adapted to process captured light samples and identify individual light sources. Various other sub-modules in the inference engine 124 may be implemented as storage space, databases, software routines, or other logic that support the decoding processes. For example, in some embodiments, an in-band identification correlator/decoder sub-module cooperates with the source tracking sub-module 140 and the source characterization sub-module 142. The in-band identification correlator/decoder sub-module 146 may provide control parameters or other data to direct the decoding process or even parts of the correlation module 116.

In other inferential light source characterization and tracking techniques described herein, a source information estimates sub-module 148 may be present. The source information estimates sub-module 148 may include a database, software routines, control parameters, portable memory modules, and the like. The source information estimates sub-module 148 will typically include one or more entries for each known, expected, or identified light source. The particular entries will typically include information associated with the respective light source such as clock parameters used for modulation, a next predicted phase, historical data that is measured, captured, calculated, learned, programmed, or the like, and other characteristics.

Figure 10A:
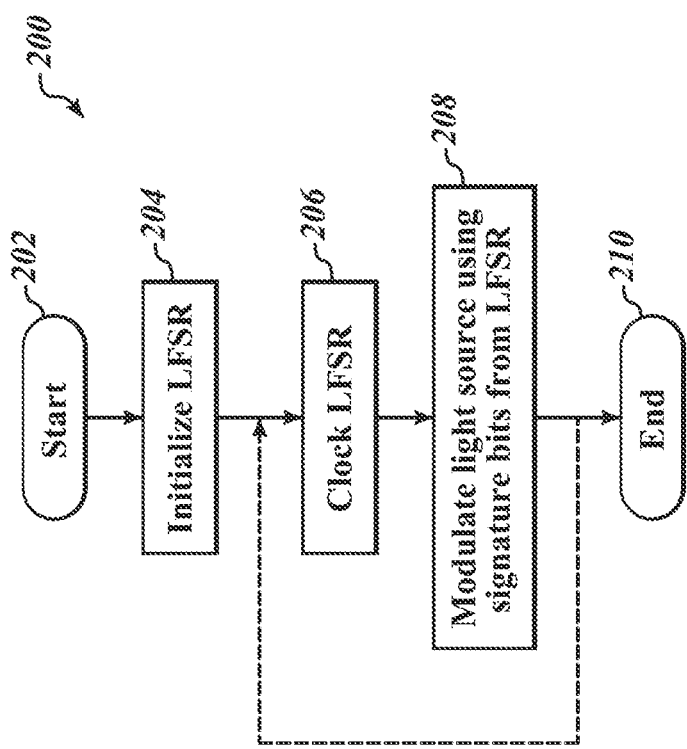
FIG. 10A is a flowchart illustrating a method of encoding light with a signature.

FIG. 10A is a flowchart illustrating a method 200 of encoding light with a signature. The method 200 may be implemented within a light source or otherwise in modules associated with a light source such as illustrated and described with respect to FIGS. 2A-2B, 3A-3C, 4. Processing in the method 200 begins at 202, and a linear feedback shift register (LFSR) or other signature producing module occurs at 204. The LFSR or other signature producing module is stepped (e.g., clocked) at 206 to produce one or more bits of a system-wide unique light signature. At 208, a light producing device (i.e., a light source) is modulated by the one or more bits of the system-wide unique light signature. In some cases, the processing is cyclical in the acts 206-208. Processing in the method 200 ends at 210.

Figure 10B:
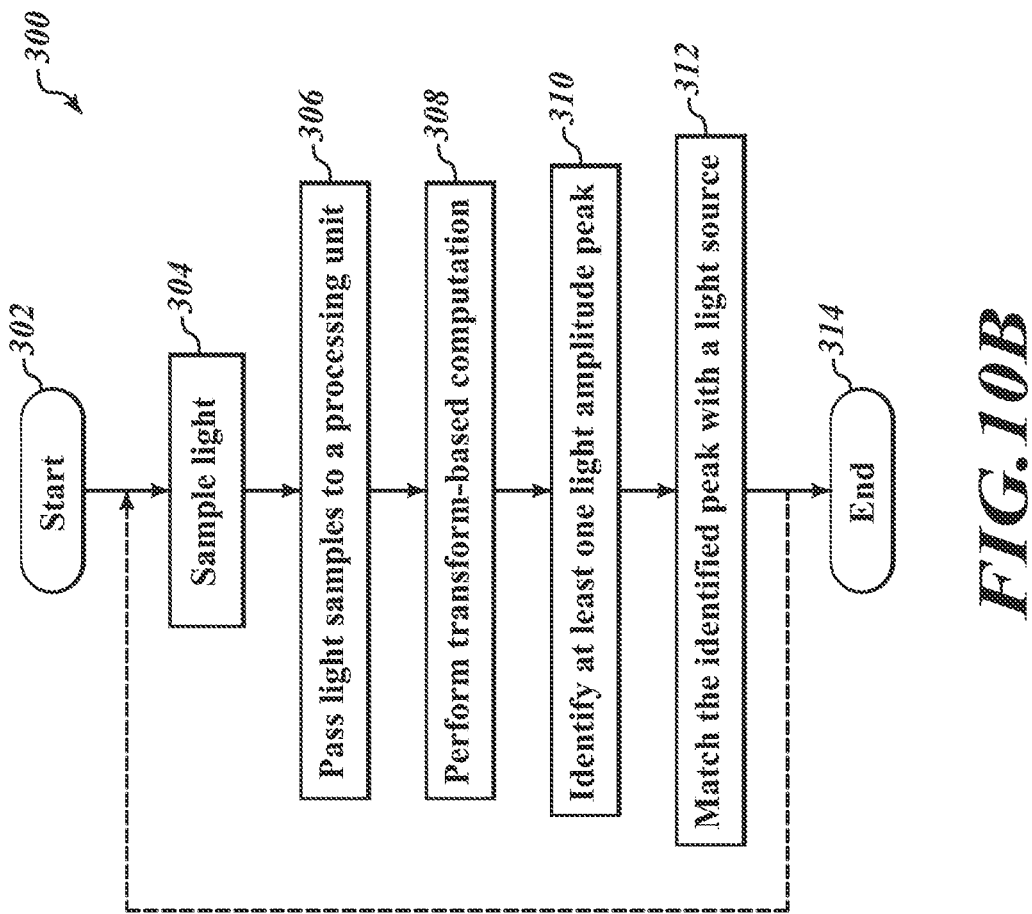
FIG. 10B is a flowchart illustrating a method of decoding light input to retrieve a signature.

FIG. 10B is a flowchart illustrating a method 300 of decoding light input to retrieve a signature. The method 300 may be implemented in an encoded light signature detection device such as illustrated and described with respect to FIGS. 5, 9A, 9B. Processing in the method 300 begins at 302. At 304, light is sampled with a sampling device. The samples may be passed upon collection to a processing module. Alternatively, or in addition, the collected samples may also be stored in a memory. Light samples are passed to a processing unit at 306, and a 308, transform-based computations are performed on one or more of the samples. At least one light amplitude peak is identified at 310 following the transform-based computation acts. At 312, the identified peak is matched with a particular light source. That is, at 312, the encoded light signature detection device has identified a system-wide unique light signature and matched the light signature to a particular light source. In some cases, the processing in the method 300 is cyclical in the acts 304-312. Processing ends in the method 300 at 314.

In the present disclosure, various embodiments are described with respect to an encoded light detection system. The present concepts may be employed in lighting systems that vary in scale and complexity from a single bulb in a desk lamp to the hundreds of lamps in a stadium lighting system or scoreboard, the thousands of street lights in a city, warehouses, factories, greenhouses, and beyond. Operators of more complex lighting systems face different challenges in keeping their systems operating to spec and within budget. The light output of bulbs declines with time, lenses and protective covers yellow with age, dirt and grime build up on fixtures, obstructions grow or are placed in front of light sources, and individual lights may fail and go unnoticed. These factors affect the performance of the system as a whole, and maintaining the system often requires significant labor, logistical coordination, and cost. A encoded light devices and monitoring framework embodiments described herein reduce the overhead of such system maintenance and provide improvements in operating costs, energy efficiency, and adherence to designed performance. In some cases, the monitoring occurs without manual inspection and without interference to the normal operation of the lighting system. The monitoring system is able to detect variations in the actual useful output of each light source in addition to outright failure, and embodiments described do not impose significant additional infrastructure requirements on the lighting system.

In one exemplary case, earlier referenced herein, a city's street lighting system is enabled with an encoded light signature lighting and detection system. The detection system may be integrated with the city's facilities management processes, and alerts can be issued when a street lamp's output falls below a specified operational threshold. The system can automatically generate a maintenance ticket calling for the on-site inspection of that specific lamp, and a city maintenance crew can respond to that ticket as time allows. In this exemplary embodiment, the encoded light signature lighting and detection system operates by imperceptibly modulating the output intensity of each street light source in such a manner that a central monitoring detection device discriminates the effective output of each street light source individually. The exemplary embodiment can be scaled to hundreds, thousands, or even millions of individual light sources, and each light source will include only simple hardware circuitry. One or more monitoring devices can be integrated into the system, and a monitoring device does not require direct line of sight to each light source.

In the exemplary encoded light signature lighting and detection system, one of many different the modulation schemes may be chosen. Broadly speaking, each light source is assigned a system-wide unique code that takes the form of an intensity variation with time. The codes are typically assigned and distributed such that the various light source codes have low cross-correlation and low auto-correlation. Utilization of such codes allows for asynchronous operation wherein there is no constraint placed on phase or frequency coordination between the detection sensors and the light sources.

Utilizing codes with, for example, optimally or near-optimally low auto-correlation permits a group of devices to all transmit the same code, differing only in phase. Devices that transmit codes that differ only in phase, even when the phase difference is by less than one modulation period, may be fully discriminated with such a code allocation. In such cases, signal discrimination is possible as long as two devices do not create a code collision by becoming aligned in phase.

Collision avoidance may be achieved by implementing codes with repeat periods of days, weeks, or months for example. Such implementation is trivial in simple microcontrollers, even at code rates of several megahertz (MHz), and such codes may be compactly represented with log 2 (Code Length) bits. For example, a mere 40 bits can be used to fully describe a code 1 trillion bits long, and such a code will repeat about once every two weeks when modulated at 1 MHz. Efficient techniques exist to measure the carrier strength of such codes by measuring for a fraction of the full code length. Utilizing a code of such length permits devices to be assigned phase randomly with a low probability of collision. Furthermore, phase drift between devices over time may be tracked by the monitoring system, and thus a device may be "followed through" a temporary code collision with another device by extrapolating relative drift. Alternatively, other techniques such as tightly coupling light source ID's with code phase assignments may be employed. Thus, the light sources maintain fixed, deterministic relative phase to each other with a known mapping between the known light source and its assigned code phase. Successively addressable lights, for example, may be assigned successive consecutive phase offsets.

Another technique for collision avoidance may be found within the light source itself. In some cases, phase assignment is fixed at manufacturing time, but in other cases, the phase assignment may be programmable. In such light sources, a light phase may be programmed or re-programmed during manufacture, deployment, or maintenance to reduce the likelihood of collisions.

Modulation techniques employed in the exemplary encoded light signature lighting and detection system may broadly include Direct-Sequence Spread Spectrum (DSSS) or Code Division Multiple Access (CDMA) techniques. The exemplary encoded light signature lighting and detection system does not require encoding of symbols or information but instead takes advantage of measurements of the received carrier amplitude of each code. Because the effective data rate is zero, the coding gain is limited only by factors such as timing stability and jitter of the light sources and the sensors. These techniques allow for powerful noise rejection and enable the distinction of encoded light contributions from ambient light fluctuation and other light sources.

DSSS and CDMA techniques typically induce code carrier modulation on a signal through mechanisms that modulate phase relationships in the underlying RF carrier through schemes such as Binary Phase Shift Keying. When operating in visual and near visual wavelengths, the RF carrier frequency is typically well above 100 THz and thus modulation schemes that rely on measuring or influencing carrier phase characteristics are generally out of reach of current technology. Thus, modulation and demodulation schemes applied herein typically rely on non-coherent integration techniques. One modulation method discussed herein is envelope amplitude modulation of appropriate depth. The "envelope amplitude modulation" technique modulates the integrated radiation emission by a lighting device per coding or sampling interval. Such a modulation scheme is akin to BPSK with a DC offset. That is, the available code states are 0 and 1, rather than −1 and 1. In such case, the coding depth is arranged to balance signal strength needs against light output needs. Such balancing may include varying light source output by current regulation, pulse width modulation, duty cycle reduction at coding rate, or any number of other techniques.

The sensors in the exemplary encoded light signature lighting and detection system generally measure total light intensity versus time and resolve the individual contribution of lights by measuring the amplitude of the carrier signal created by each assigned code. Measuring an effective signal strength of the encoded light sources generally involves measuring and recording or transmitting light intensity at a sampling rate substantially equal to (e.g., in the case of synchronous systems) or substantial equal to double (e.g., in the case of asynchronous systems) the coding rate. The sensors employed in the exemplary encoded light signature lighting and detection system could be as simple as a light-to-frequency integrated circuit (IC) coupled with a counter, a frequency source, and a memory. Other potential designs could also be used, and there are a number of ways in which sensing, decoding, communicating, and acting upon the measured intensity information may be realized, including hand-held units with integrated code and fixture databases, displays, and user interfaces allowing for mobile monitoring, sensors deployed on vehicles, sensors that communicate raw measurement data for central decoding and processing, and so on.

Turning back to the city's street lighting system embodiment of the encoded light signature lighting and detection system, the city may employ a useful monitoring system. The monitoring system may produce one or more reports of received signal strengths for various relative phases correlated to light sources with actionable maintenance identities (e.g., fixture identification number). Several techniques can be used to make the connection between signature codes and light source identities in a maintenance system. For example, workers can log or report the time of day when they maintain a particular fixture, and the system can match signals by their time of first observation. Alternatively, a fixture or bulb may be placed into a maintenance mode to superimpose a secondary code upon the primary code. Such techniques, coupled with a maintenance report of which fixture had been placed into maintenance mode, will permit a mapping of the identified light fixture with its encoded signature. Another method of linking code phases to specific fixtures or light sources involves a portable sensor which may be placed in close proximity to a light during installation or maintenance. By employing a detection sensor close to the light fixture, the signal in question will stand out as significantly stronger than other measured signals. A record may then be made of the code phase offset referenced to a time base available to the maintenance workers and the monitoring system. In yet one more alternative, a light source may be assigned a fixed phase offset relative to a particular time base accessible to the modulating mechanism during operation. Some available time bases may be derived as a reference to Universal Time, Co-ordinated (UTC) as obtained via a cellular network or GPS hardware; other time bases include a reference to the local day/night cycle as measured by a light source's ambient brightness sensor, a signal encoded in the power grid, or some other stable time base. In systems with centralized control or recording of light state, another technique may be employed to coordinate with the central control system to toggle a light source's state and observe which signal varies with that light source's state, thus establishing the necessary mapping. In yet one more alternative, the monitoring system may passively observe commanded state changes and correlate such changes with measured signal changes.

As used herein, the term "module" refers to an electronic circuit, a processor (e.g., shared, dedicated, group, single core, multicore, or the like) and memory operative to execute one or more software or firmware programs, an application specific integrated circuit (ASIC), a combinational logic circuit, or some other individual or cooperative coupling of suitable components (either hardware or software) that provides the functionality described with respect to the module.

Particular embodiments described herein include one or more memories. The memories may comprise any combination of volatile and non-volatile non-transitory computer-readable media (CRM) for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory.

The CRM is configured to store computing instructions executable by a CPU. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of logic in a signature encoded light production and detection system.

Processor-based devices described herein may include operative software found in conventional computing devices such as an operating system, software drivers to direct operations through input/output (I/O) circuitry, networking circuitry, and other peripheral component circuitry. In addition, application software may be included and operative as network software for communicating with other computing devices, database software for building and maintaining databases, and task management software for distributing the communication and/or operational workload amongst various CPU's. In some cases, a processor-based device is a single hardware machine having the hardware and software listed herein, and in other cases, a processor-based device is a networked collection of hardware and software machines working together to execute the functions of the signature encoded light system. Some conventional hardware and software is not shown in the figures for simplicity.

Some of the processor-based devices described herein may include a cellular transceiver to couple the processor-based device to other devices through a cellular communication network.

FIGS. 10A and 10B are flowcharts illustrating processes that may be used by embodiments of signature encoded light systems. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to produce signature encoded light, comprising: a modulation controller including:
   a plurality of one-bit cells arranged as a linear feedback shift register (LFSR), the LFSR having at least one tap;
   a seed value source coupled to the LFSR and arranged to provide at least one seed value;
   combinatorial logic coupled to the at least one tap of the LFSR to provide at least one linear feedback path for the LFSR; and
   a clock input to pass a clock signal arranged to drive bits from the LFSR, the bits driven from the LFSR forming a modulation signal having encoded signature information, the encoded signature based on the combinatorial logic, the at least one tap, and the at least one seed value; and
   a modulating power source including a power supply and a code modulation state translator module, wherein the modulating power source is configured to receive the modulation signal having the encoded signature information and configured to produce a modulated signal, the modulated signal arranged to modulate an amplitude of light output from at least one light source according to the encoded signature information,
   wherein the modulated signal is arranged to modulate the amplitude of light output from the at least one light source between a "more on" state for a bit having a first binary state and a "less on" state for a bit having a second binary state wherein the "more on" state produces a light output that is at least 100 percent of nominal light output and wherein the "less on" state produces a light output that is at least 90 percent and less than 100 percent of nominal light output when the at least one light source is perceived to be in an "on" state.

2. The system to produce signature encoded light of claim 1, comprising:
   at least one light source coupled to the modulating power source, the at least one light source arranged to output a first encoded light signature embedded within light produced by the at least one light source, the first encoded light signature corresponding to the encoded signature information.

3. The system to produce signature encoded light of claim 2 wherein the modulation signal is a digital stream of binary bits, each bit of the digital stream representing a binary "1" or a binary "0," and where a sequence of bits in the digital stream represents the first encoded light signature.

4. The system to produce signature encoded light of claim 2 wherein switching between light output amplitude states that correspond to a binary "1" and a binary "0" in accordance with the first encoded light signature is visually imperceptible.

5. The system to produce signature encoded light of claim 2 wherein the first encoded light signature repeats periodically, and wherein individual copies of the first encoded light signature are separated by intervening bits, and wherein the intervening bits include control information.

6. The system to produce signature encoded light of claim 2 wherein the at least one light source includes a light emitting diode (LED).

7. The system to produce signature encoded light of claim 2 wherein the at least one light source includes a plurality of light emitting diodes (LEDs) and wherein each LED of the plurality of LEDs is modulated with a different phase offset of the same first encoded light signature.

8. The system to produce signature encoded light of claim 1 wherein the modulated signal is arranged to modulate the amplitude of light output from the at least one light source between a "more on" state for a bit having a first binary state and a "less on" state for a bit having a second binary state wherein the "more on" state produces a light output that is between 10 percent and 20 percent of nominal light output and wherein the "less on" state produces a light output that is less than 10 percent of nominal light output when the at least one light source is perceived to be in an "off" state.

9. A method to encode a signature in light output from a light source, the output light being in the visible spectrum, comprising:

loading a seed value in a linear feedback shift register (LFSR), the seed value arranged to produce a light signature formed as a sequence of bits exiting the LFSR, the light signature arranged to identify the light source;

clocking the LFSR to output the light signature as a stream of binary bits, each exiting bit representing one bit of the light signature;

passing each bit of the light signature stream to a code modulation state translator;

modulating light that is output from the light source according to the bits of the light signature stream wherein the modulated light is output at a first amplitude or a second amplitude based on a binary state of each bit of the light signature stream; and wherein the first amplitude is less than 5 percent of the nominal output of the light source and the second amplitude is less than 15 percent of the nominal output of the light source when the light source is perceived to be in an "off" state.

10. The method of claim 9 wherein the first amplitude is about 95 percent of the nominal output of the light source and the second amplitude is about 105 percent of the nominal output of the light source when the light source is perceived to be in an "on" state.

11. The method of claim 9 wherein the LFSR is at least 24 bits wide.

12. The method of claim 9 wherein the LFSR is configured to generate maximal length sequences (m-sequences).

13. At least one non-transitory computer-readable storage medium having stored contents to configure at least one computing system to perform a method, the method comprising:

loading a seed value into a feedback shift register;

producing at least one encoded light signature with the feedback shift register;

clocking the feedback shift register to output the light signature as a stream of binary bits, each exiting bit representing one bit of the light signature;

passing each bit of the light signature stream to a code modulation state translator;

modulating light output from a plurality of light sources wherein light output from each one of the plurality of light sources is modulated with a different light signature; and wherein the modulated signal is arranged to modulate the amplitude of light output from the at least one light source between a "more on" state for a bit having a first binary state and a "less on" state for a bit having a second binary state wherein the "more on" state produces a light output that is between 10 percent and 20 percent of nominal light output and wherein the "less on" state produces a light output that is less than 10 percent of nominal light output.

14. The non-transitory computer-readable storage medium according to claim 13 wherein modulating light output from the plurality of light sources with the different light signature includes modulating light output from each one of the plurality of light sources with a different encoded light signature value.

15. The non-transitory computer-readable storage medium according to claim 13 wherein modulating light output from the plurality of light sources with the different light signature includes modulating light output from each one of the plurality of light sources with a different phase of a same encoded light signature value.

16. The non-transitory computer-readable storage medium according to claim 13 wherein at least one of the plurality of light sources is configured to be perceived as "off" when the respective light source outputs modulated light.

17. The non-transitory computer-readable storage medium according to claim 13 wherein the feedback shift register producing the at least one encoded light signature is a linear feedback shift register.

18. A system to produce signature encoded light, comprising:

a modulation controller including:
  a plurality of one-bit cells arranged as a linear feedback shift register (LFSR), the LFSR having at least one tap;
  a seed value source coupled to the LFSR and arranged to provide at least one seed value;
  combinatorial logic coupled to the at least one tap of the LFSR to provide at least one linear feedback path for the LFSR; and
  a clock input to pass a clock signal arranged to drive bits from the LFSR, the bits driven from the LFSR forming a modulation signal having encoded signature information, the encoded signature based on the combinatorial logic, the at least one tap, and the at least one seed value;

a modulating power source including a power supply and a code modulation state translator module, wherein the modulating power source is configured to receive the modulation signal having the encoded signature information and configured to produce a modulated signal, the modulated signal arranged to modulate an amplitude of light output from at least one light source according to the encoded signature information, and at least one light source coupled to the modulating power source, the at least one light source arranged to output a first encoded light signature embedded within light produced by the at least one light source, the first encoded light signature corresponding to the encoded signature information, wherein the first encoded light signature repeats periodically, and wherein individual copies of the first encoded light signature are separated by intervening bits, and wherein the intervening bits include control information.

* * * * *